United States Patent [19]

Izawa et al.

[11] Patent Number: 5,551,019

[45] Date of Patent: Aug. 27, 1996

[54] METHODS AND SYSTEMS FOR SORTING MULTIPLYING INDEXED DATA

[75] Inventors: Yasuhiro Izawa, Suita; Tatsuya Fujii, Nishinomiya; Naoto Shiraishi, Toyonaka; Masanobu Fukushima, Toyonaka; Tatsuya Nakajima, Toyonaka, all of Japan

[73] Assignee: Ricoh Company, Ltd., Tokyo, Japan

[21] Appl. No.: 173,499

[22] Filed: Dec. 22, 1993

[30] Foreign Application Priority Data

Dec. 25, 1992 [JP] Japan ................................. 4-359476

[51] Int. Cl.6 ...................................................... G06F 7/08
[52] U.S. Cl. .................... 395/600; 395/122; 364/DIG. 2; 364/962.3
[58] Field of Search ..................... 395/600, 122

[56] References Cited

U.S. PATENT DOCUMENTS 4,885,703 12/1989 Deering ..................... 395/122
5,179,717 1/1993 Sato et al. ..................... 395/800
5,307,450 4/1994 Grossman ..................... 395/123

FOREIGN PATENT DOCUMENTS 224018 9/1990 Japan.

Primary Examiner—Thomas G. Black
Assistant Examiner—John C. Loomis
Attorney, Agent, or Firm—Woodcock Washburn Kurtz Mackiewicz & Norris

[57] ABSTRACT

The current methods and systems sort three-dimensional data with a reduced number of buffer memories at an increased speed. Based upon the Z-dimension data, the three-dimensional data is sorted in ascending order via two intermediate tables. Since a first intermediate table holds only one set of unique Z values, when there is a recurrence of Z values, a second intermediate table holds these multiply occurring data. At the end, the contents of these intermediate tables are merged into a single result holding table.

21 Claims, 91 Drawing Sheets

DISTRIBUTION COUNT MEMORY

CHAIN MEMORY

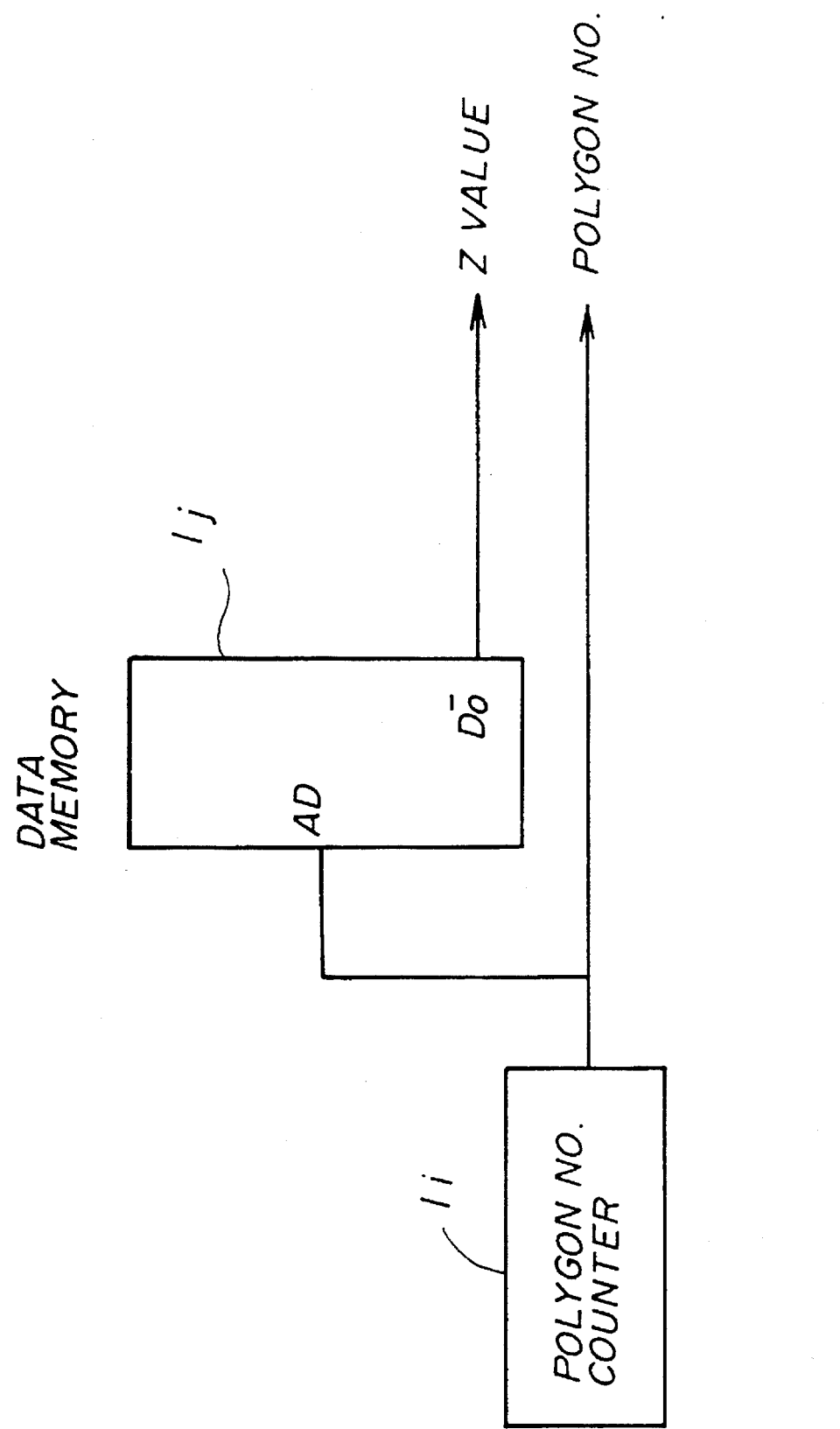

| NUMBER OF BITS M | NUMBER OF POLYGONS N | $3N+2^{(M+1)}+2$ (PROCESS TIME) | $4N+2^M+1$ (PROCESS TIME) | DISTRIBUTION COUNT MEMORY | CHAIN MEMORY |
|---|---|---|---|---|---|
| 8 | 2000 | 6514 (0.7ms) | 8257 (0.8ms) | 256 WORDS ×13 bits | 2 KWORDS ×12 bits |
| 15 | 8191 | 90111 (9.1ms) | 65533 (6.6ms) | 32 KWORDS ×15 bits | 8 KWORDS ×14 bits |
| 16 | 10000 | 161074 (16.2ms) | 105537 (10.6ms) | 64 KWORDS ×16 bits | 10 KWORDS ×15 bits |

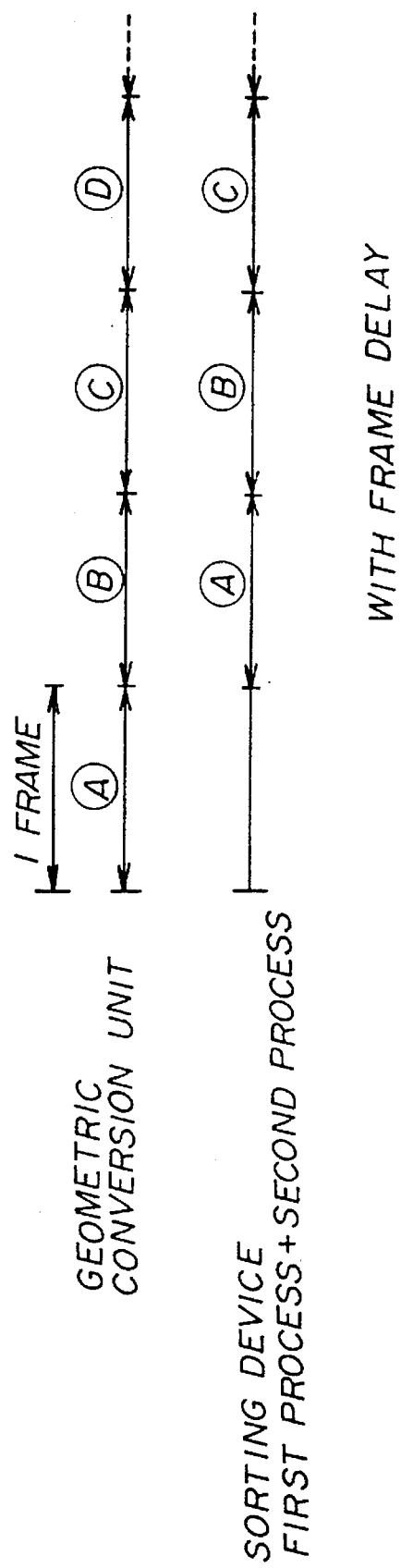

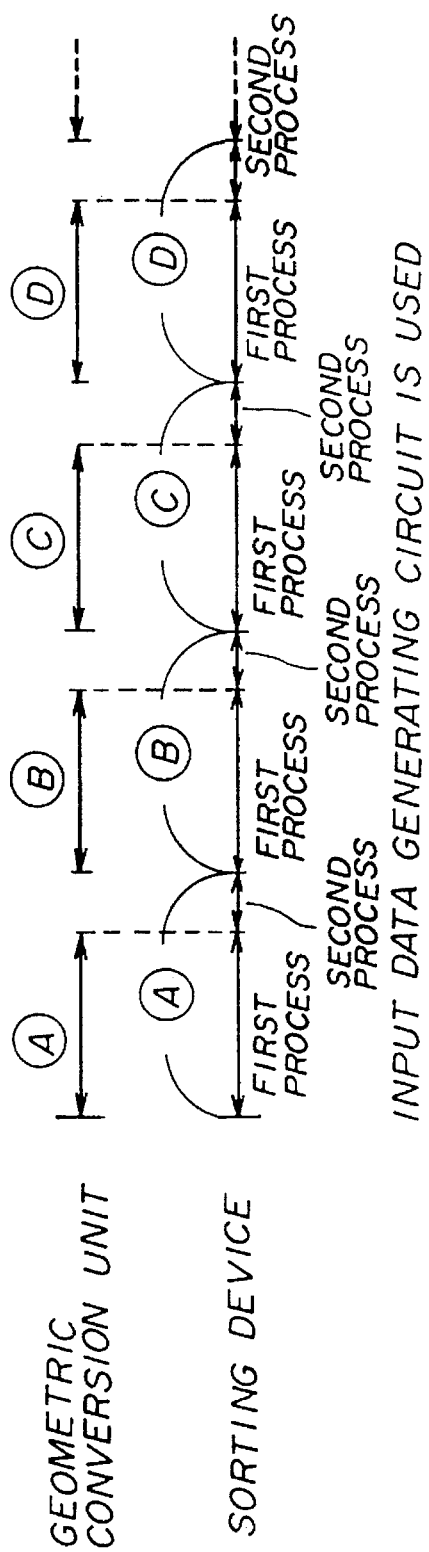

FIG. 24B

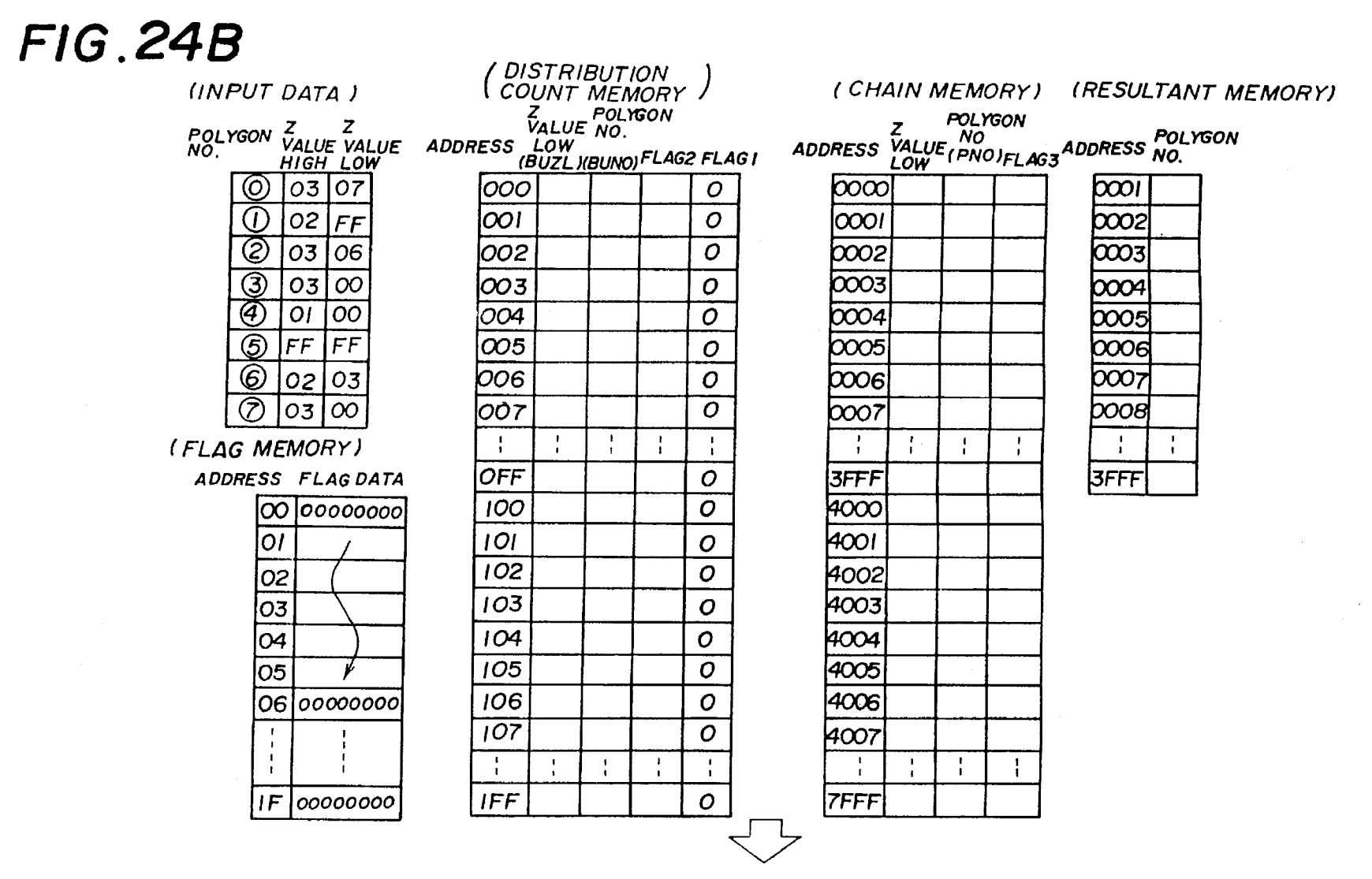

(INPUT DATA)

| POLYGON NO. | Z VALUE HIGH | Z VALUE LOW |
|---|---|---|
| ⓪ | 03 | 07 |
| ① | 02 | FF |
| ② | 03 | 06 |
| ③ | 03 | 00 |
| ④ | 01 | 00 |
| ⑤ | FF | FF |
| ⑥ | 02 | 03 |
| ⑦ | 03 | 00 |

(FLAG MEMORY)

| ADDRESS | FLAG DATA |
|---|---|
| 00 | 00000000 |
| 01 | |
| 02 | |
| 03 | |
| 04 | |
| 05 | |
| 06 | 00000000 |
| ---- | ---- |
| 1F | 00000000 |

(DISTRIBUTION COUNT MEMORY)

| ADDRESS | Z VALUE LOW (BUZLIBUNO) | POLYGON NO. | FLAG2 | FLAG1 |
|---|---|---|---|---|
| 000 | | | | 0 |
| 001 | | | | 0 |
| 002 | | | | 0 |
| 003 | | | | 0 |
| 004 | | | | 0 |
| 005 | | | | 0 |
| 006 | | | | 0 |
| 007 | | | | 0 |
| -- | | | | -- |
| 0FF | | | | 0 |
| 100 | | | | 0 |
| 101 | | | | 0 |
| 102 | | | | 0 |
| 103 | | | | 0 |
| 104 | | | | 0 |
| 105 | | | | 0 |
| 106 | | | | 0 |
| 107 | | | | 0 |
| -- | | | | -- |
| 1FF | | | | 0 |

(CHAIN MEMORY)

| ADDRESS | Z VALUE LOW | POLYGON NO (PNO) | FLAG3 | POLYGON NO. |
|---|---|---|---|---|
| 0000 | | | | |
| 0001 | | | | |
| 0002 | | | | |
| 0003 | | | | |
| 0004 | | | | |
| 0005 | | | | |
| 0006 | | | | |
| 0007 | | | | |
| -- | -- | -- | -- | |
| 3FFF | | | | |
| 4000 | | | | |
| 4001 | | | | |
| 4002 | | | | |
| 4003 | | | | |
| 4004 | | | | |
| 4005 | | | | |
| 4006 | | | | |
| 4007 | | | | |
| -- | -- | -- | -- | |
| 7FFF | | | | |

(RESULTANT MEMORY)

| ADDRESS | POLYGON NO. |
|---|---|
| 0001 | |
| 0002 | |
| 0003 | |
| 0004 | |
| 0005 | |
| 0006 | |
| 0007 | |
| 0008 | |
| -- | |
| 3FFF | |

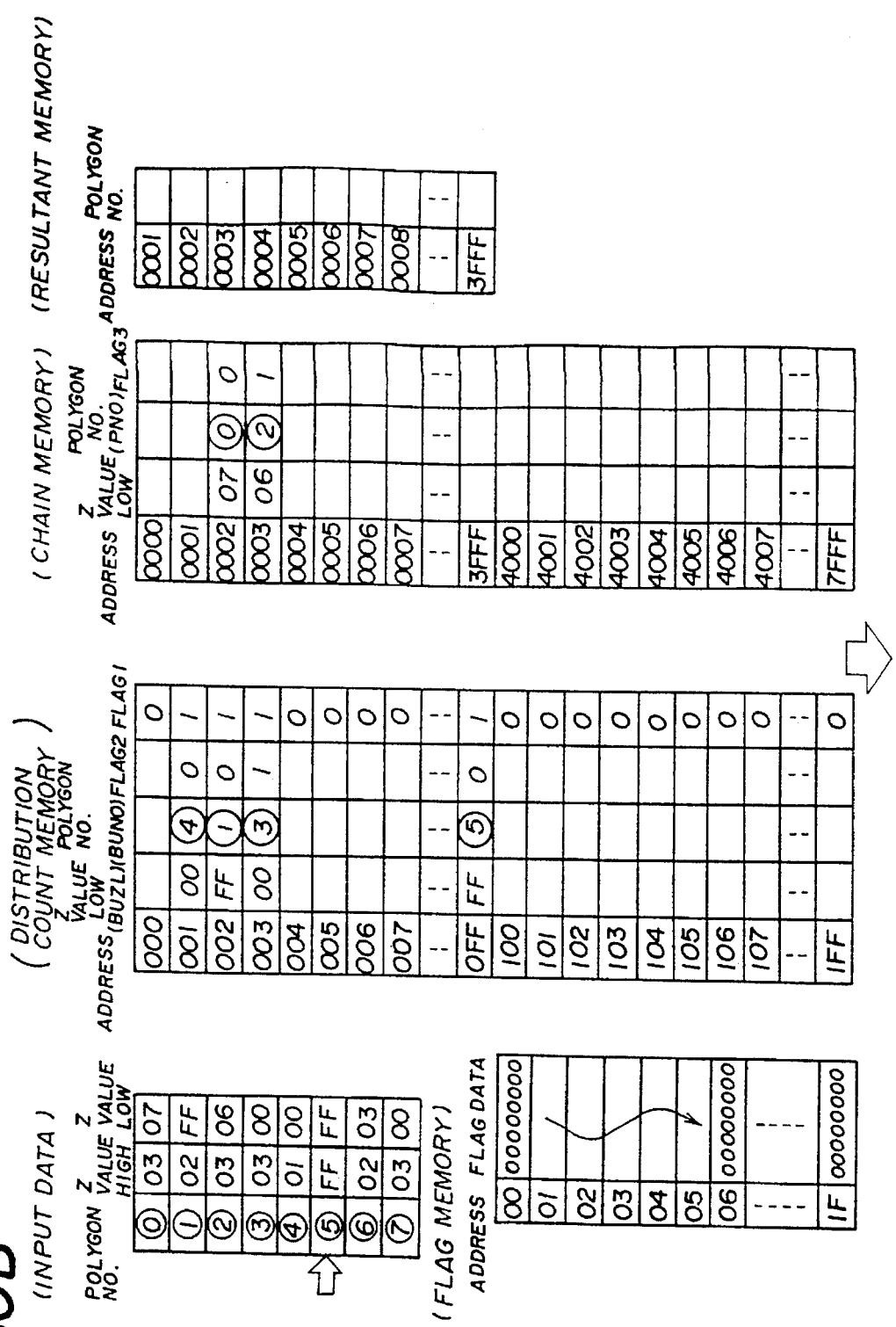

FIG. 34B

METHODS AND SYSTEMS FOR SORTING MULTIPLYING INDEXED DATA

BACKGROUND OF THE INVENTION

The present invention generally relates to sorting devices, and more particularly to a sorting device which can perform a sorting operation for a plurality of reference data.

Image synthesizing devices are widely used for applications such as a 3-D video game machine, a machine for simulation of air planes and various vehicles, a computer graphic machine, a CAD machine or the like. The image synthesizing devices output various image signals to a CRT display in accordance with image information supplied by external devices. The image synthesizing devices can synthesize not only a two dimensional image but also a three dimensional stereoscopic image.

In order to synthesize the 3-D image in real time, it is necessary to perform a sorting of 3-D data of polygons for each frame in accordance with coordinate values in a depth direction, that is, according to the Z coordinate of the reference data. As a conventional sorting device, a sorting device disclosed in Japanese Laid-Open Patent Application No. 2-224018 is known to the art. This sorting device has three memories, a first buffer memory, a last buffer memory and a chain buffer memory. The sorting device further includes a flag memory so as to increase sorting speed.

In the above-mentioned conventional sorting device, as many as three buffer memories are used, which results in increasing of the manufacturing cost of the sorting device.

Additionally, since bit data having a flag bit is detected by searching for a flag, bit by bit, upon writing data read out from the flag memory to a shift register, data having no flag bit must be read out. This results in performing unnecessary operations, and thereby it is difficult to increase the sorting speed.

SUMMARY OF THE INVENTION

It is a general object of the present invention to provide a novel and useful sorting device in which the above-mentioned problems are eliminated.

A more specific object of the present invention is to provide a sorting device which can perform an sorting operation with a reduced number of buffer memories.

Another object of the present invention is to provide a sorting device which can perform a sorting operation at an increased speed.

In order to achieve the above-mentioned objects, according to the present invention, there is provided a sorting device for sorting input data items having a reference value, a plurality of input data having the same reference value being present, the sorting device comprising:

data number generating unit for generating a data number for each of the input data items;

a distribution count memory, having a memory area in which the data number is stored by using the reference value of the input data as an address, the data number stored in the memory area being replaced with a new data number when the new data number is input and the new data number corresponds to new input data having the same reference value as that of the stored data number;

a chain memory for storing the current data number being replaced as a data number by using the value of the new data number as an address when the replacement in the distribution count memory is performed;

distribution count memory reading unit for reading a data number from a designated address of the distribution count memory;

a first determining unit for determining whether or not a data number is stored in the designated address of the distribution count memory;

a resultant memory for storing the data number in a sorted condition;

a first resultant memory writing unit for writing, when a data number is present in the designated address, the data number into said resultant memory means, a next address value being supplied, when no data number is present in the designated address, to the distribution count memory reading unit so that the distribution count memory reading unit reads a data number stored at the next address;

a second determining unit for determining whether or not a data number is present at an address of the chain memory, the address having a value the same as the value of the data number being written into the resultant memory;

a chain memory reading unit for reading the data number stored in an address of the chain memory, the address of the chain memory having a value the same as the value of the data number being written into the resultant memory;

a second resultant memory writing unit for writing, when a data number is present at the address of the chain memory, the data number into the resultant memory, a next address value being supplied, when no data number is present at the address of the chain memory, to the distribution count memory reading means so that the distribution count memory reading unit reads a data number stored at the next address.

According to the present invention, only two buffer memories, the distribution count memory and chain memory, are provided, and thus the number of buffer memories is less than that in a conventional sorting device. Therefore, the processing time including reading and writing operations for buffer memories is reduced.

Other objects, features and advantages of the present invention will become more apparent from the following detailed description when read in conjunction with the accompanying drawings.

BRIEF DESCRIPTION OF THE DRAWINGS

FIG. 3B is a block diagram of anther example of an input data generating circuit shown in FIG. 1;

FIGS. 7A through 7I are illustrations, showing contents of each memory, for explaining writing and reading operations;

FIG. 12 is a table for showing the number of cycles and the capacity of memories;

FIGS. 13A, 13B and 13c are illustrations for explaining a relationship between a processing time of a geometric conversion unit and that of a sorting device;

FIGS. 24A, 24B, 25A, 25B, 26A, 26B, 27A, 27B, 28A, 28B, 29A, 29B, 30A, 30B, 31A, 31B, 32A, 32B, 33A, 33B, 34A, 34B, 35A, 35B, 36A, 36B, 37A, 37B, 38A, 38B, 39A, 39B, 40A, 40B, 41A, 41B, 42A, 42B, 43A, 43B, 44A, 44B, 45A, and 45B are illustrations, showing contents of each memory, for explaining writing and reading operations.

DETAILED DESCRIPTION OF THE PREFERRED EMBODIMENTS

Figure 1:
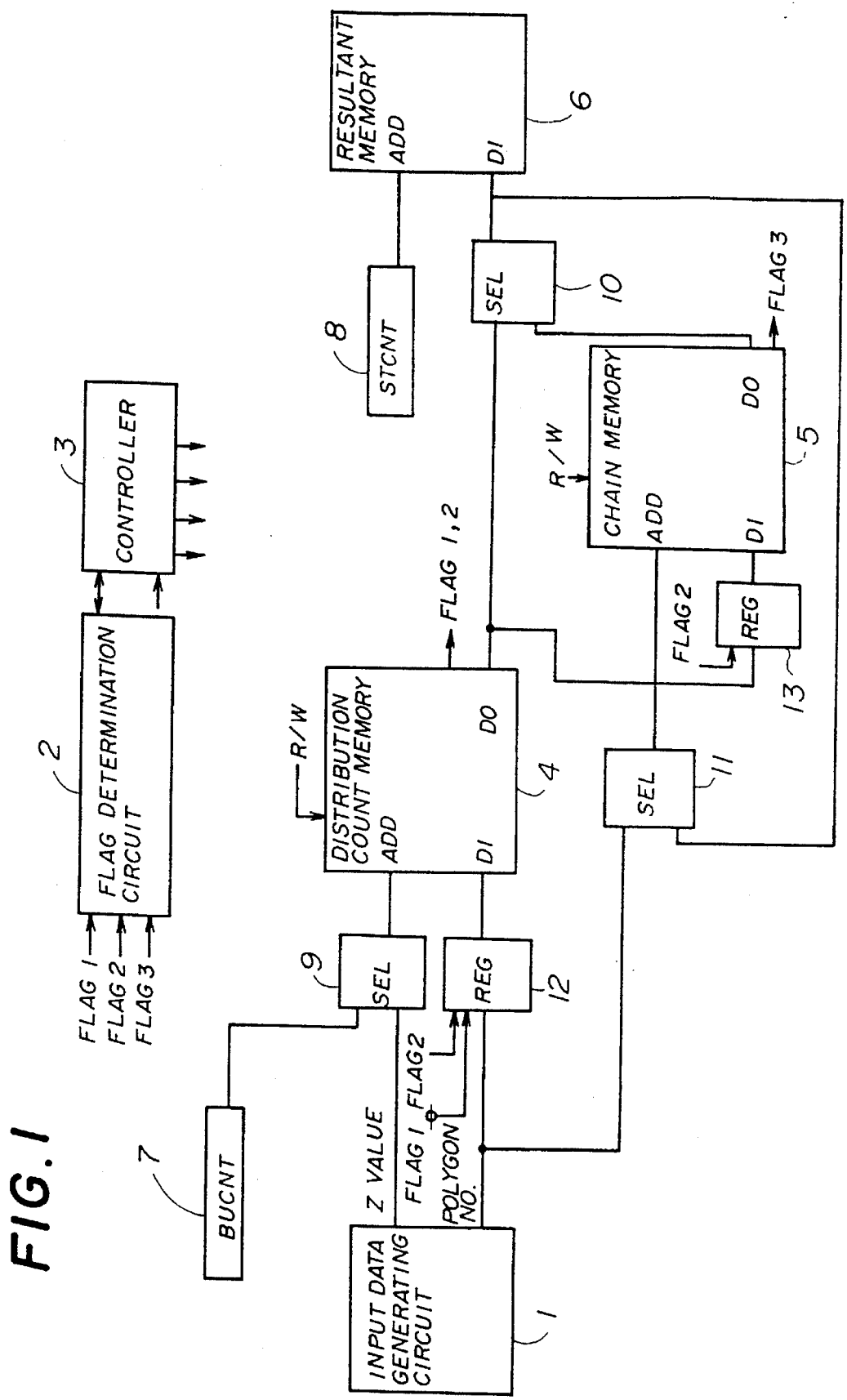
FIG. 1 is a block diagram of a sorting device according to the present invention.

A description will now be given, with reference to the drawings, of a first embodiment of the present invention. FIG. 1 is a block diagram of a first embodiment of a sorting device according to the present invention. This sorting device performs a sorting operation in accordance with Z values output from an input data generating circuit 1 so as to output the resultant sorted data. The sorting device comprises a flag determination circuit 2, a controller 3, distribution count memory 4, a chain memory 5, a resultant memory 6, an address generating counter (BUCNT) 7 provided for the distribution count memory 4, an address generating counter (STCNT) 8 provided for the resultant memory 6, selectors (SEL) 9, 10, 11, and registers (REG) 12, 13.

Figure 2A:
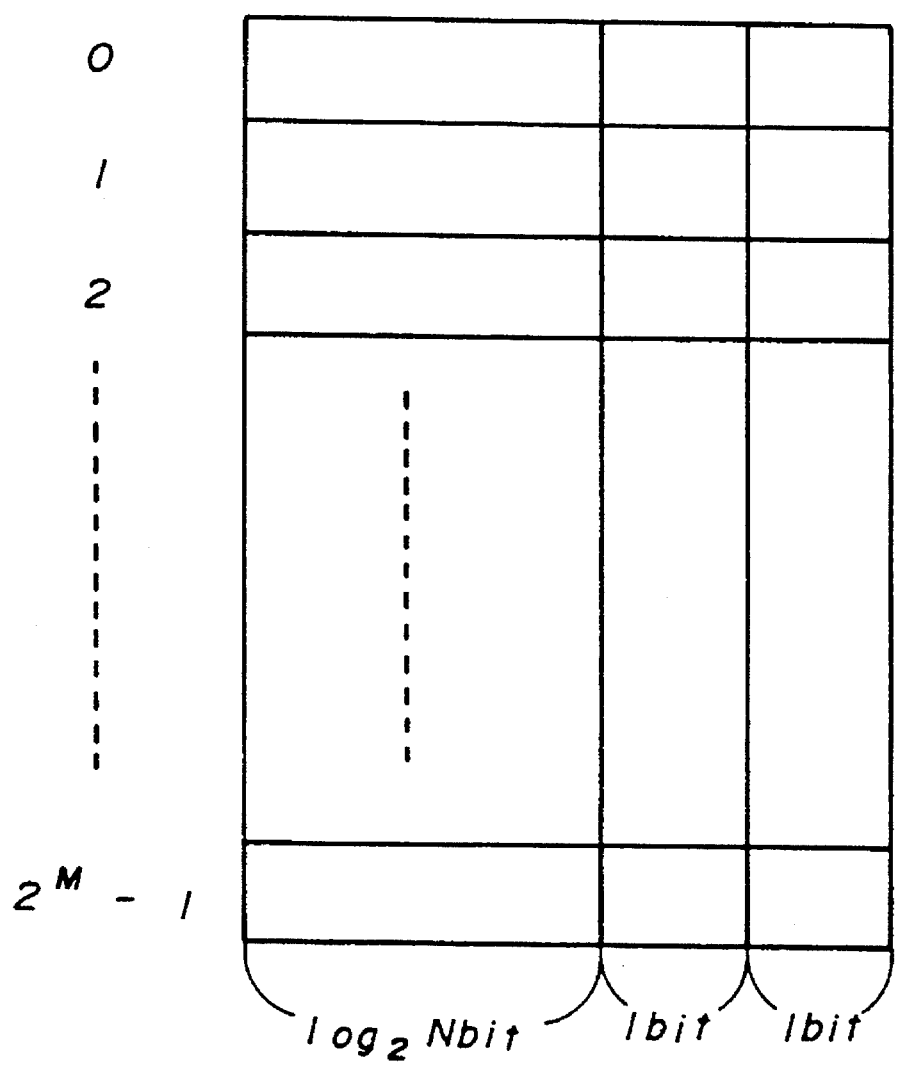
FIG. 2A is an illustration of a format of a distribution count memory shown in FIG. 1.
Figure 2B:
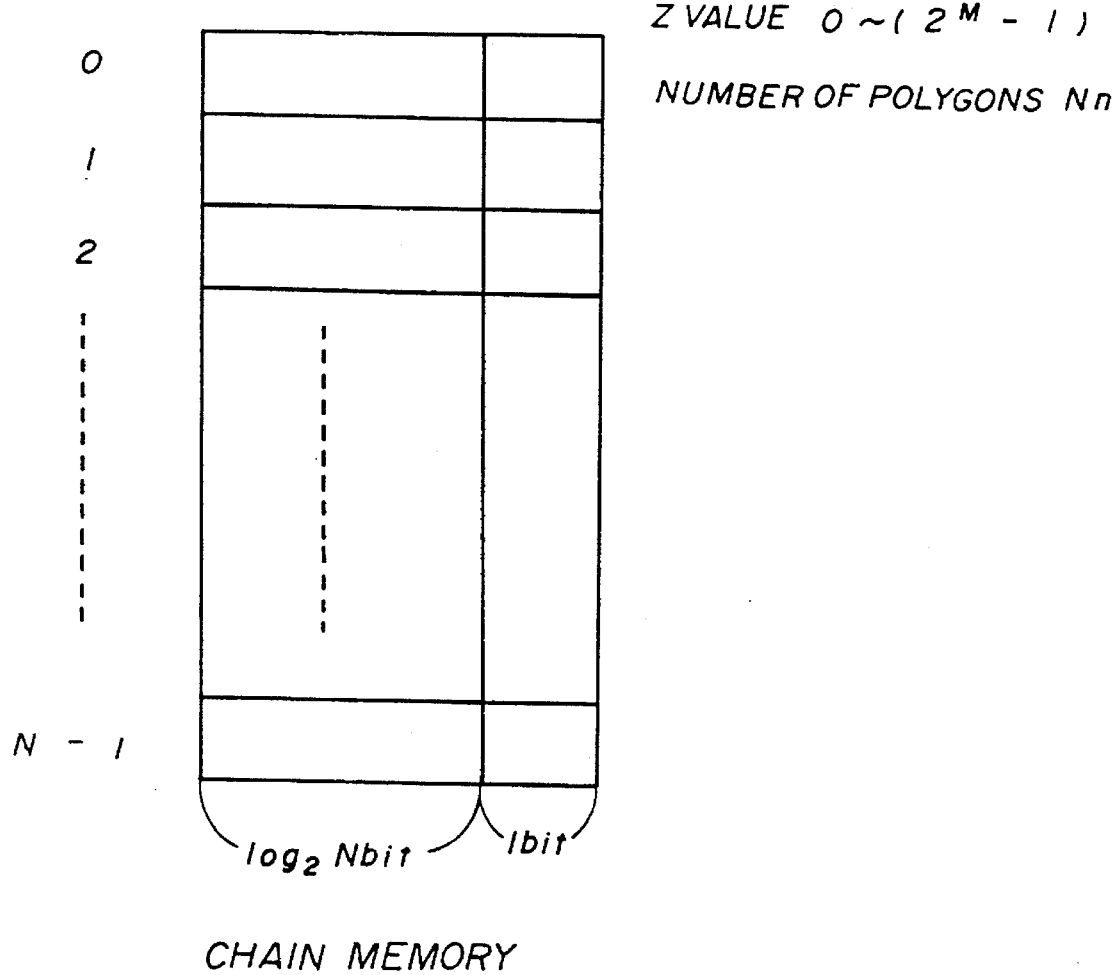
FIG. 2B is an illustration of a format of a chain memory shown in FIG. 1.

FIG. 2A shows a format of the distribution count memory 4, and FIG. 2B shows a format of the chain memory 5. The distribution count memory 4 has three areas which are a polygon number area into which each polygon number (hereinafter called polygon No.) is written in accordance with addresses 0 to $(2^M-1)$, a flag 1 area showing whether or not each polygon No. has once been written into each address, and a flag 2 area showing whether or not each polygon No. has twice been written into each address. The chain memory 5 has two areas, which are a polygon number area into which a polygon No. is written and a flag 3 area showing an end point of the polygon which end point is connected to another polygon end point located at the same Z value position. It should be noted that N indicates the number of polygons and M indicates the number of bits of the Z values.

Figure 3A:
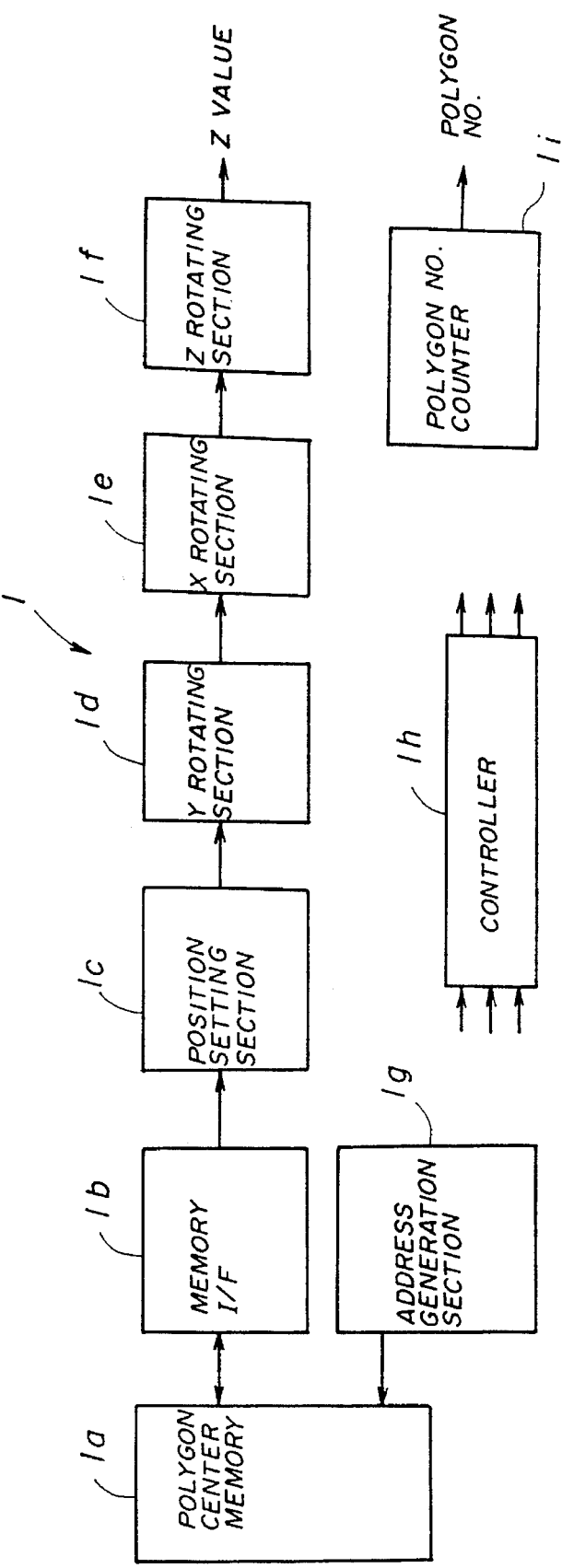
FIG. 3A is a block diagram of an example of an input data generating circuit shown in FIG. 1.

FIG. 3A shows a block diagram of the input data generating circuit 1. The input data generating circuit 1 comprises a polygon center memory 1a, a memory I/F 1b, a position setting section 1c, a Y rotating section 1d, an X rotating section 1e, a Z rotating section 1f, an address generating section 1g, a controller 1h, and a polygon No. counter 1i. The input data generating circuit 1 generates Z values needed for a sorting operation by means of a sight conversion with respect to X, Y, Z values of the polygon center memory 1a. The polygon No. is output from the polygon No. counter 1i which counts the number of polygons. The operation of the polygon No. generating circuit is controlled by the controller 1h.

FIG. 3B shows a block diagram of another example of the input data generating circuit. This example comprises a data memory 1j and the polygon No. counter 1i which is the same as that shown in FIG. 3A. The data memory 1i outputs a Z value upon input of the polygon No. supplied by the polygon No. counter 1i.

In FIG. 1, the flag determination circuit 2 determines whether each of flags 1, 2, 3 is set or reset and the determination results are output to the controller 3.

Figure 4:
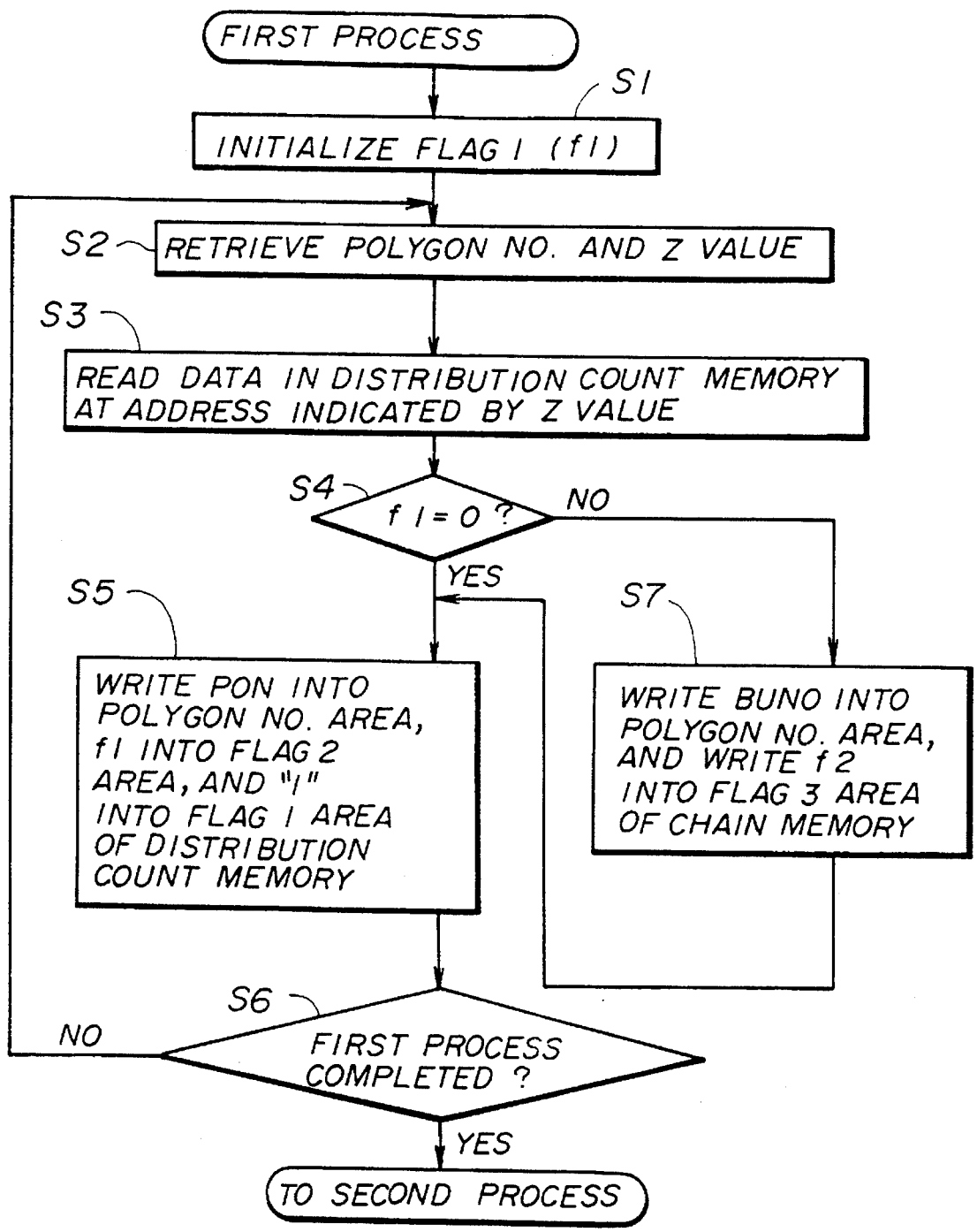
FIG. 4 is a flow chart showing a first process of the present invention using flags.
Figure 5:
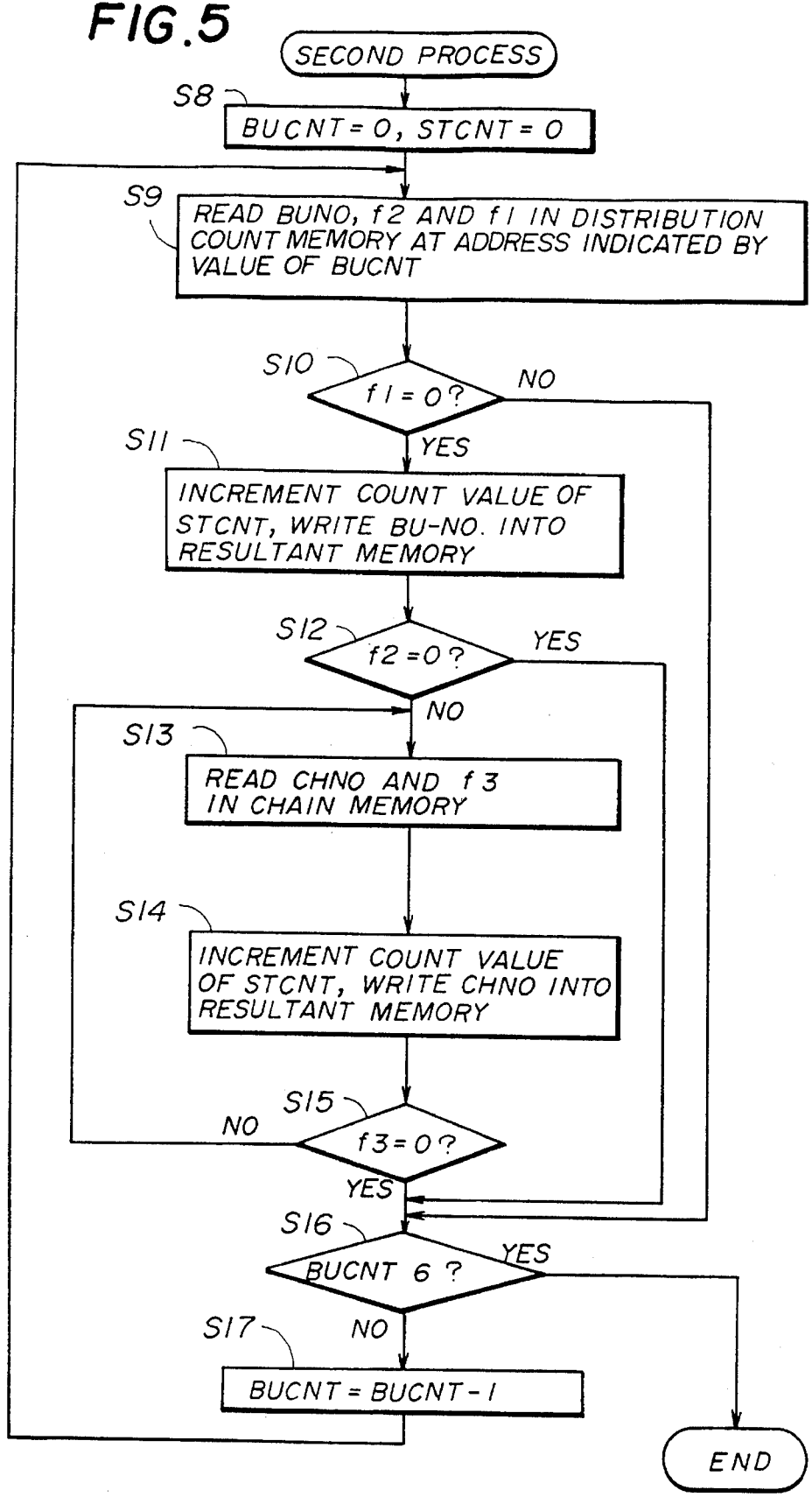
FIG. 5 is a flow chart showing a second process of the present invention using flags.

The controller 3 controls a read/write operation for each memory 4, 5, and switching of the SELs 9, 10, 11. Additionally, the controller 3 performs a process to write a flag value into each memory via the REGs 12, 13 in accordance with flag information supplied by the flag determination circuit 2. Detailed description of the process performed by the controller 3 will be given below with reference to flow charts shown in FIGS. 4 and 5. The process shown in FIG. 4 is referred to as a first operation, and the operation shown in FIG. 5 is referred to as a second operation. The BUCNT 7 and STCNT 8 are for providing addresses to the distribution count memory 4 and resultant memory 6 in the second operation shown in FIG. 5.

Figure 6A:
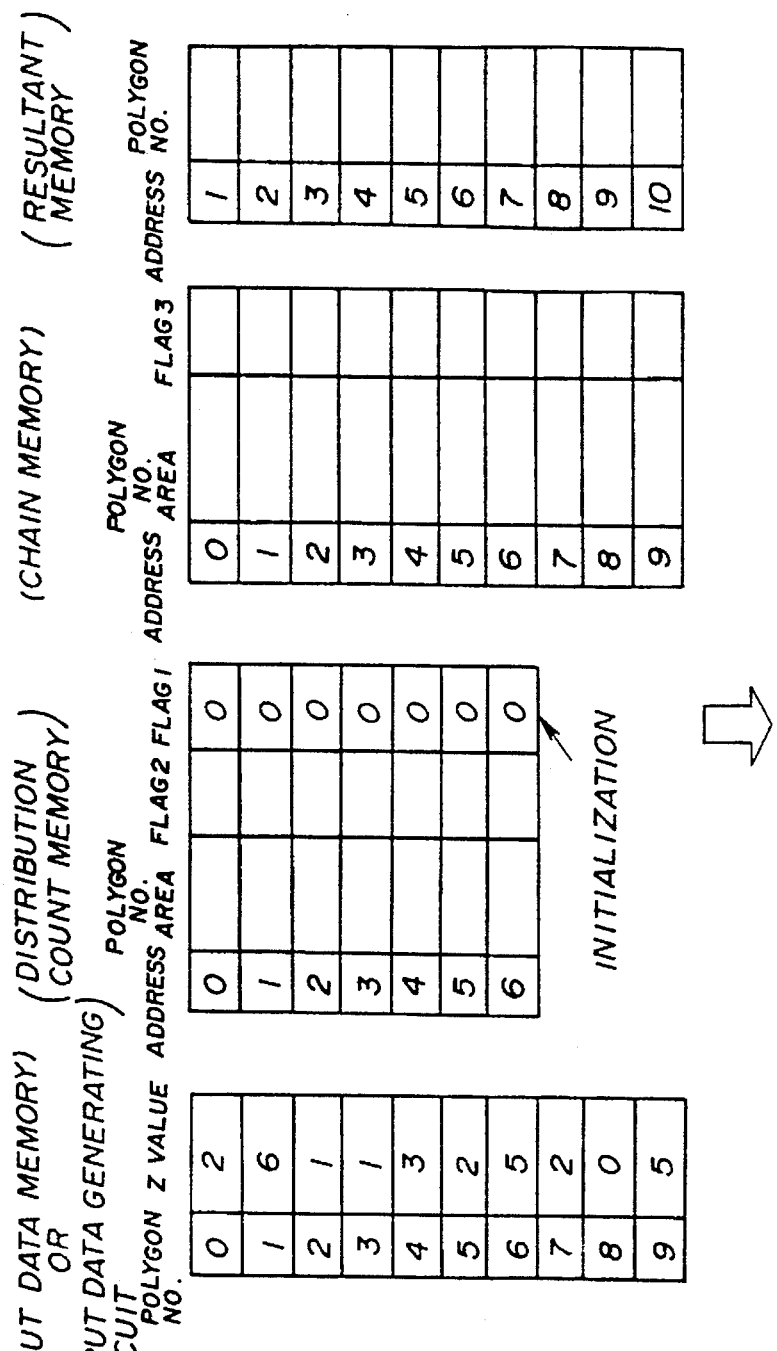
FIGS. 6A through 6O are illustrations, showing contents of each memory, for explaining writing and reading operations.
Figure 6B:
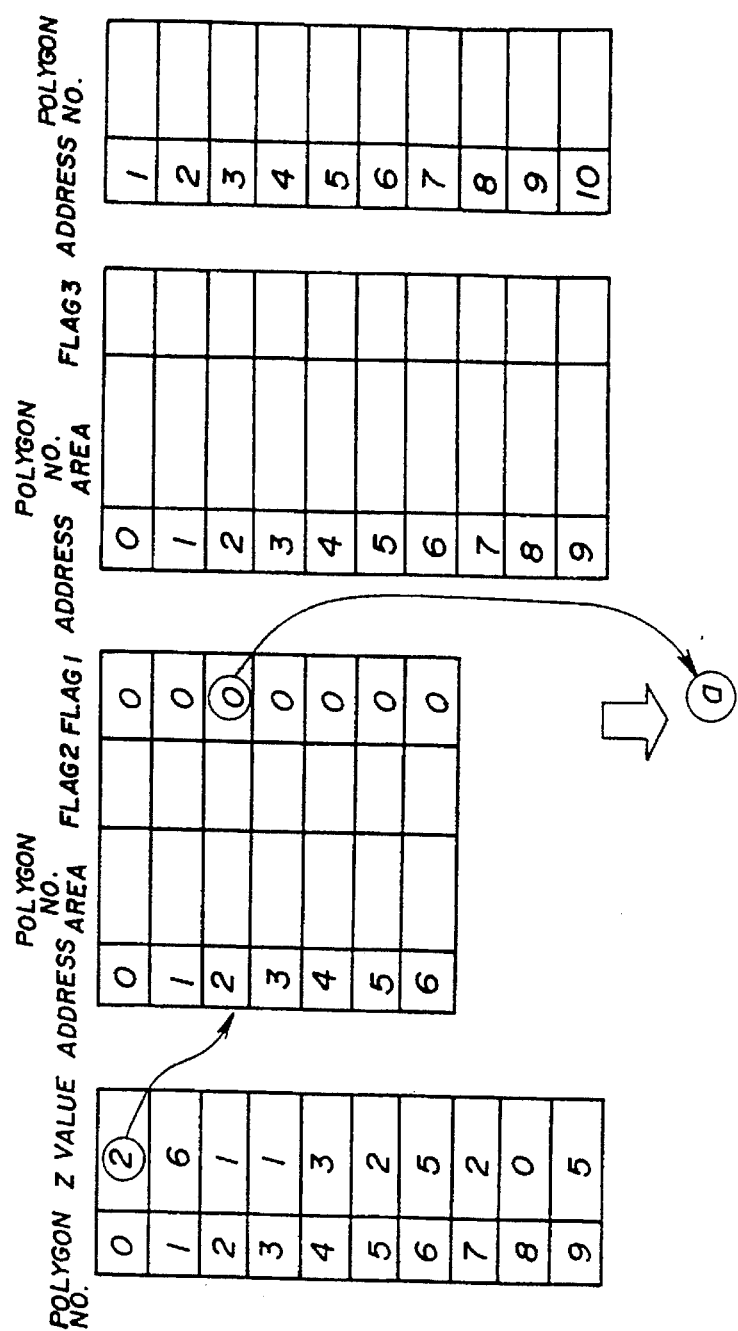
Figure 6C:
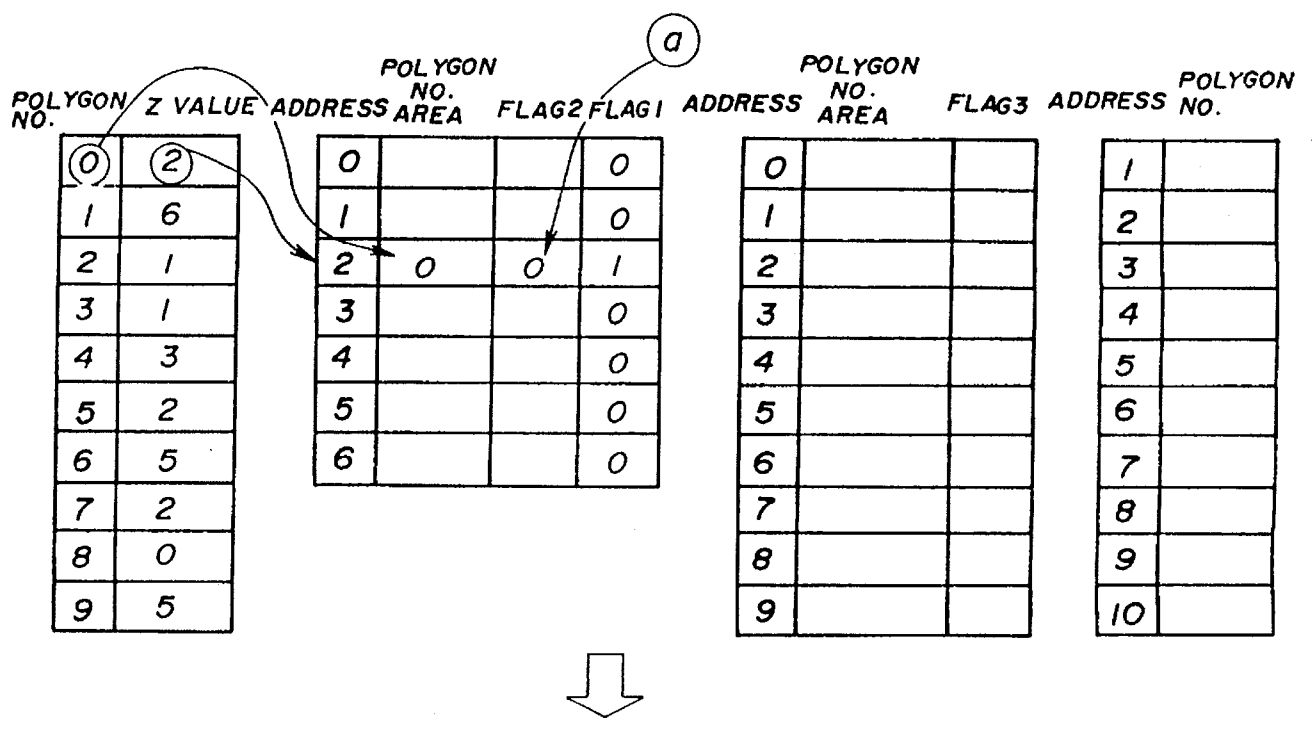
Figure 6D:
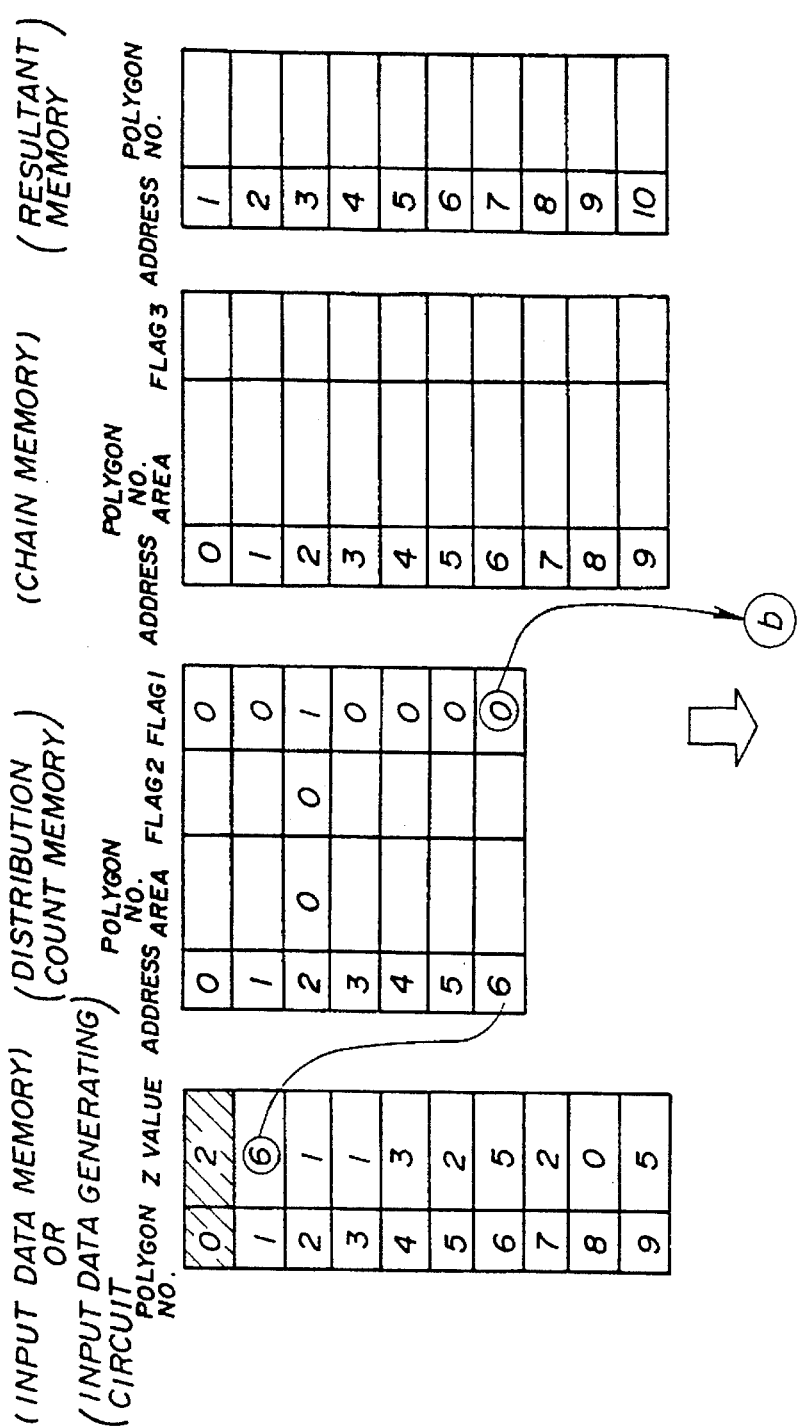
Figure 6E:
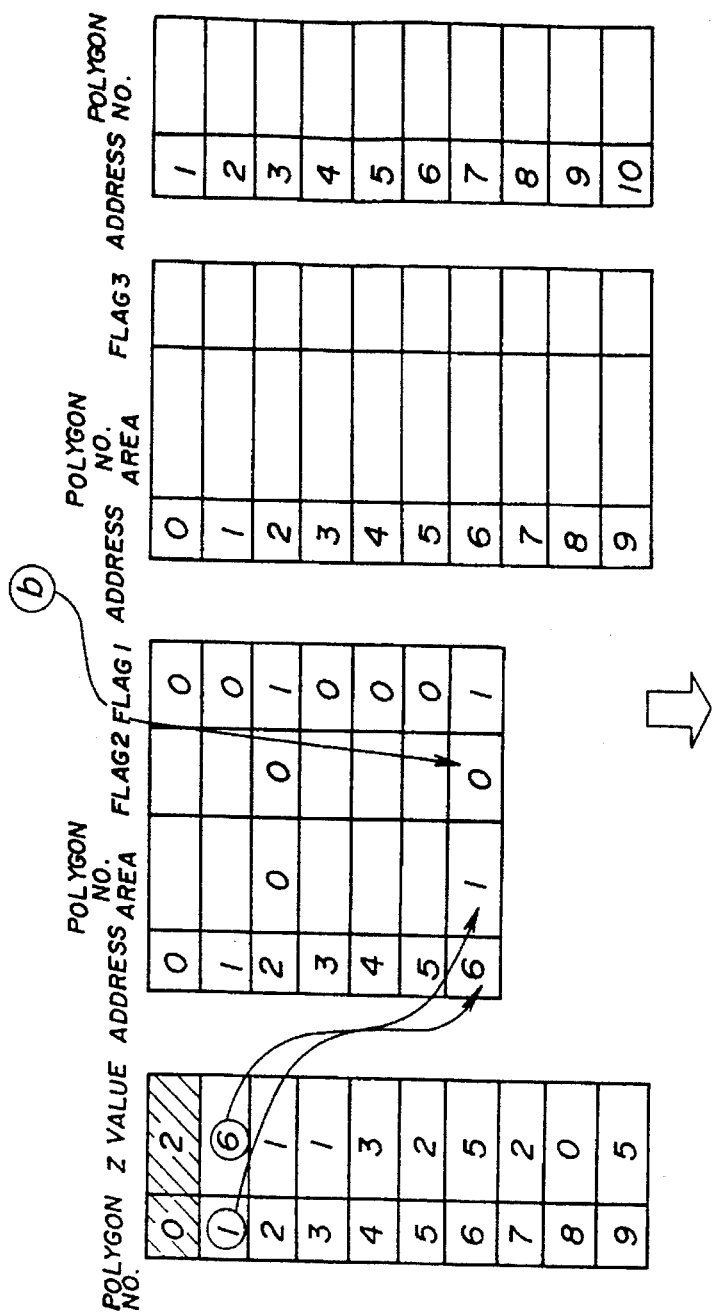
Figure 6F:
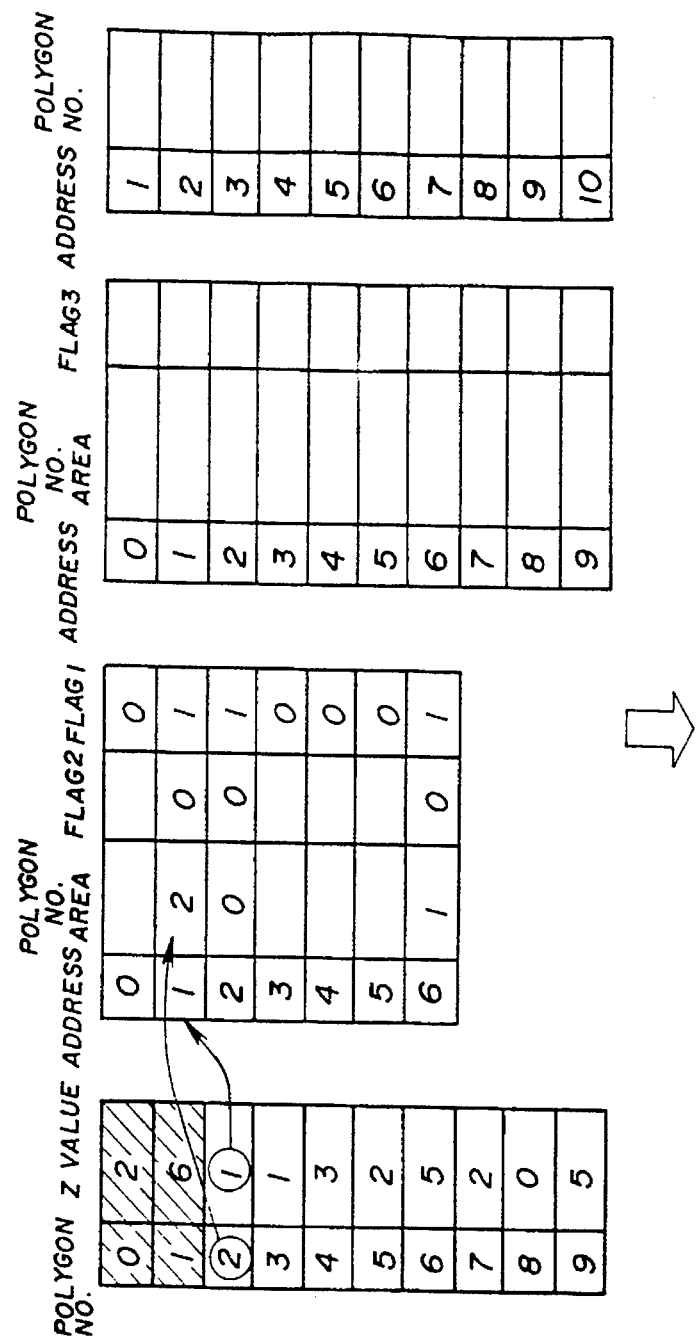
Figure 6G:
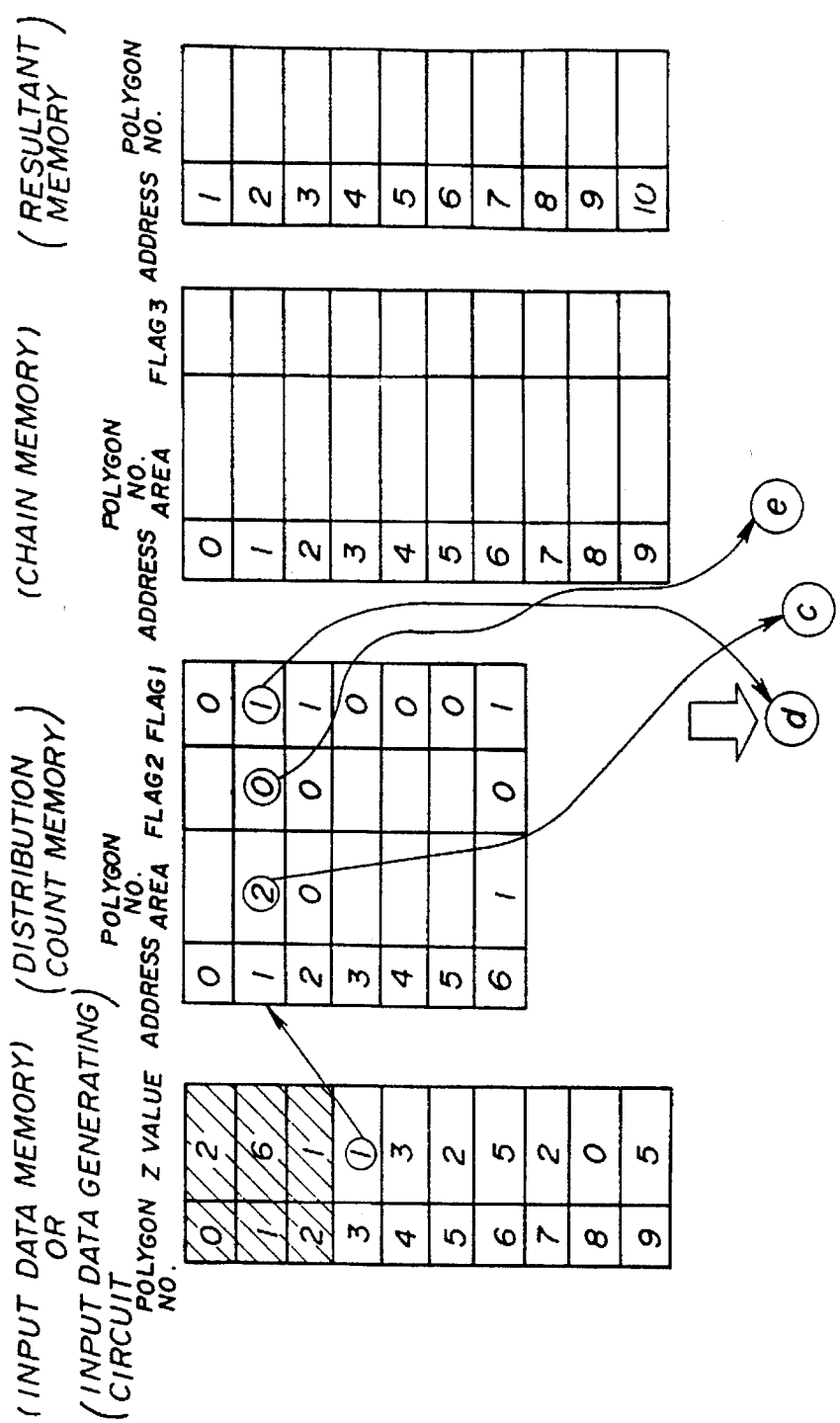
Figure 6H:
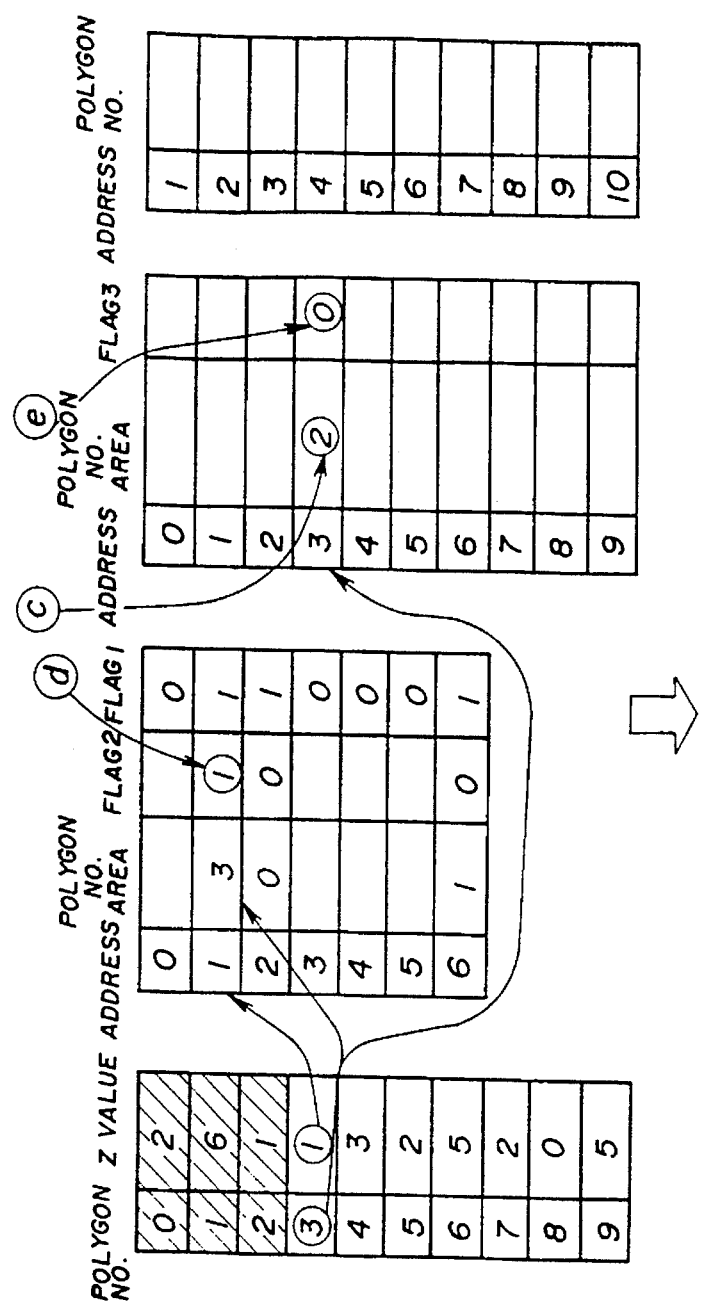
Figure 61:
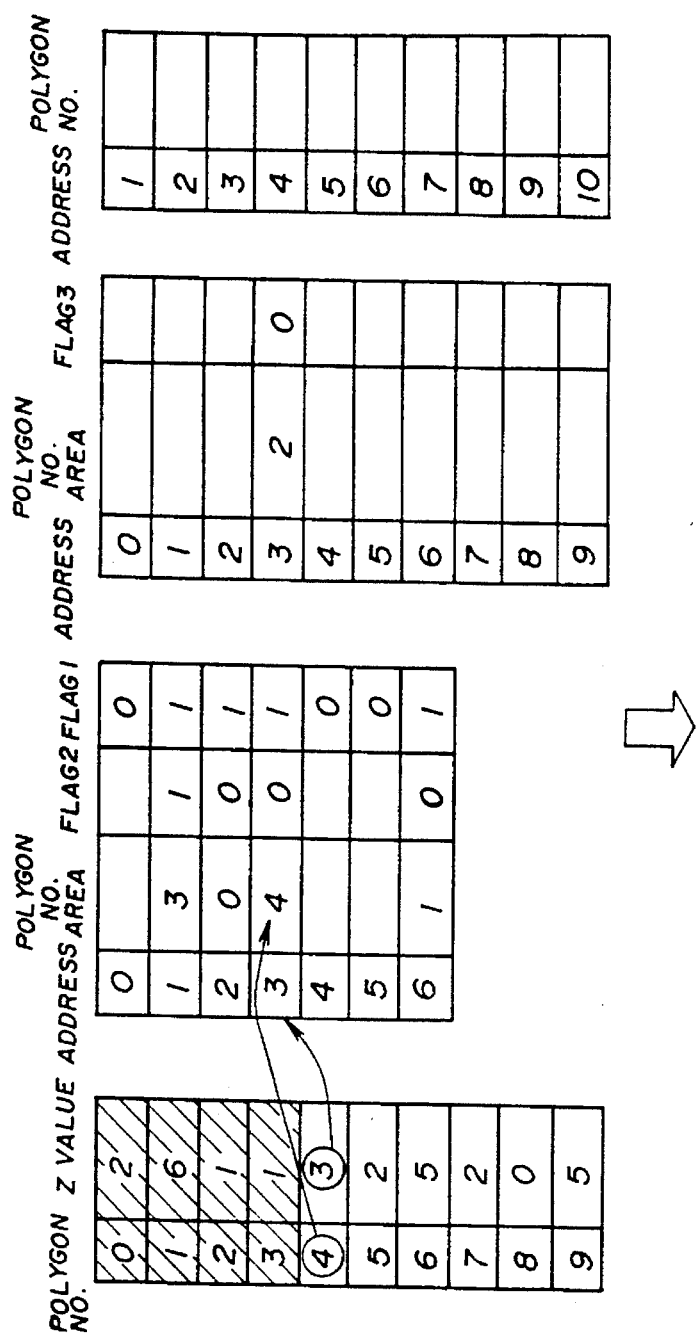
Figure 6J:
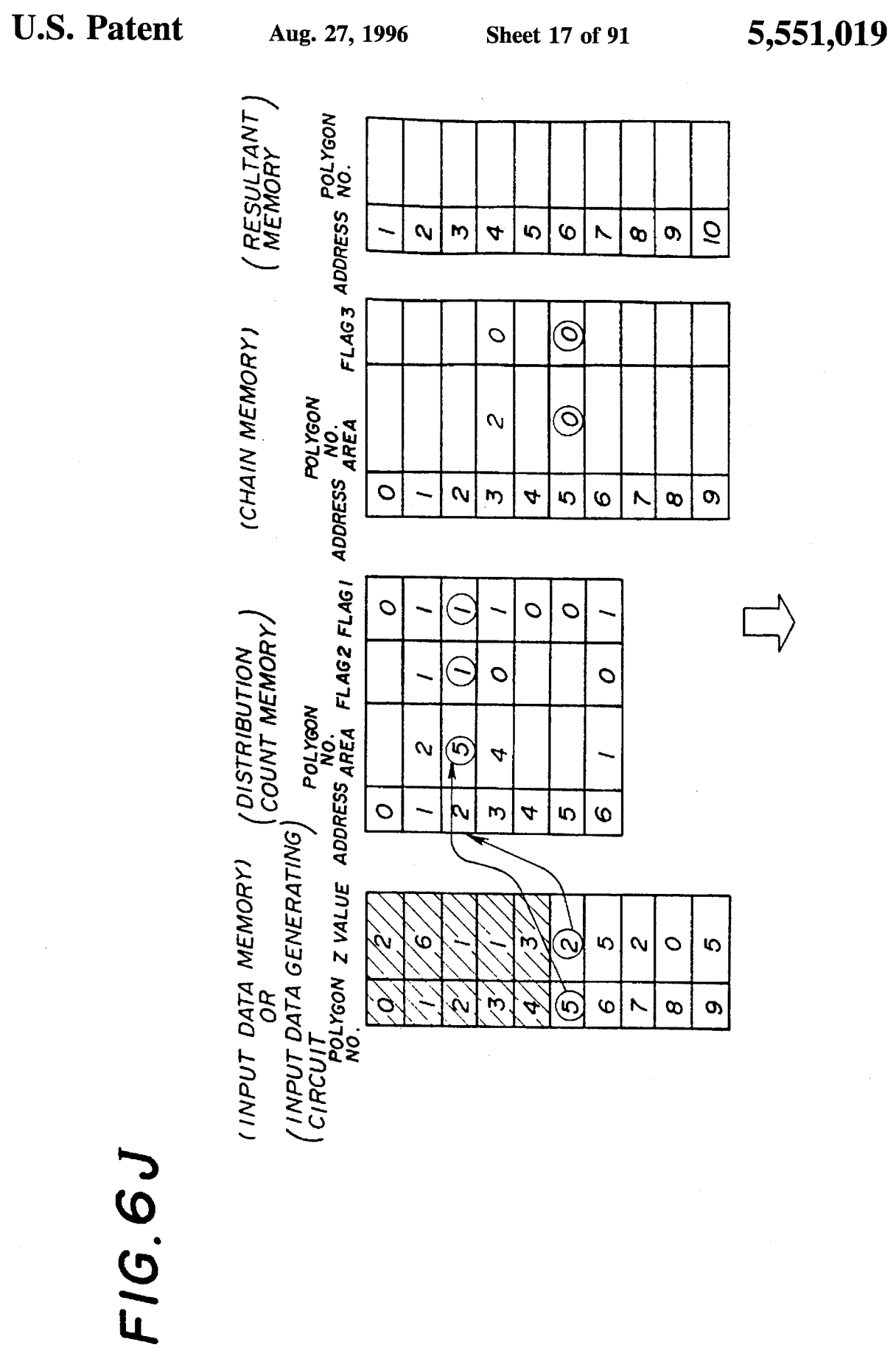
Figure 6K:
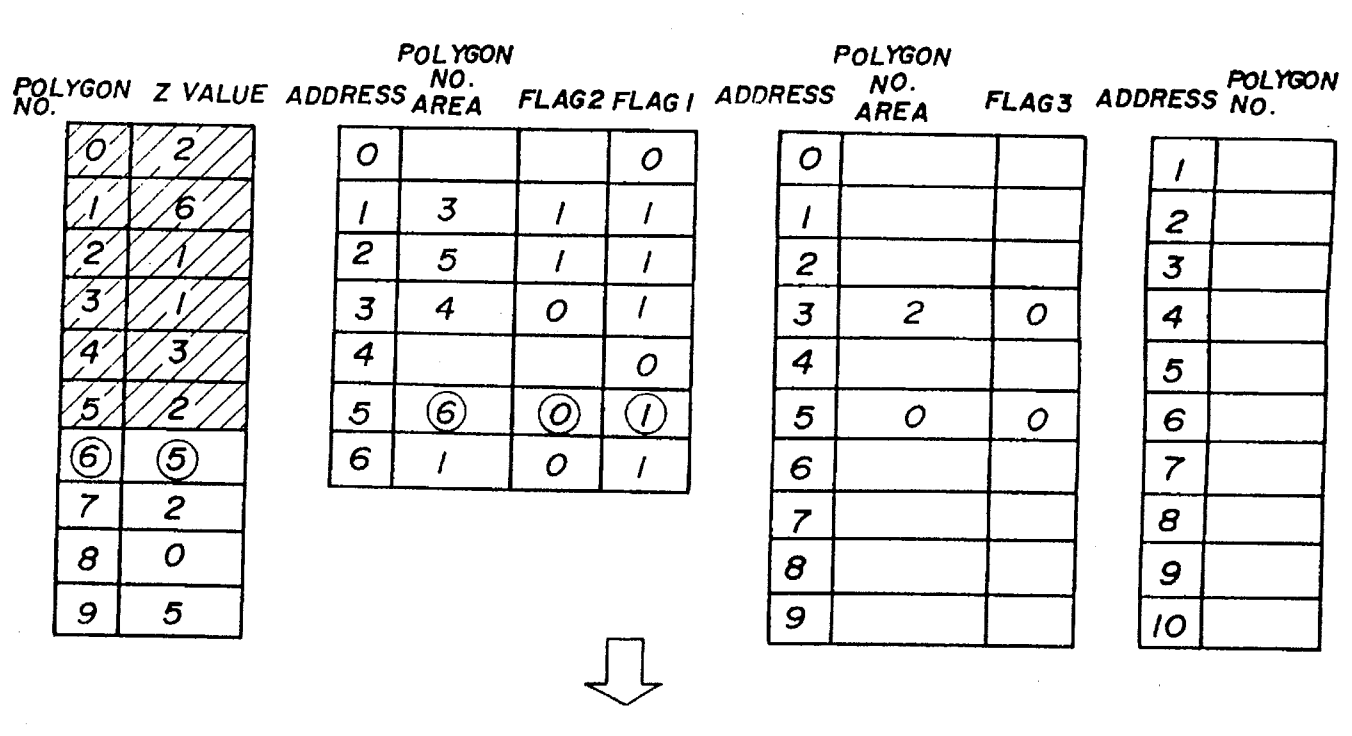
Figure 6L:
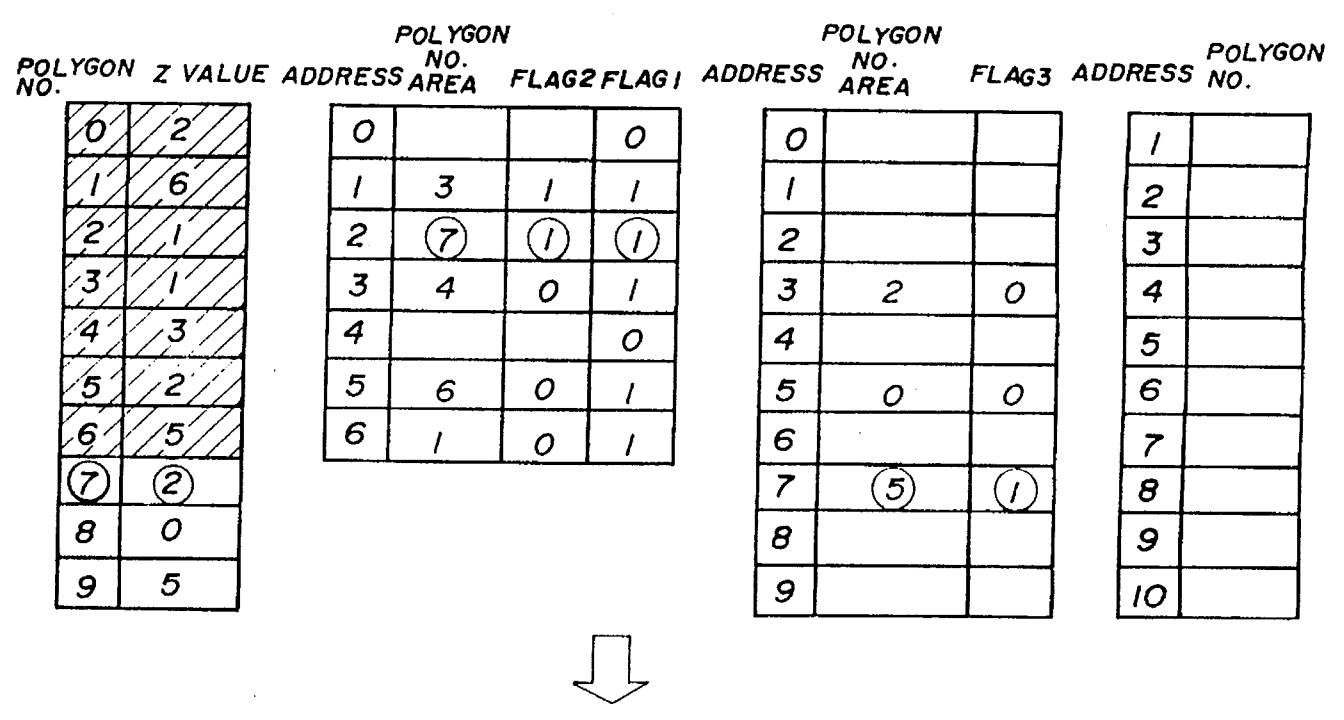
Figure 6M:
Figure 6N:
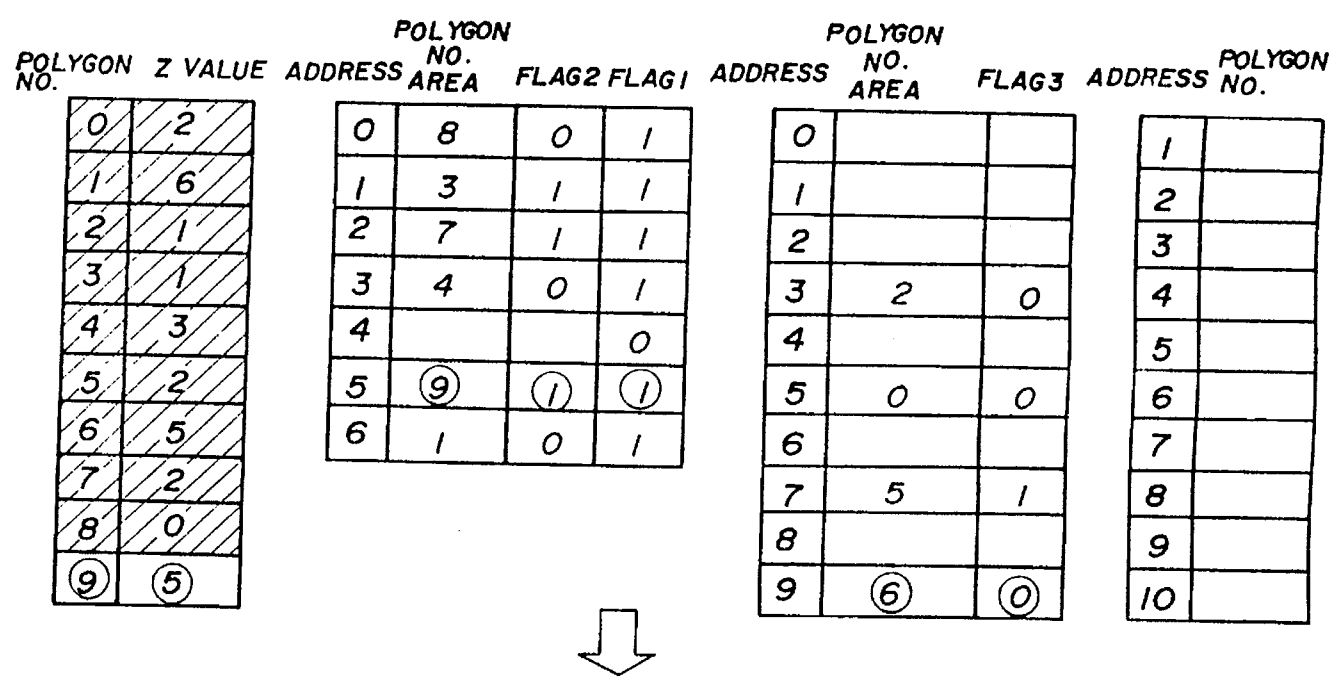
Figure 60:
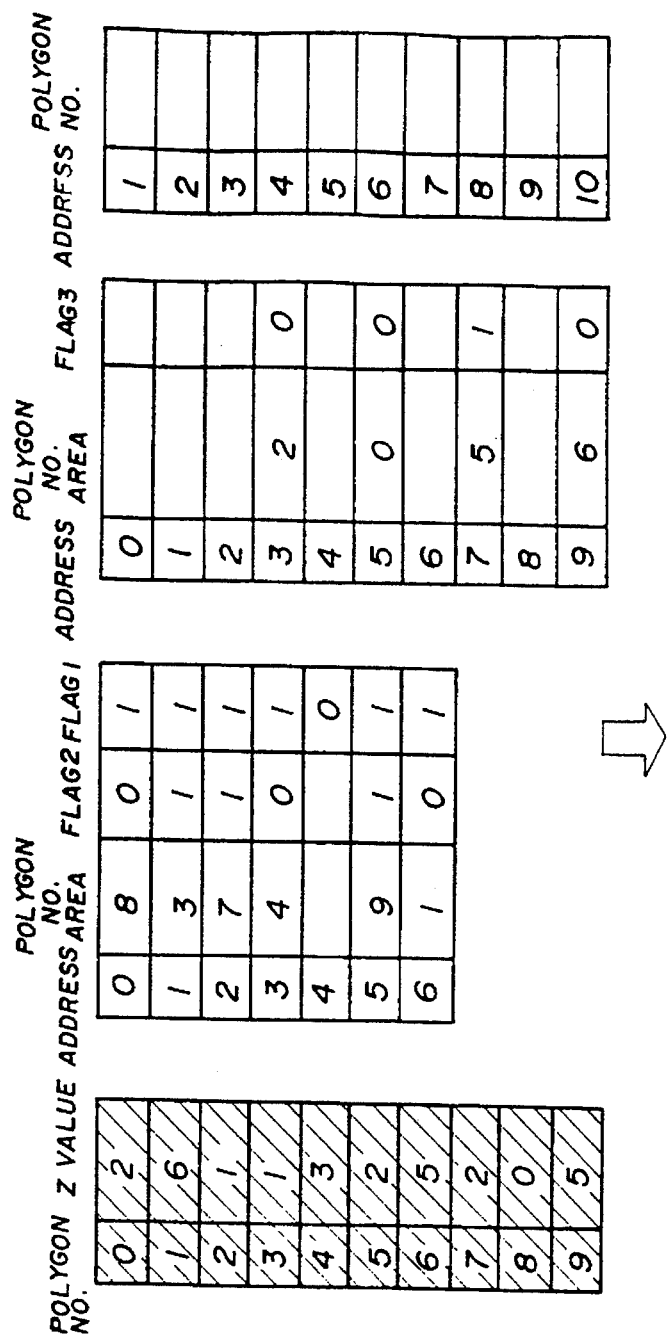

In the first process shown in FIG. 4, the data is written into the distribution count memory 4 and the chain memory 5 in accordance with the polygon No. and Z values supplied by the input data generating circuit 1. In the second process shown in FIG. 5, the polygon No. is written into the resultant memory 6 in order of ascending Z values upon reading of the data in the distribution count memory 4 and the chain memory 5. It should be noted that FIGS. 6 to 13 show states of the memories when the polygon No. is from 0 to 9 and the Z value is from 0 to 6. FIGS. 6A to 6O show the states of the memories in the first process, and FIGS. 7A to 7I show the states of the memories in the second process.

A description will now be given, with reference to FIG. 4, of the first process performed by the controller 3. When the first process is started, the flags 1 are initialized to "0" in step 1 (hereinafter "step" is abbreviated "S"). In this case, the number of polygons N is 10 and the range of the Z value is 0 to 8, and therefore values at the addresses 0 to 8 of the flag 1 area of the distribution count memory 4 are initialized. The polygon No. area and the flag 2 area may be initialized at the same time.

In S2, a polygon No. and a Z value are retrieved. In S3, the data, which is a polygon No. and values in the flag 2 and 1 areas at the address of the distribution count memory 4, which address is indicated by the retrieved Z value, is read out. At this time, the SEL 9 in FIG. 1 supplies the Z value to the address of the distribution count memory 4. The distribution count memory 4 is in the read state.

In S4, it is determined whether or not the value of flag 1 (f1) is equal to "0". If f1 is equal to "0", the routine proceeds to S5 where the data is written, at the address indicated by the Z value, in the distribution count memory 4. The polygon No. is written in the polygon number area (herein after the polygon No. to be newly written is called "PNO"); the value of f1 is written in the flag 2 area; and the value 1 is written in the flag 1 area. At this time, the distribution count memory 4 is in a write state. That is, in the REG 12, a logic high (H) signal is included, as a flag 1 signal, to the polygon No. data signal, and a flag 2 signal is included through a signal line supplying the flag 2 signal. The process performed in S5 corresponds to, for example, an illustration shown in FIG. 6C and FIG. 6E.

In S6, it is determined whether or not the first process is completed. If the first process is not completed, the routine returns to S2, and if it is completed, the routine proceeds to the second process.

If it is determined, in S4, that f1 is not equal to "0", that is, if the polygon No. has already been written in the corresponding address in the polygon No. area of the distribution count memory 4 (hereinafter the polygon No. which has been already written is called "BUNO"), the routine proceeds to S7 where BUNO is written in the chain memory 5 at the address indicated by the PNO and f2 is written in the flag 3 area. At this time, the chain memory 5 is in a write state. The SEL 11 is connected to the input data generating circuit 1. The output data of the distribution count memory 4 is input to a data-in terminal (Di) of the chain memory 5 via the REG 13 where the flag 2 signal is added to the output data. After the process in S7 is completed, the routine then proceeds to S5. The process from S7 to S5 corresponds to, for example, illustrations shown in FIGS. 6G and 6H.

After the processes from S2 to S6 have been repeated until all the polygons are processed, the routine proceeds to the second process. When the routine proceeds to the second process, That is, when the first process is completed, the contents of the distribution count memory 4 and the chain memory 5 are as shown in FIG. 6O.

In the second process, first in S8, the BUCNT 7 and the STCNT 8 are initialized. The BUCNT 7 provides addresses to the distribution count memory 4, and the STCNT 8 provides addresses to the resultant memory 6.

The data in the distribution count memory 4 addressed by the count value of the BUCNT 7 is then read out in S9. Accordingly, in the distribution count memory 4, since BUCNT starts with a value of "0", the data at the address number "0" is read out. This process is described in the illustration of FIG. 7A. At this time, in FIG. 1, the SEL 9 is connected to the BUCNT 7, and the distribution count memory 4 is in a read state.

In S10, it is determined whether or not f1 is equal to "0", that is, it is determined whether or not data is present at the address. If f1 is equal to "0", that is, if no data is present, the routine proceeds to S16.

On the other hand, if f1 is not equal to "0", the count value of the STCNT 8 is incremented, and the BUNO is written, in S11, into the resultant memory 6 at the address indicated by the count value of the STCNT 8. It should be noted that writing to the resultant memory 6 begins not from address "0" but from address "1". This is because the address "0" is reserved, if necessary, for writing the number of processed polygons. The process performed in S11 is illustrated in FIG. 7B.

In S12, it is determined whether or not the value of flag 2 (f2) is equal to "0", that is, it is determined whether or not there is a polygon having the same Z value. If f2 is equal to "0", that is, if there is no polygon having the same Z value, the routine proceeds to S16.

Figure 7A:
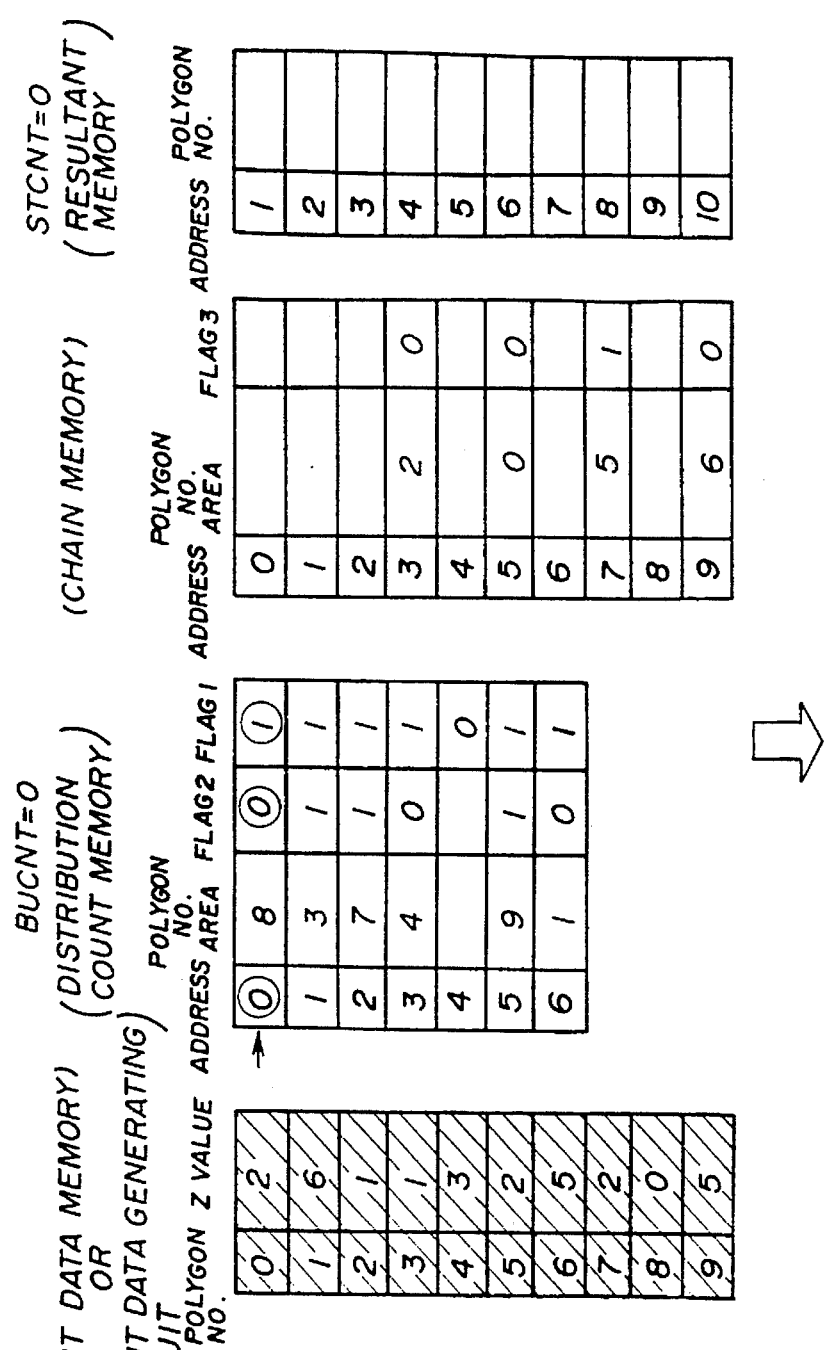
Figure 7B:
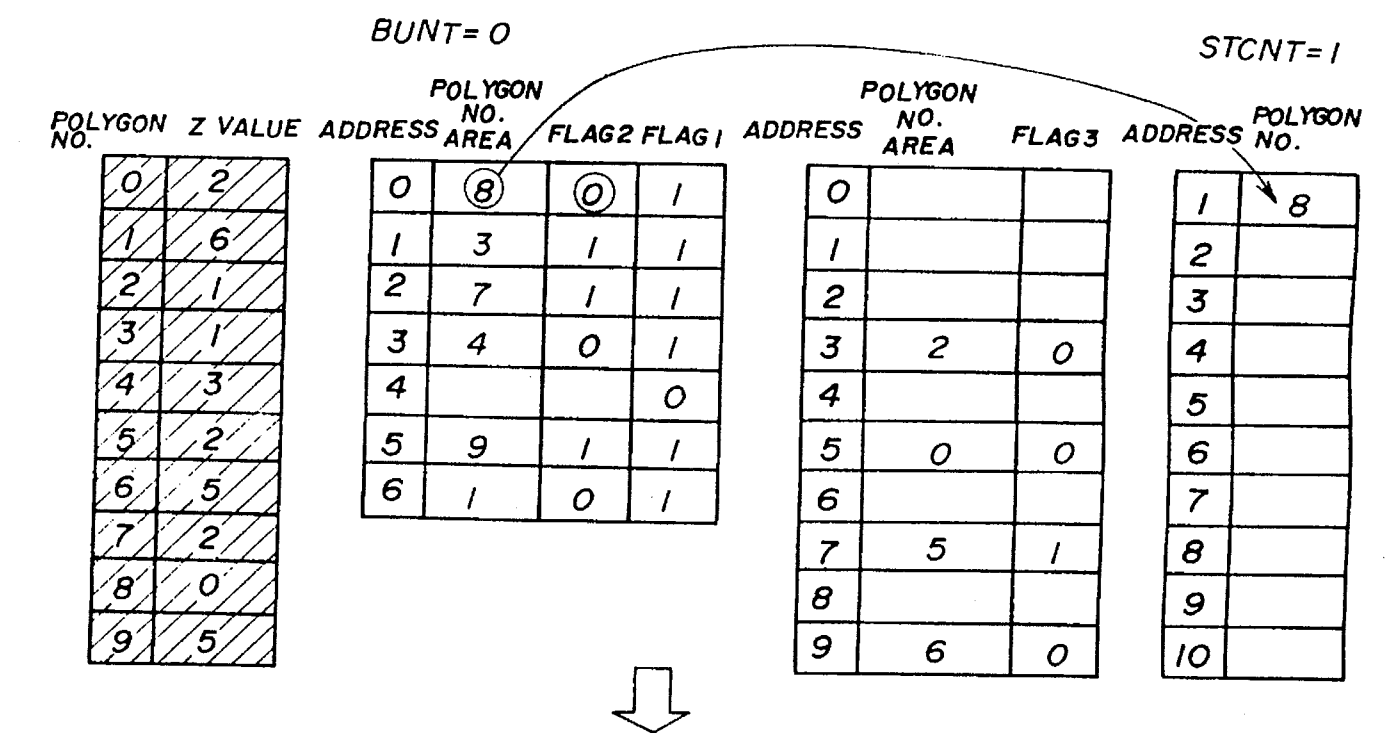
Figure 7C:
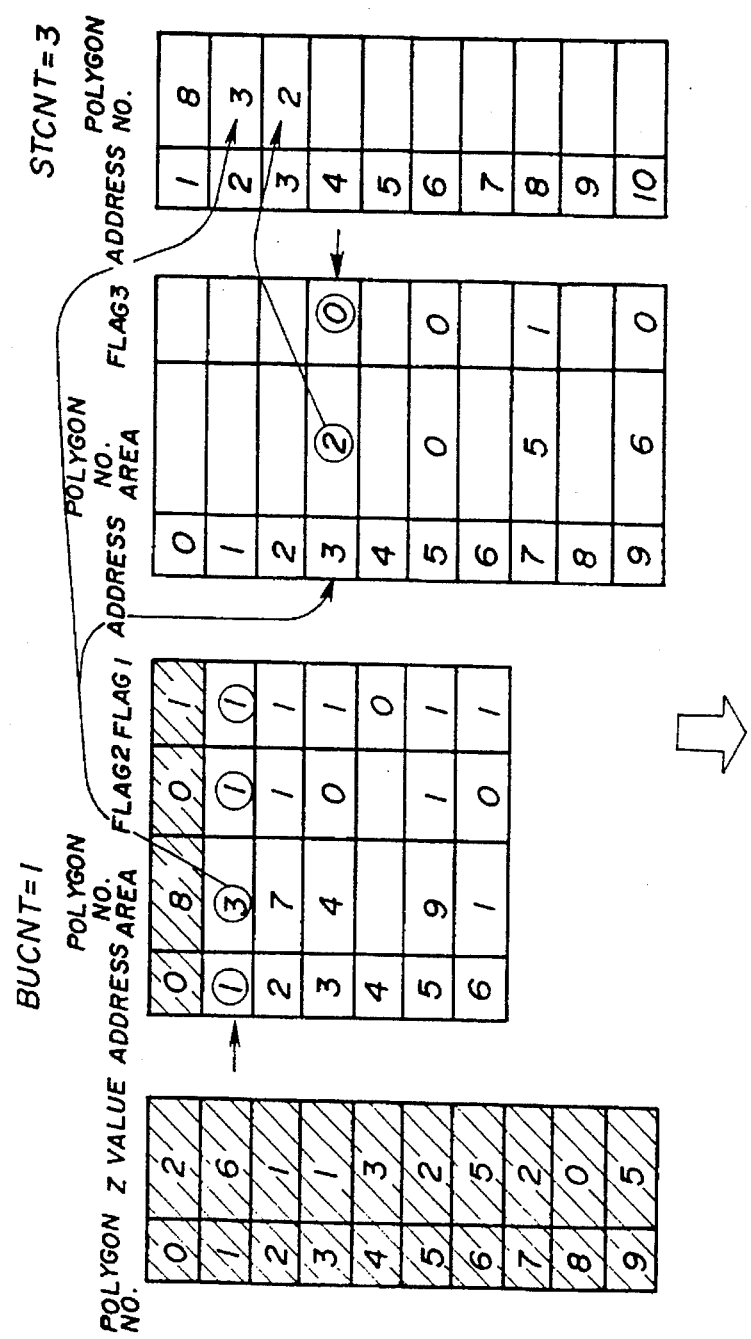
Figure 7D:
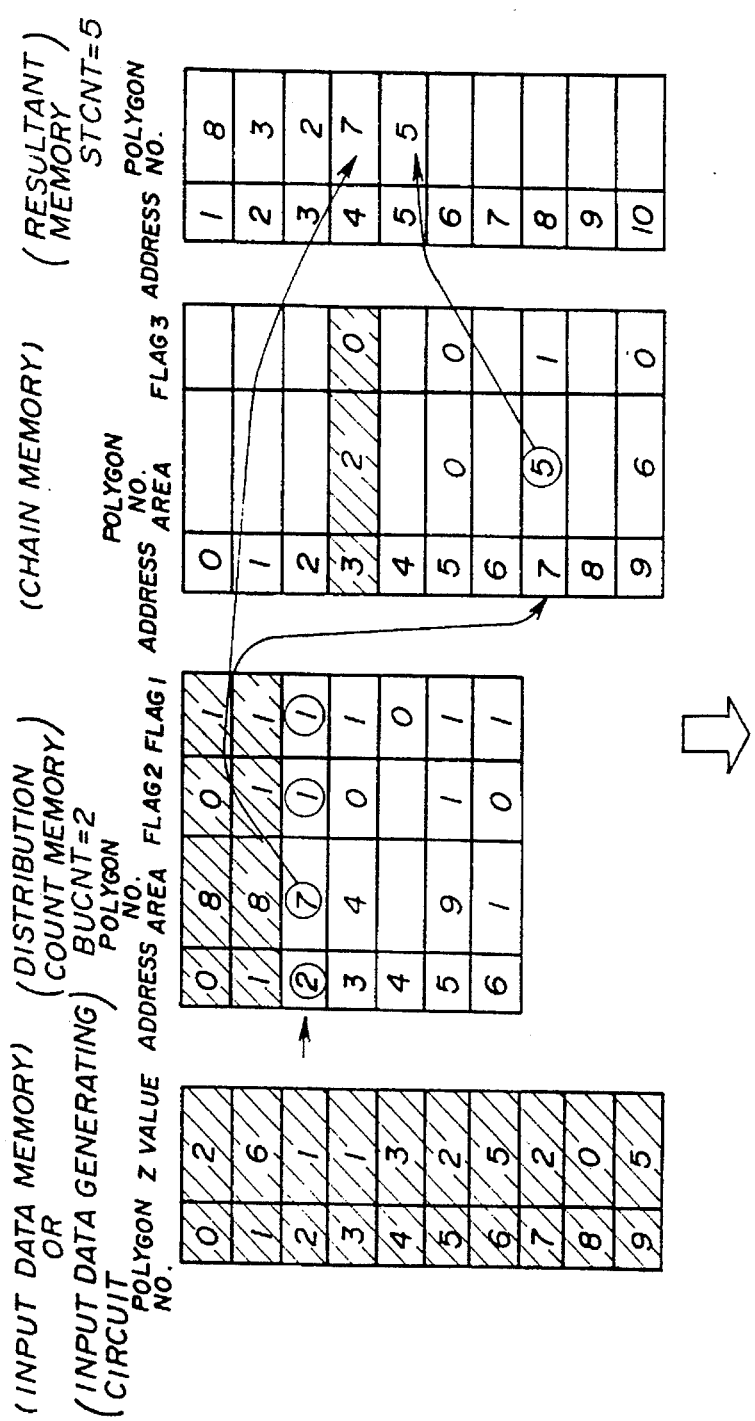

If f2 is not equal to "0", the data in chain memory 5 addressed by the BUNO is read out in S13. The count value of the STCNT 8 is then incremented, and the data, called the CHNO, is written, in S14, into the resultant memory 6 at the address indicated by the count value of the STCNT 8; the CHNO being a polygon number stored at the corresponding address in the chain memory. The process performed in S14 is, for example, shown in an illustration shown in FIG. 7C. That is, as shown in FIG. 7C, the BUNO "3" referenced by the address value "1" of the distribution count memory 4 is written to the address "2" of the resultant memory 8, and CHNO "2" of the chain memory 5 referenced by the BUNO of "3" is written to the address "3" in the resultant memory 6.

Figure 7E:
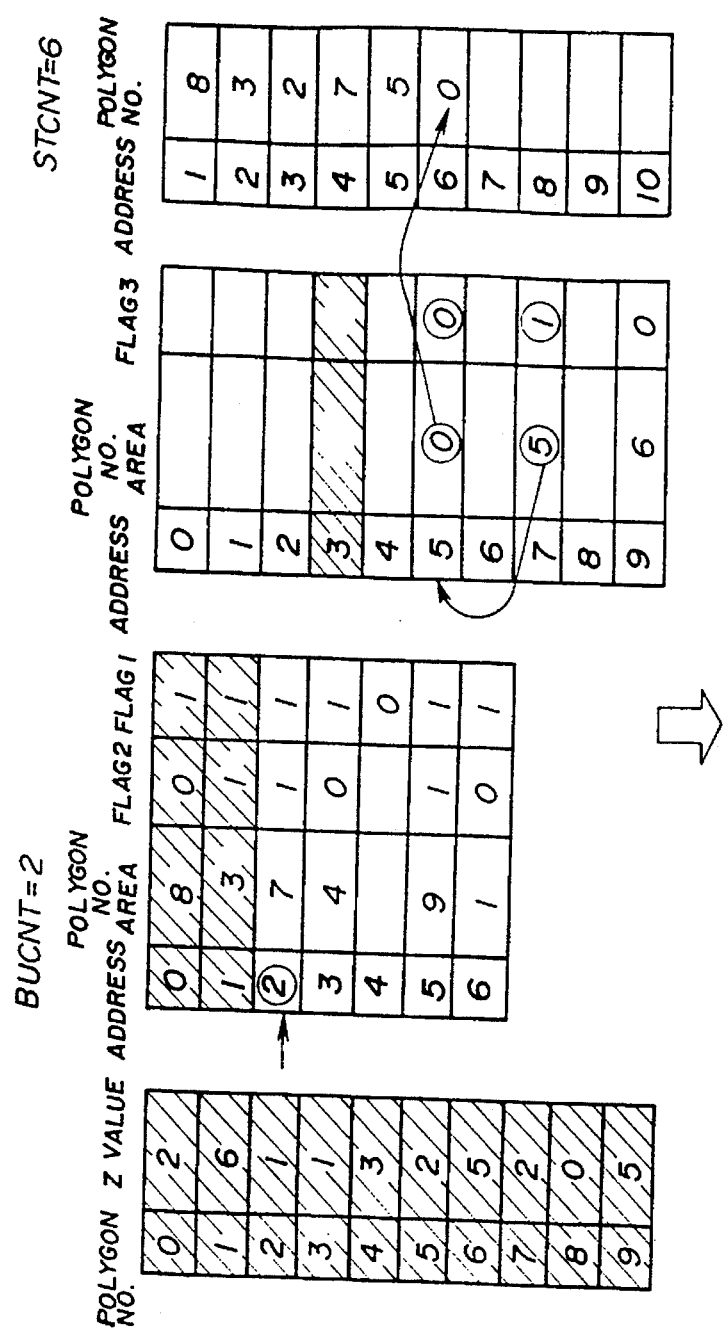
Figure 7F:
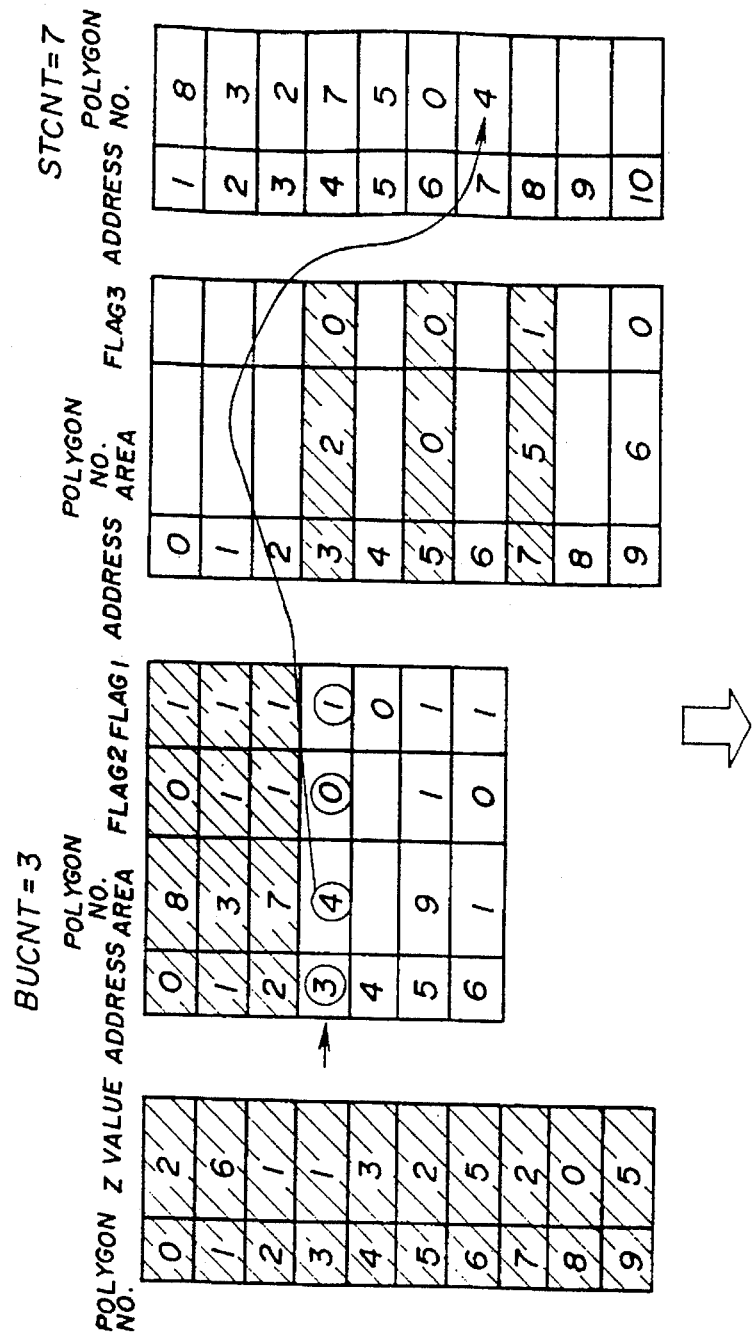
Figure 7G:
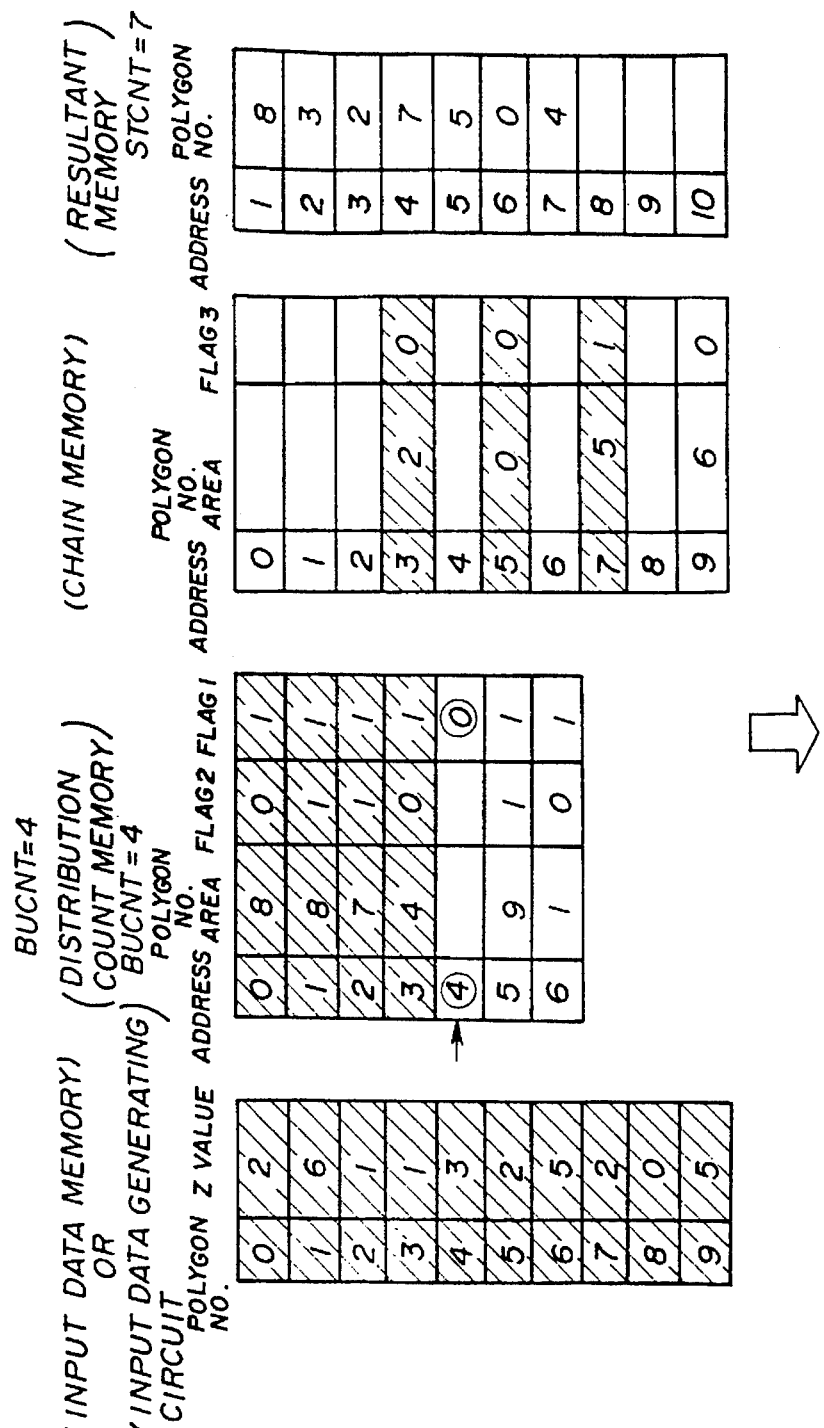
Figure 7H:
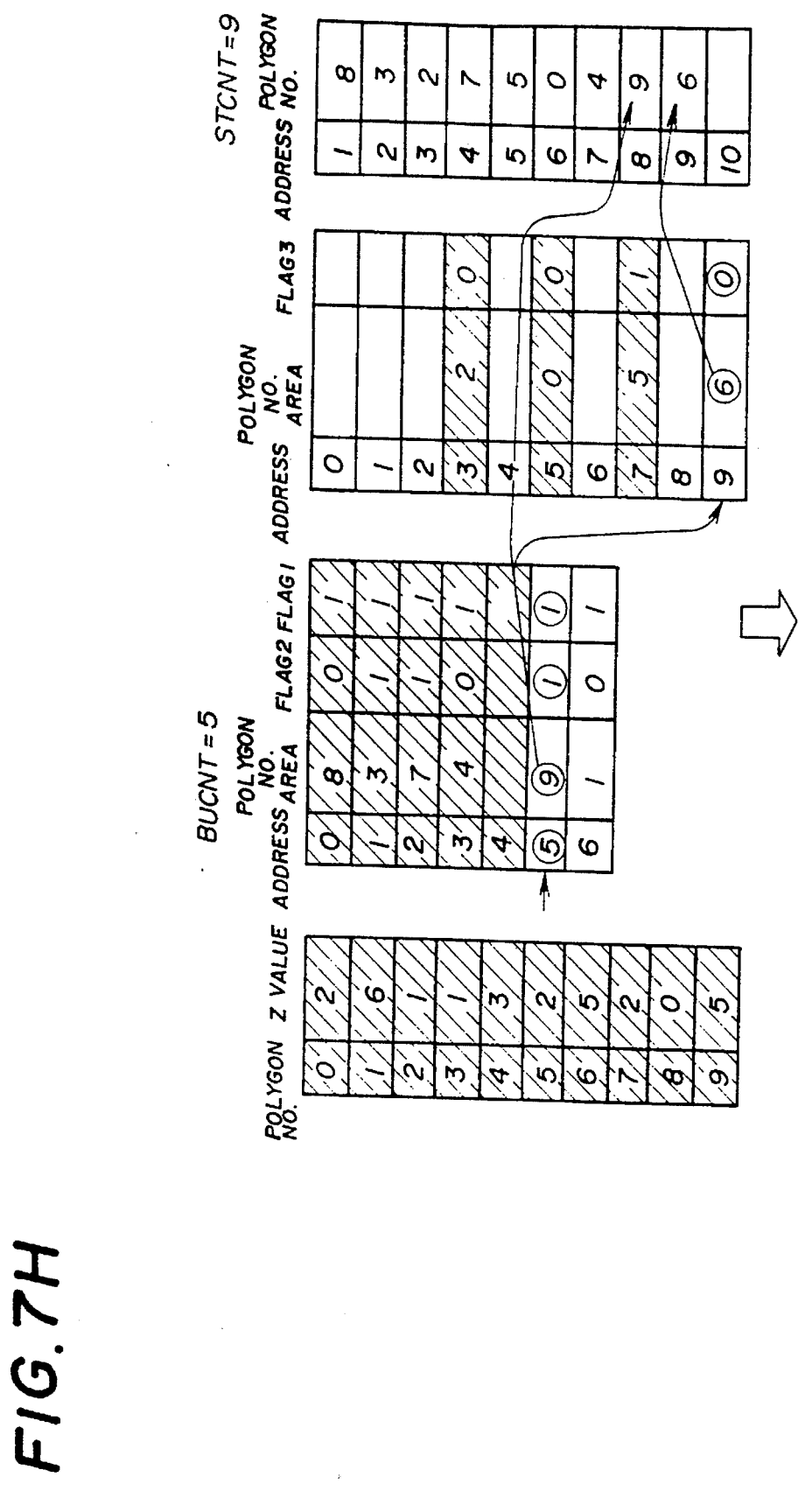

It is then determined, in S15, whether or not the value of flag 3 (f3) is equal to "0". If f3 is equal to "0", the routine proceeds to S16. If f3 is not equal to "0", the processes of S13 and S14 are repeated. That is, if f3 is not equal to "0", which indicates that a chain of polygons is needed, the CHNO at the address of the chain memory 5 indicated by the BUNO is read out, and the read CHNO is written into the incremented address number in the resultant memory 6. This process is described, for example, in illustrations shown in FIGS. 7D and 7E. That is, as shown in FIG. 7E, since f3 of the address number "7" is "1", the CHNO "0" indicated by the CHNO "5" at the address "7" is written to the address "6" of the resultant memory 6.

In S16, it is determined whether or not the count value of the BUCNT is equal to or greater than 6. If not, the count value of the BUCNT is incremented in S17, and then the routine returns to S9 to repeat the above mentioned processes in accordance with the incremented address number. If it is determined that the count value of the BUCNT is equal to or greater than 6, the routine ends.

When the above-mentioned second process is completed, the PNOs are stored, as shown in FIG. 7I, in the resultant memory 6 in ascending order of corresponding Z values. That is, a sorting operation has been performed.

A description will now be given of the speed of the above-mentioned sorting operation. It should be noted that it is assumed that the number of polygons is N and the number of bits of the Z value is M.

Figure 8:
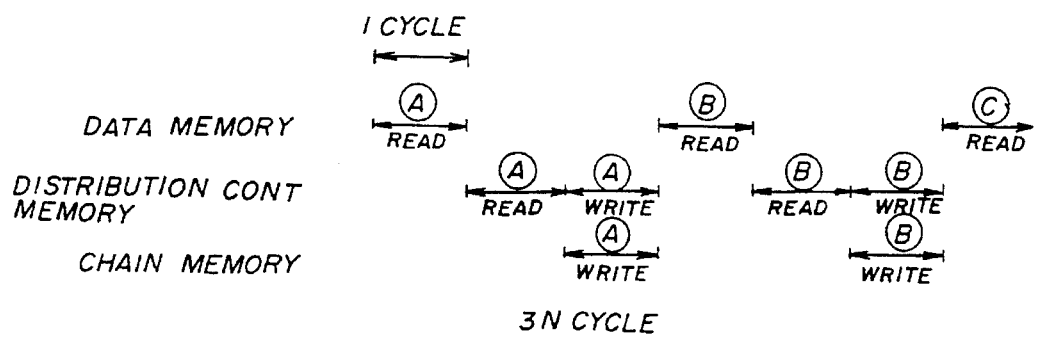
FIG. 8 is an illustration showing a state of each memory in the first process in which a pipeline is used.
Figure 9:
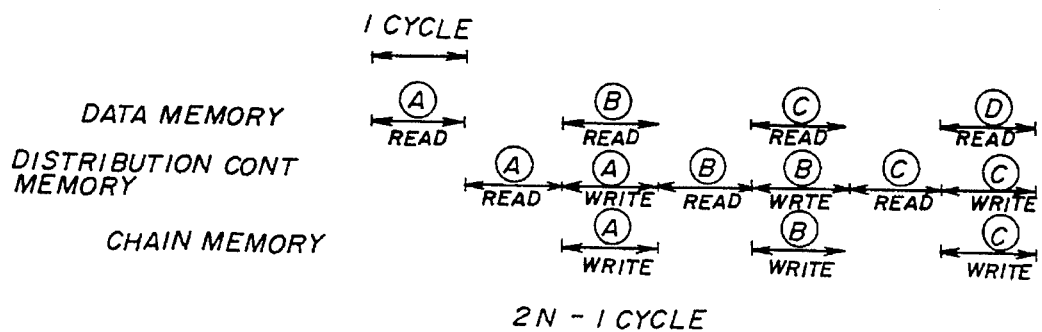
FIG. 9 is an illustration showing a state of each memory in the first process in which a pipeline is not used.

In the first process, the total of $(3N+2^M)$ cycles are needed. This number of cycles includes $2^M$ cycles for initialization of the distribution count memory, N cycles for reading the data memory, N cycles for reading the distribution count memory, and N cycles for writing the distribution count memory or for writing the distribution count memory and the chain memory. This corresponds to the case where a pipeline is not used as shown in FIG. 8. When a pipeline is used, the number of cycles is $(2N+1+2^M)$ as shown in FIG. 9.

Figure 10:
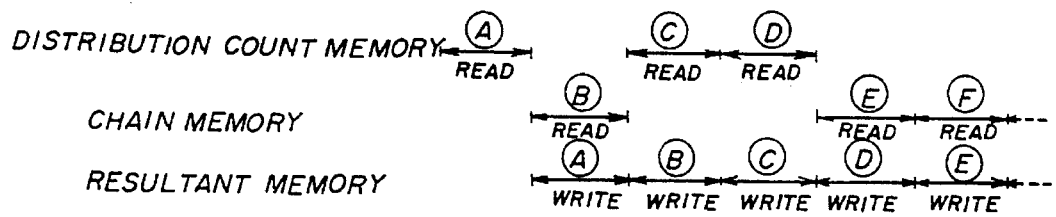
FIG. 10 is an illustration showing a state of each memory in the second process when an initialization is performed in the first process.

In the second process, when the initialization is performed in the first process, a total of $(N+1+2^M)$ cycles are needed. This number of cycles includes, as shown in FIG. 10, $2^M$ cycles for reading the distribution count memory from address number "0" to "$(2^M-1)$", and $(N+1)$ cycles for reading the distribution count memory and the chain memory and for writing the resultant memory. Accordingly, the total of cycles of the first and second processes becomes $(3N+2^{M+1}+2)$ cycles.

The reason for performing the initialization in the first process is to allow an increase in the number of polygons to be processed so as to improve image quality. When it is desired in a conventional sorting device to obtain, by increasing the number of frames, improved image quality, for example, to obtain an image having improved reality during a continuous image display operation, a quick response can be applied for processing increased polygons. Accordingly, when two or more frames are to be processed, an initialization for the second and later frames will not be needed.

Figure 11:
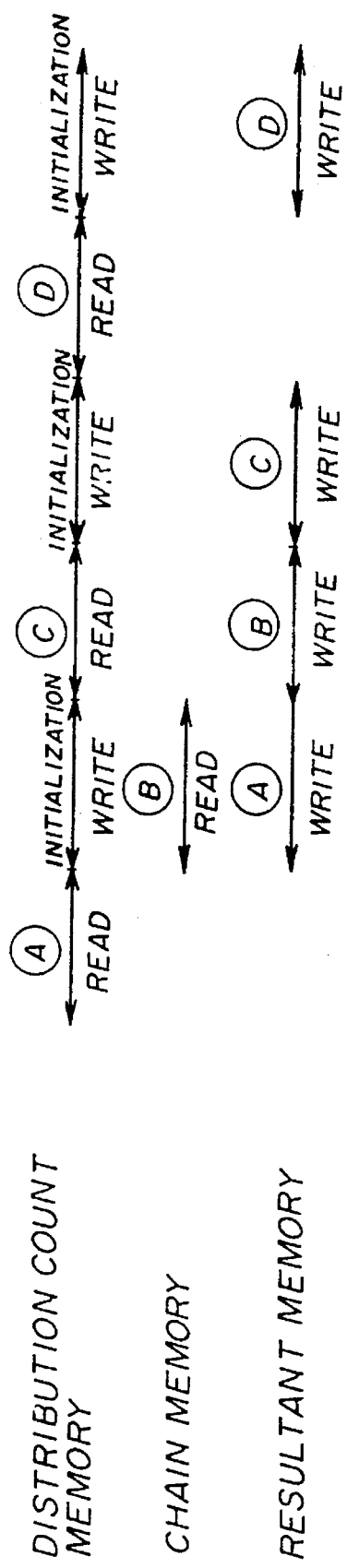
FIG. 11 is an illustration showing a state of each memory in the second process when an initialization is performed in the first process.

On the other hand, if merely processing polygons which can be processed within a single frame, the initialization may be applied, as shown in FIG. 11, after reading the distribution count memory. In such a case, the number of cycles of the first process becomes $(2N+1)$, and thus the total number of cycles becomes $(4N+2^M+1)$. It should be noted that the table of FIG. 12 shows number of cycles and memory capacities (working RAM) for a sorting device.

Although, in the present embodiment, the distribution count memory and chain memory are separated from other memories in order to increase the sorting speed, the two memories can be formed, when there is room, as a part of the data memory or the resultant memory. By doing this, a decrease in costs can be attempted.

Figure 13B:
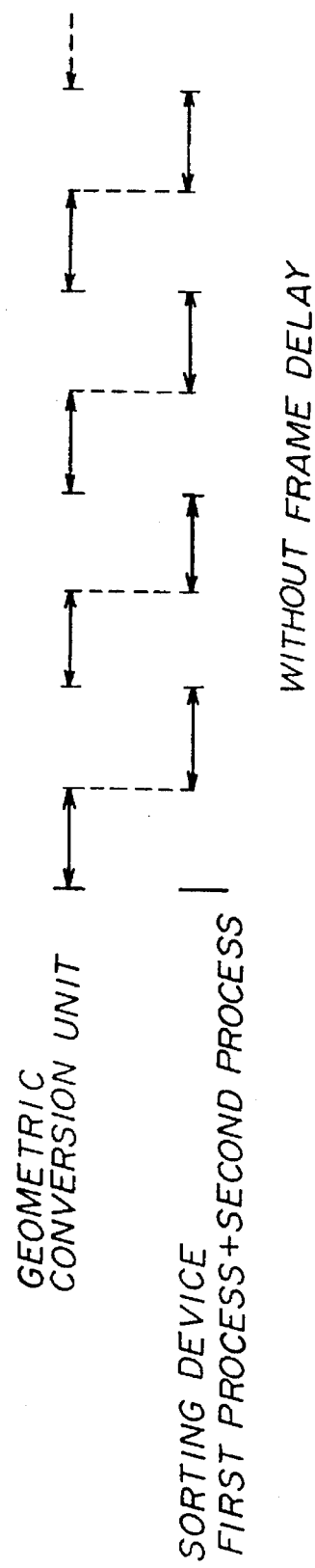

FIGS. 13A to 13C show a relationship between processing time of a geometric conversion unit and that of a sorting device. FIG. 13A shows a time chart obtained when a geometric conversion is applied to a predetermined number of polygons at one time in the first single frame; in the following frame, the same geometric conversion is applied to another predetermined number of polygons while a sorting process is applied to the data obtained by the conversion in the prior frame. Accordingly, in this arrangement, a time period of two frames is needed for completing a sorting of the polygon data from the start of the geometric conversion. FIG. 13B shows a time chart obtained when the geometric conversion and the sorting are performed in a single frame. In such a case, the number of polygons which can be processed is almost one half that in the case of FIG. 13A. FIG. 13C shows a time chart of the present embodiment obtained when the geometric conversion and the first process of the sorting are performed at the same time. That is, the first process is performed each time the data is output from the input data generating circuit 1 shown in FIG. 1, and the second process is started after the geometric conversion is completed. In such a case, the capability of processing polygons is improved compared to the other two cases.

Figure 14:
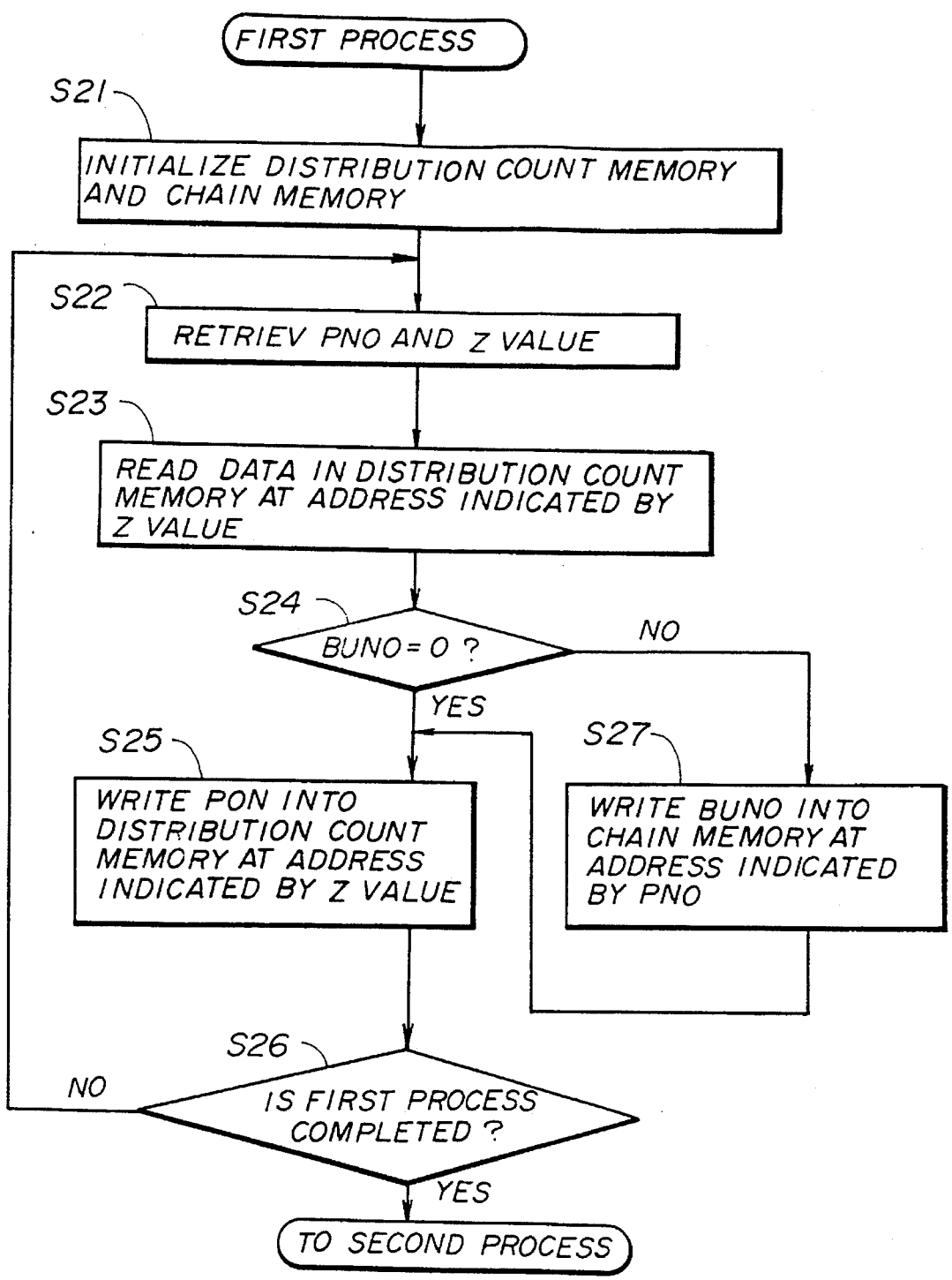
FIG. 14 is a flow chart for showing the first process according to the present invention in which flags are not used.
Figure 15:
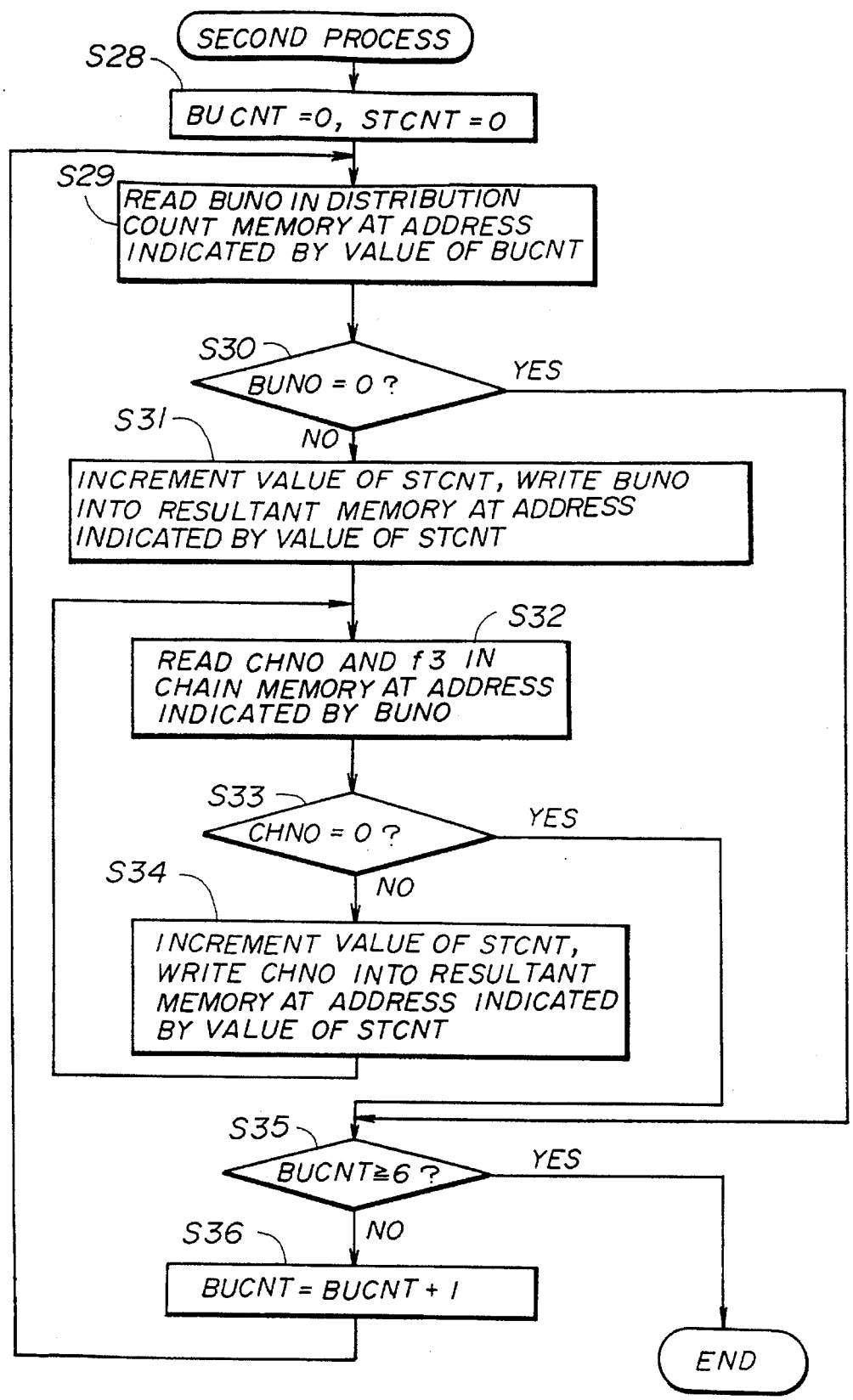
FIG. 15 is a flow chart for showing the second process according to the present invention in which flags are not used.

A description will now be given, with reference to FIGS. 14 and 15, of a second embodiment of the present invention. FIG. 14 is a flow chart of a first process of the second embodiment, and FIG. 15 is a flow chart of the second process of the second embodiment. This embodiment is directed to eliminate the use of the flags 1, 2 and 3.

When the first process is started, the distribution count memory 4 and the chain memory 5 are initialized in S21. The PNO and the Z value are then retrieved in S22. It should be noted that the polygon numbers begin from "1". BUNO, which is the data in the distribution count memory 4 addressed by the Z value, is then read out in S23. It is determined, in S24, whether or not BUNO is equal to "0". If BUNO is equal to "0", that is, if there is no data in the corresponding address of the distribution count memory 4, PNO is written, in S25, into the polygon number area of the distribution count memory 4 at the address indicated by the Z value, and the routine proceeds to S26. It should be noted that the fact that BUNO is equal to "0" corresponds to the fact that f1 is equal to "0" in the first embodiment.

On the other hand, if BUNO is not equal to "0", that is, if there exists data in the corresponding address of the distribution count memory 4, BUNO is written, in S27, into the polygon number area of chain memory 5 indicated by PNO, and then the routine proceeds to S27 via S26.

In S26, it is determined whether or not the first process is completed. If not, the routine returns to S22, and if it is completed, the routine proceeds to the second process shown in FIG. 15.

When the second process is started, the count values of BUCNT and the STCNT are set to "0" in S28. BUNO, which is the data in the distribution count memory 4 addressed by the value of BUCNT, is then read out in S29, and the routine proceeds to S30. In S30, it is determined whether or not BUNO is equal to "0". If BUNO is equal to "0", that is, if there is no data in the corresponding address of the distribution count memory 4, the routine proceeds to S35. If the BUNO is not equal to "0", the routine proceeds to S31 where the count value of the STCNT is incremented and BUNO is written into the resultant memory 6 at the address indicated by the count value of the STCNT. In S32, data in the chain memory 5, CHNO and f3, at the address indicated by BUNO, is read out, and the routine proceeds to S33.

It is determined, in S33, whether or not CHNO is equal to "0". If CHNO is equal to "0", that is, if there is no data in the corresponding address of the chain memory 5, the routine proceeds to S35. If not, the routine proceeds to S34 where the count value of the STCNT is incremented and CHNO is written into the resultant memory 6 at the address indicated by the count value of the STCNT, and then the routine returns to S32 so as to repeat the process of S32.

The process of S35 and S36 are the same as that in the first embodiment, and descriptions thereof will be omitted.

A description will now be given, with reference to FIGS. 16 to 45B, of a third embodiment of the present invention. The third embodiment is directed to a sorting operation which is effective when the number of bits of the Z value is 16 or more. It should be noted that in this embodiment, flags 1, 2 and 3 are used similarly to the first embodiment. As for the relationship between the processing time of the geometric conversion unit and that of the sorting device, the method shown in FIG. 13C in which the second process is started after the first process is completed is used.

Figure 20:
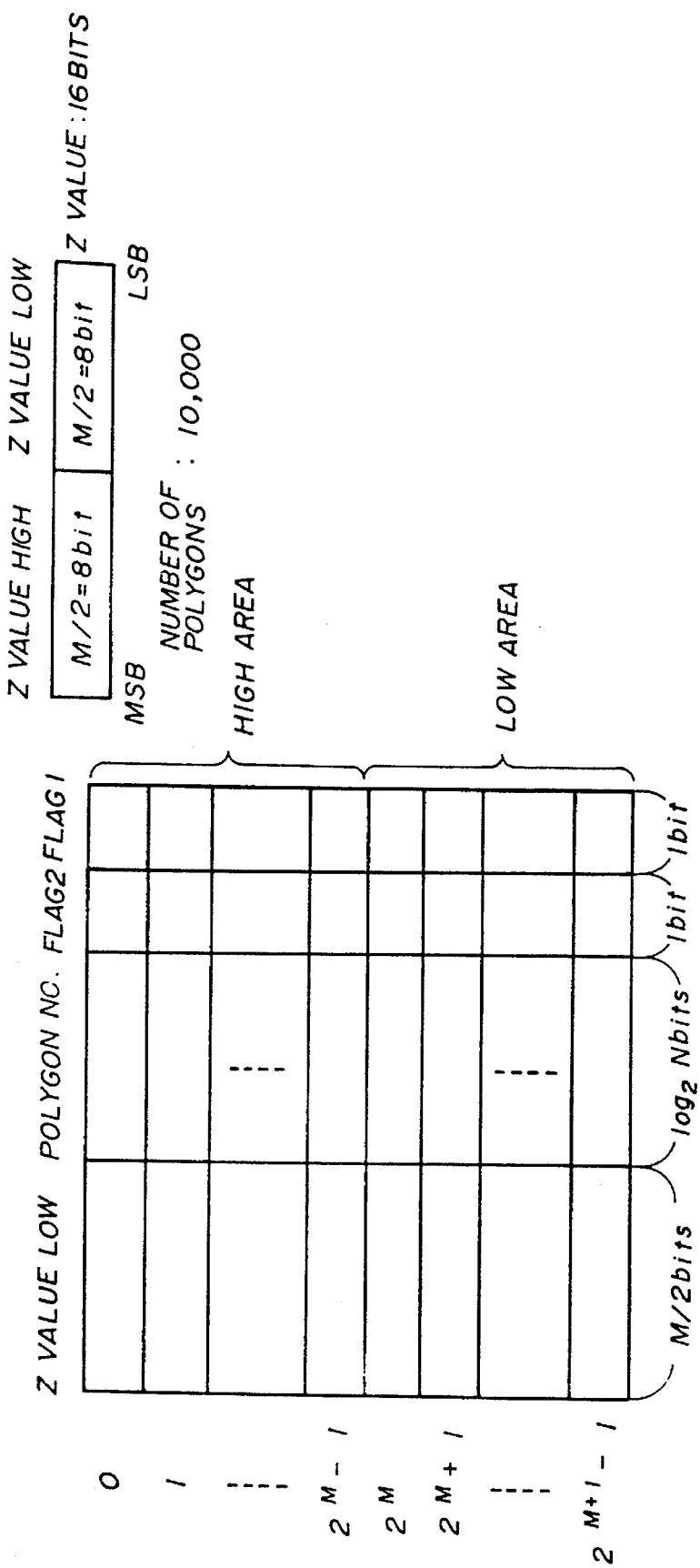
FIG. 20 is an illustration of a format of a distribution count memory having a high area and a low area according to the present invention.
Figure 21:
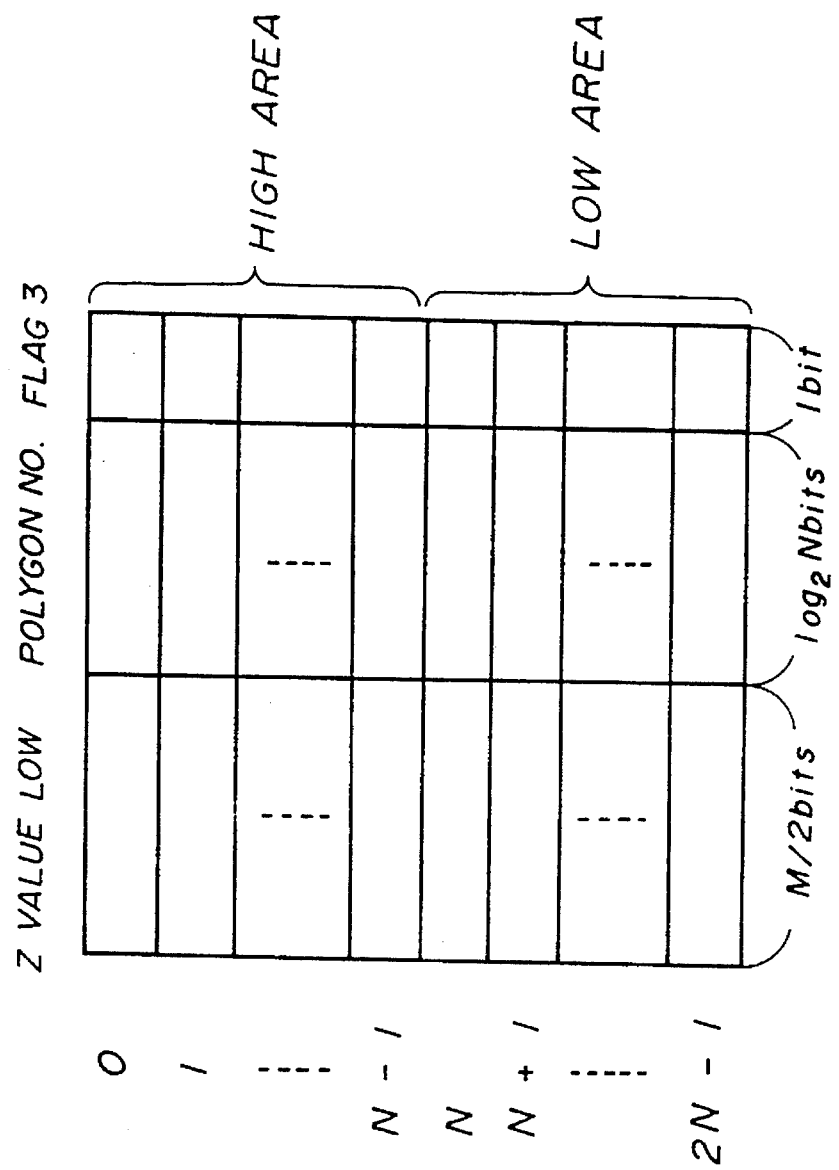
FIG. 21 is an illustration of a format of a chain memory having a high area and a low area according to the present invention.

FIG. 20 is an illustration showing the format of the distribution count memory 4 used in this embodiment. A high area and a low area are provided in the distribution count memory 4. FIG. 21 is an illustration showing a format of the chain memory 5 used in this embodiment. Similarly to the distribution value memory 4, the chain memory 5 is provided with a high area and a low area. The high area is an area for processing the most significant half (MSB) of the bit structure of the Z value and the low area is for the least significant half (LSB) of the bit structure.

A description will now be given of an outline of the present embodiment. As mentioned above, the distribution value memory 4 and the chain memory 5 are divided into the high area and the low area. The first process is performed on the high portion of the Z value, and the second process is applied to only the high part of the Z value after the first process is completed. At this time, only when the value of the flag 2 is equal to "1" in a process for reading the high area of the distribution count memory 4, that is, only when two or more Z values have the same high portion, is a process (hereinafter called low count process) the same as the first process applied to the low portion of the Z value. After the low count process is completed, the second process is applied to the low portion of the Z value and the interrupted second process, hereinafter called the low count process, is resumed.

Figure 22:
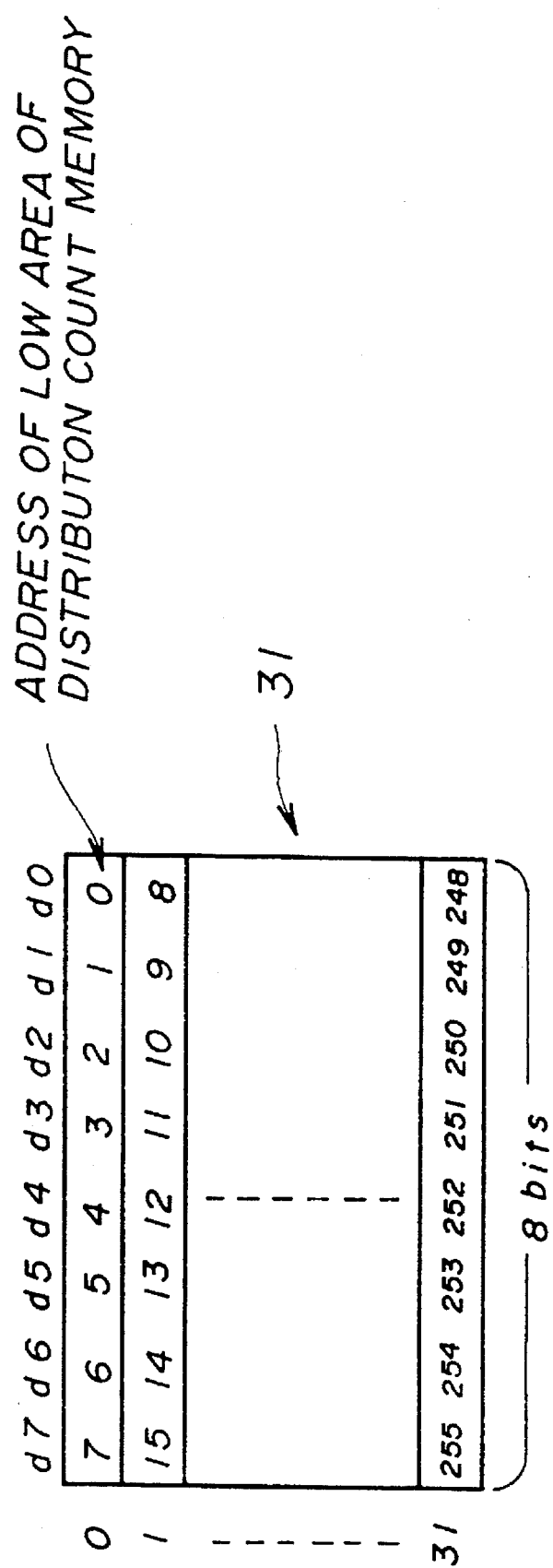
FIG. 22 is an illustration of a format of a flag memory according to the present invention.
Figure 28A:
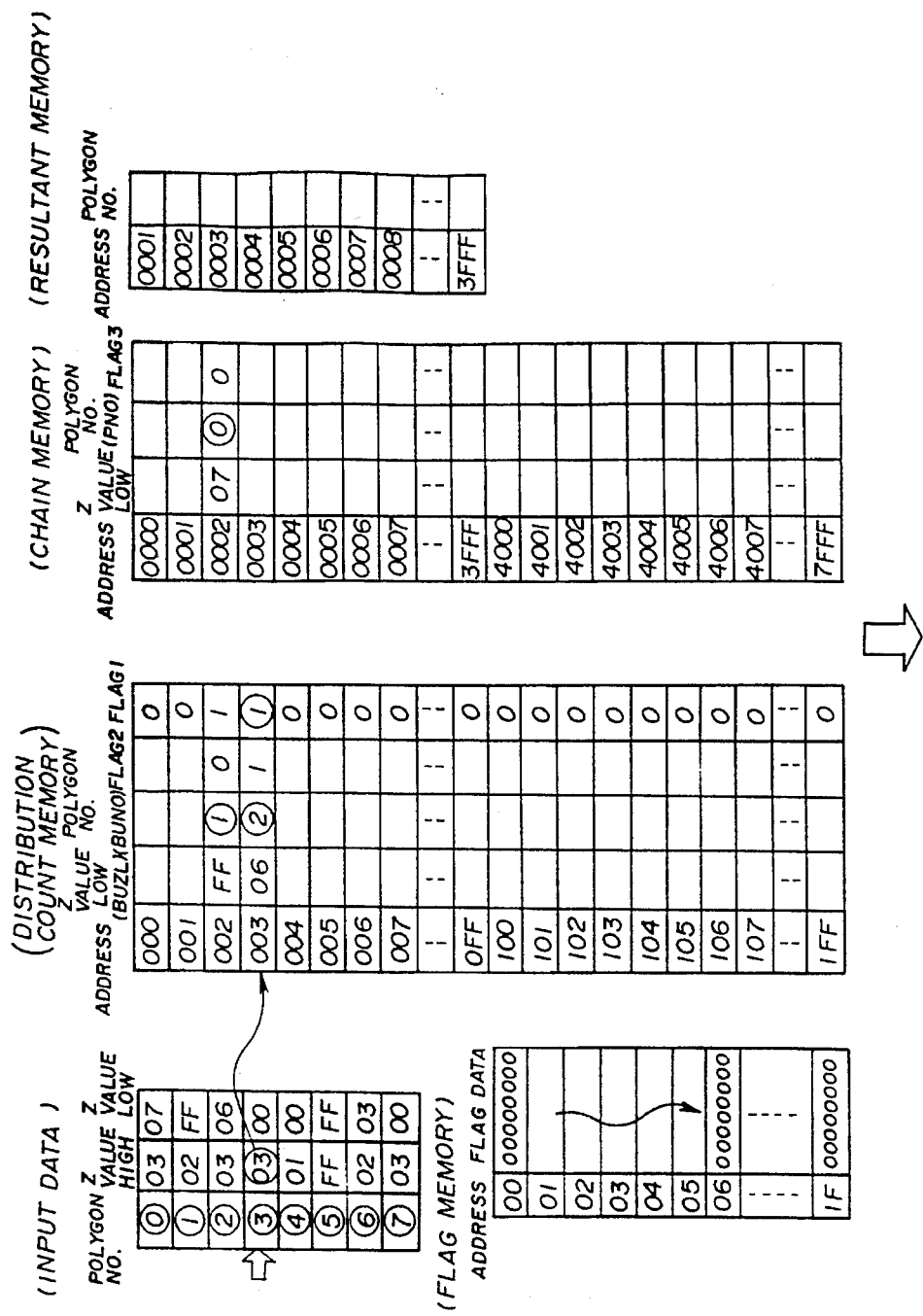
Figure 28B:
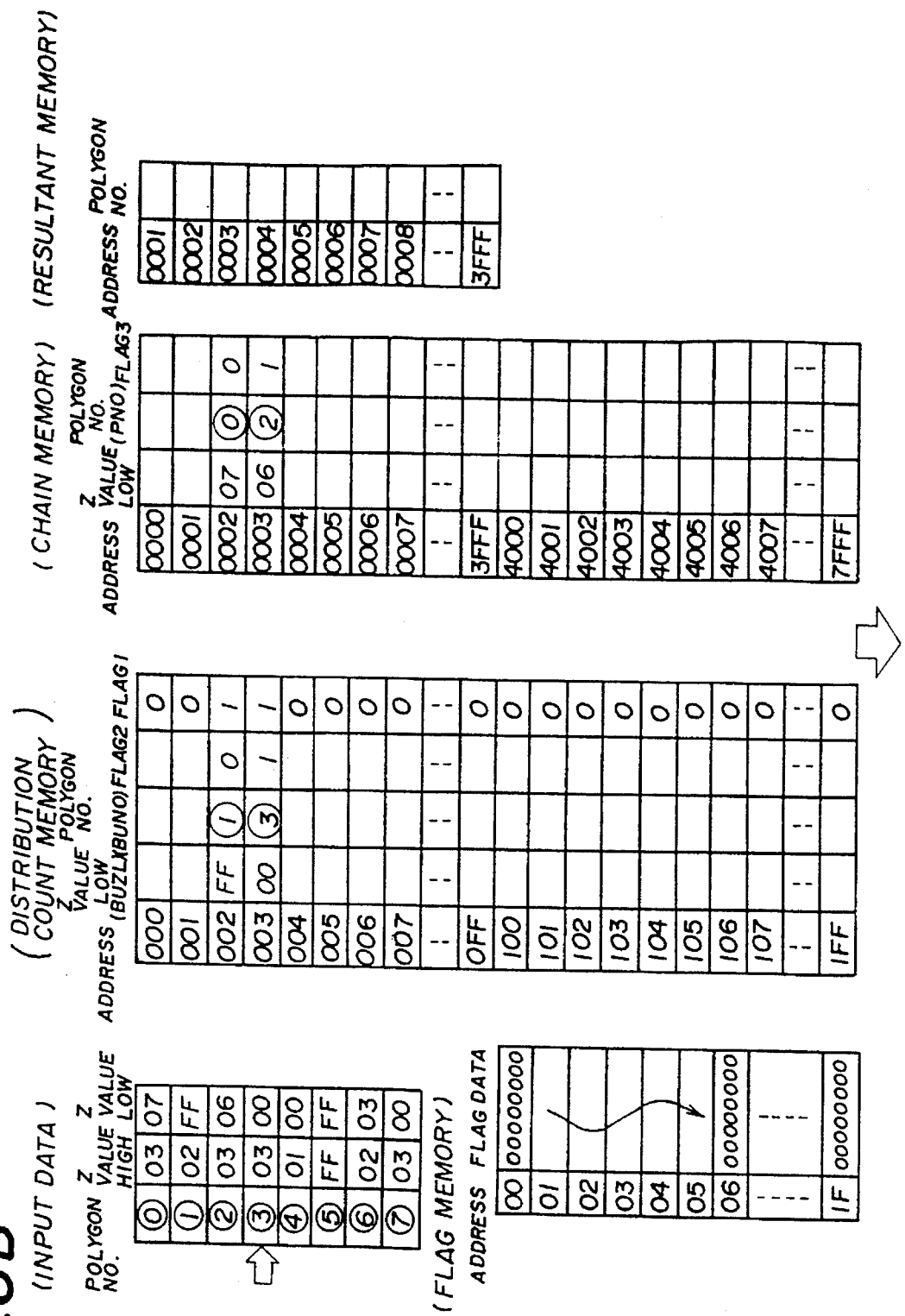
Figure 29A:
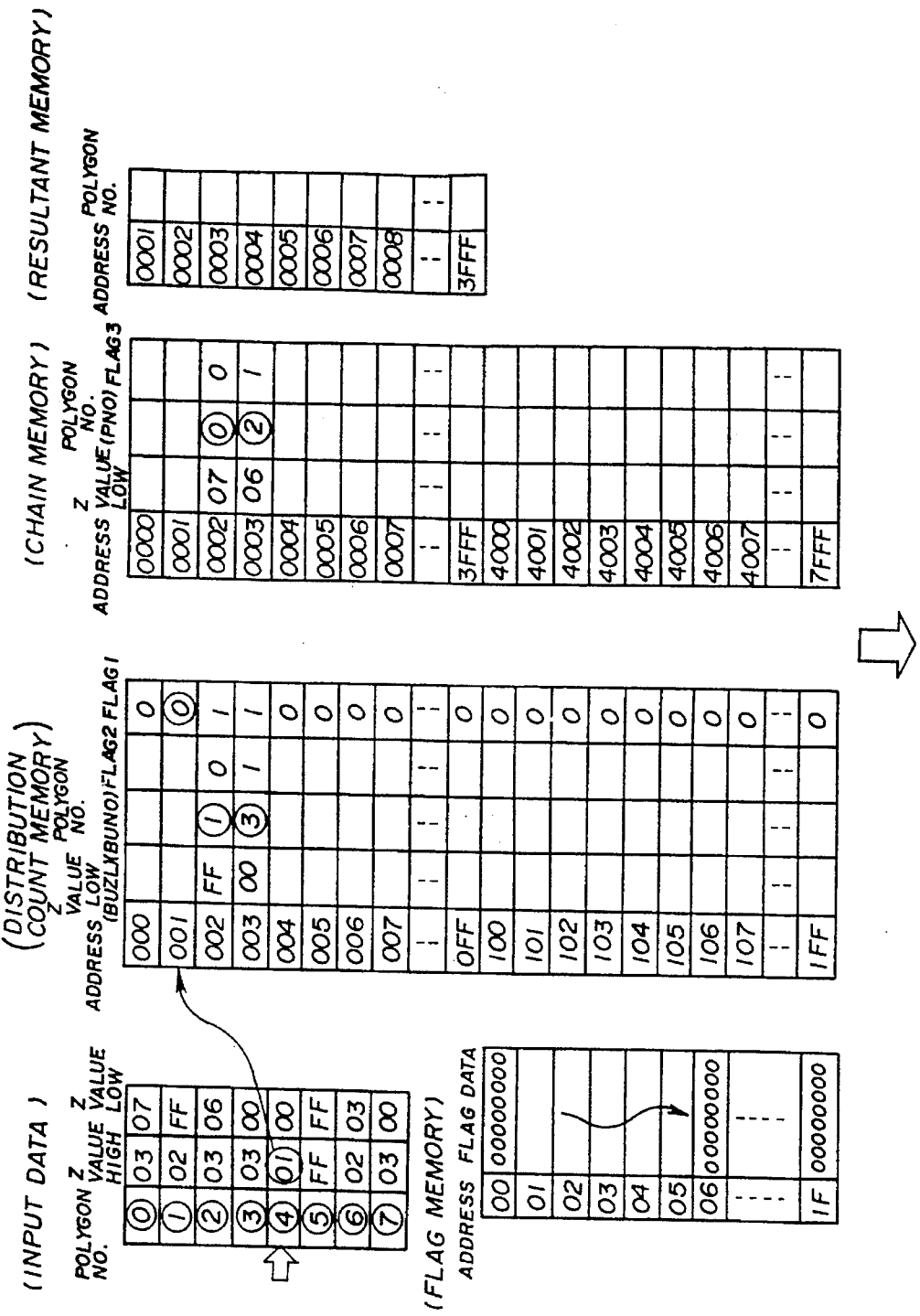
Figure 30A:
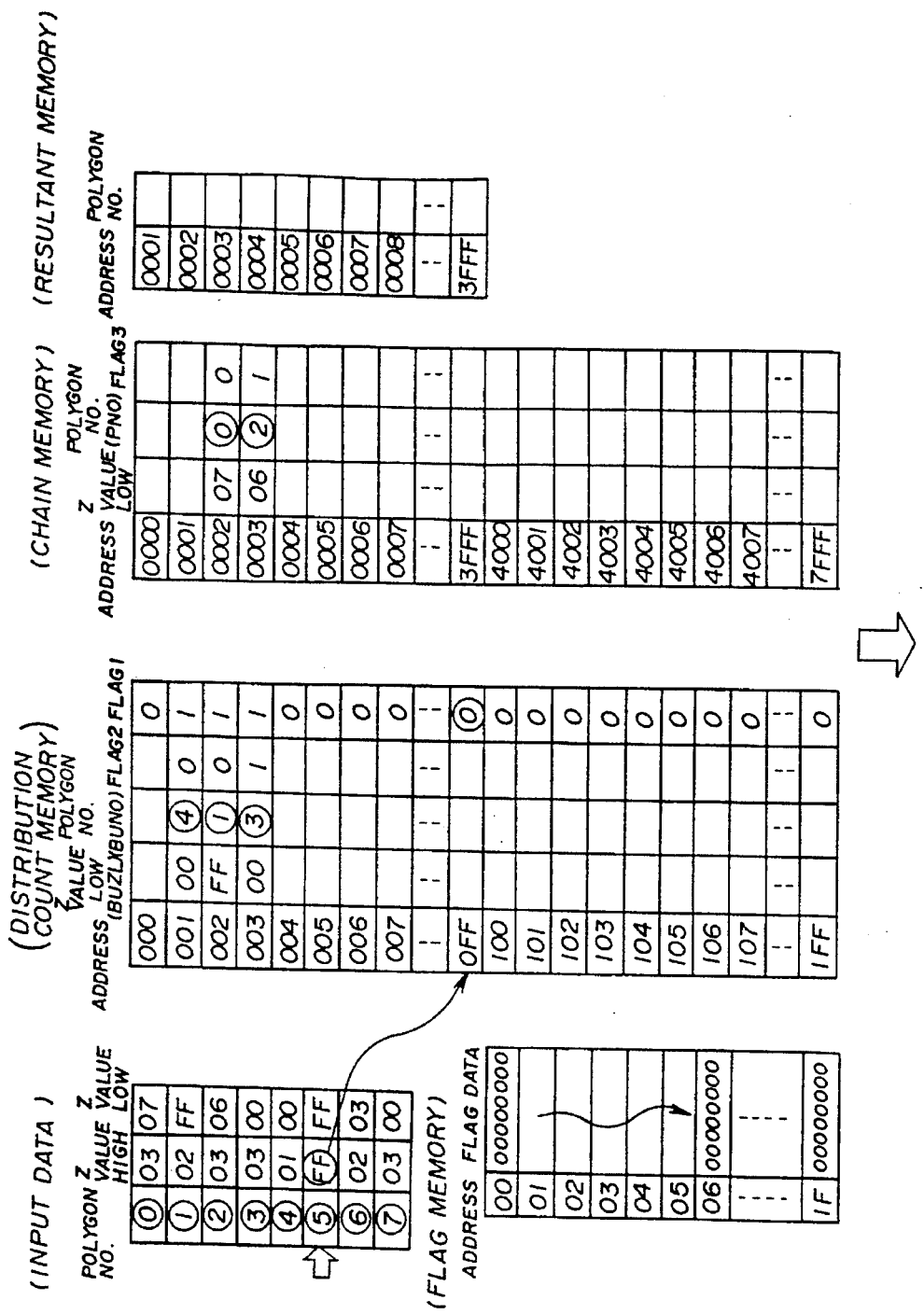
Figure 31A:
Figure 31B:
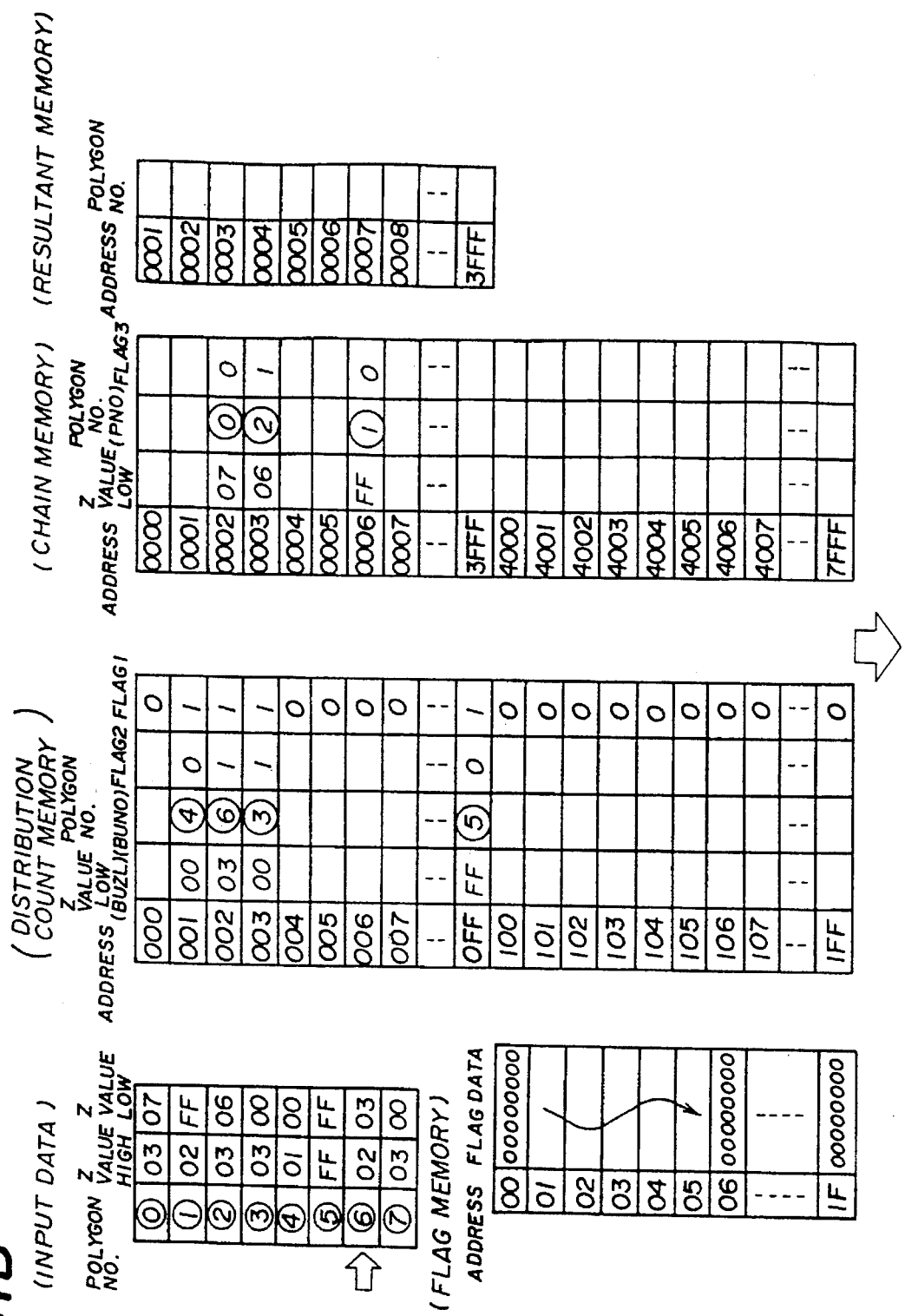
Figure 32A:
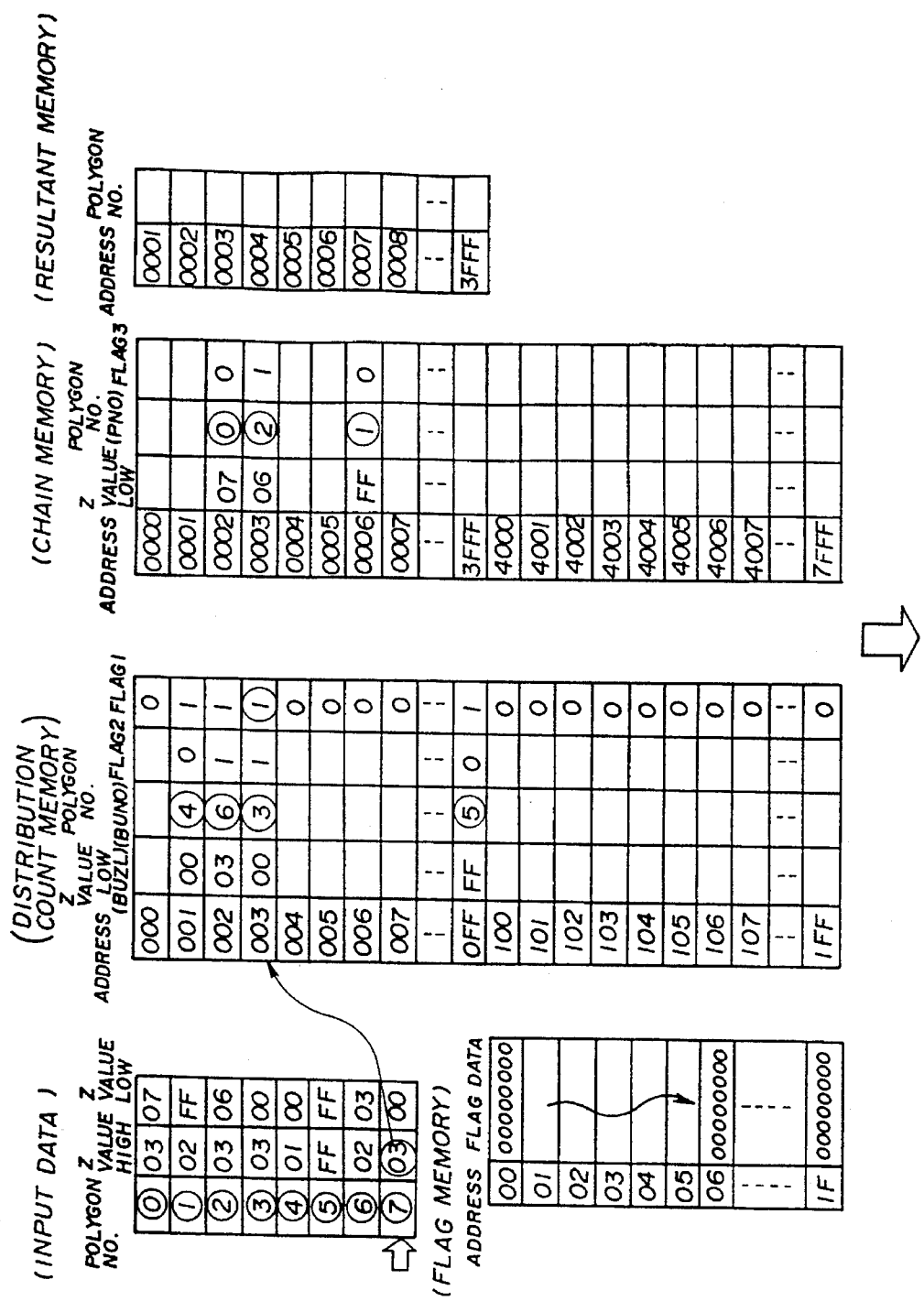
Figure 32B:
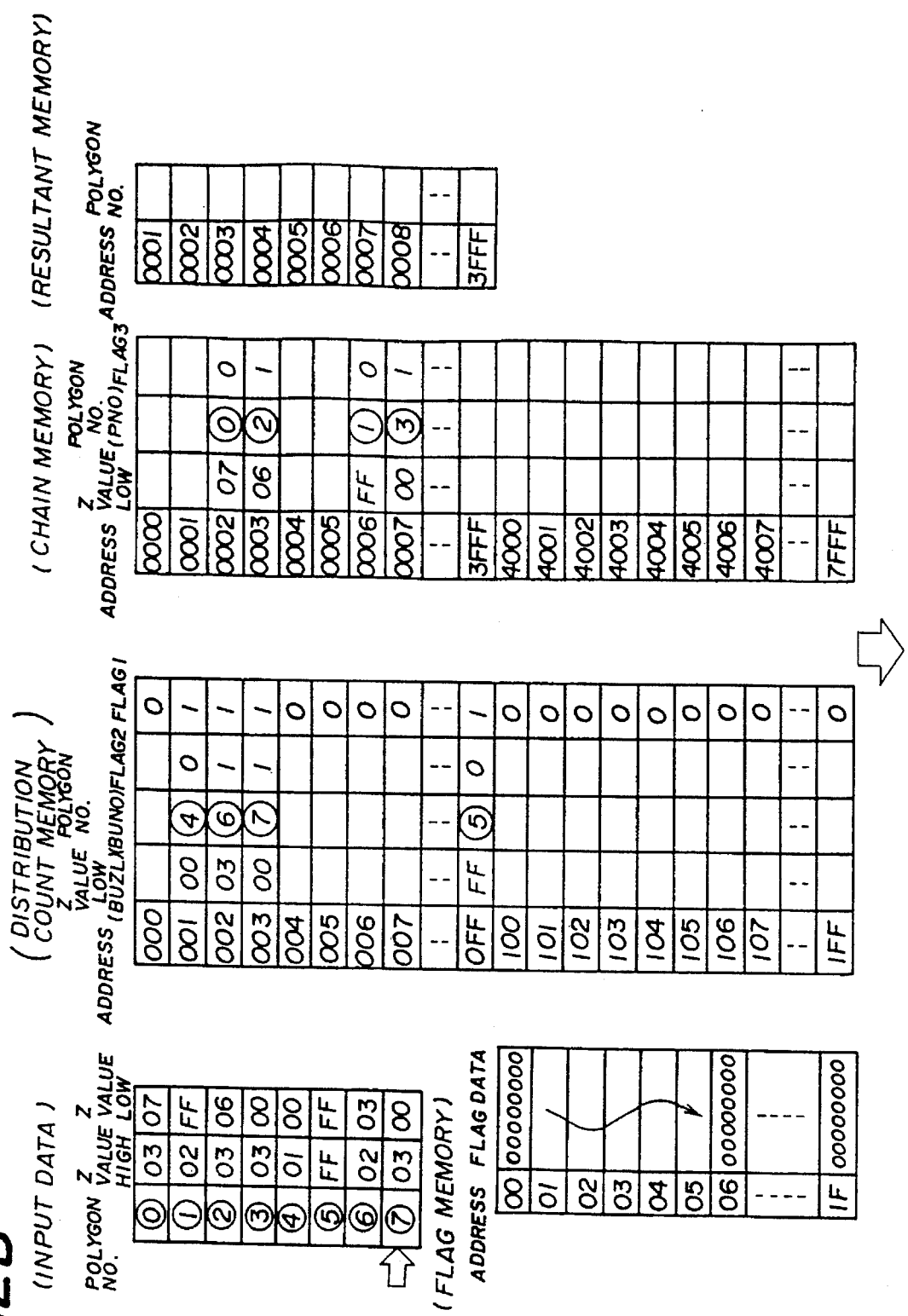
Figure 33A:
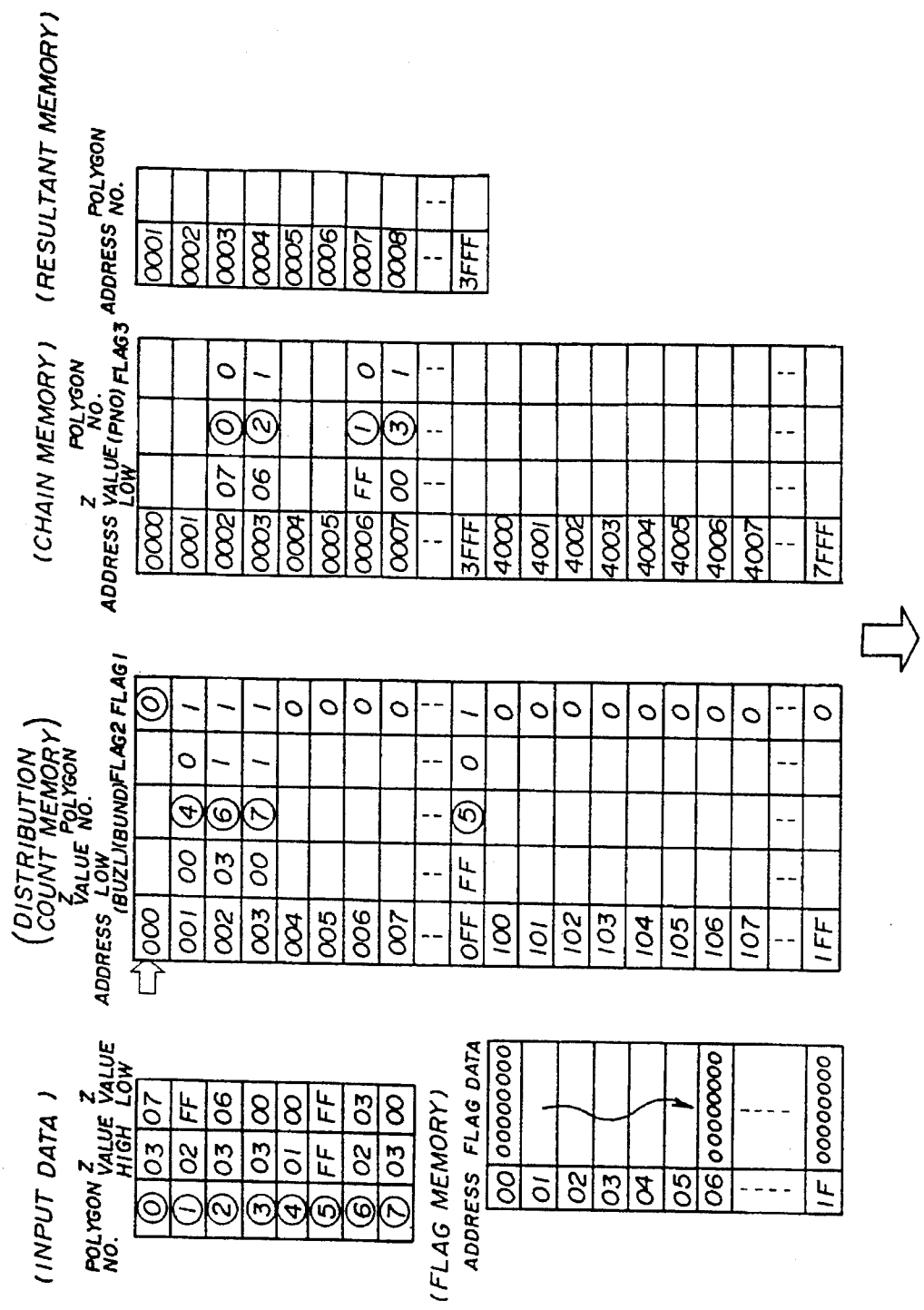
Figure 33B:
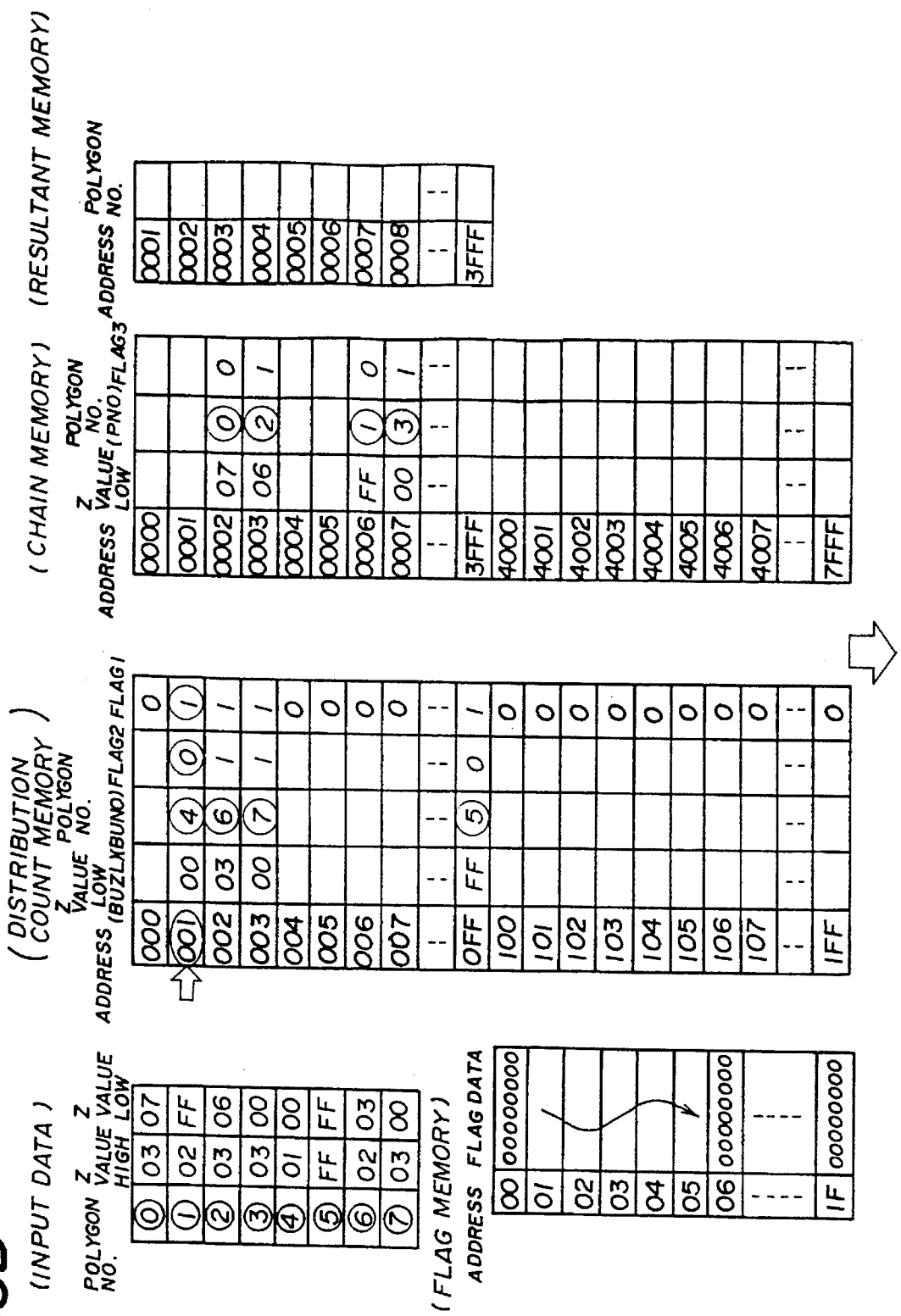
Figure 34A:
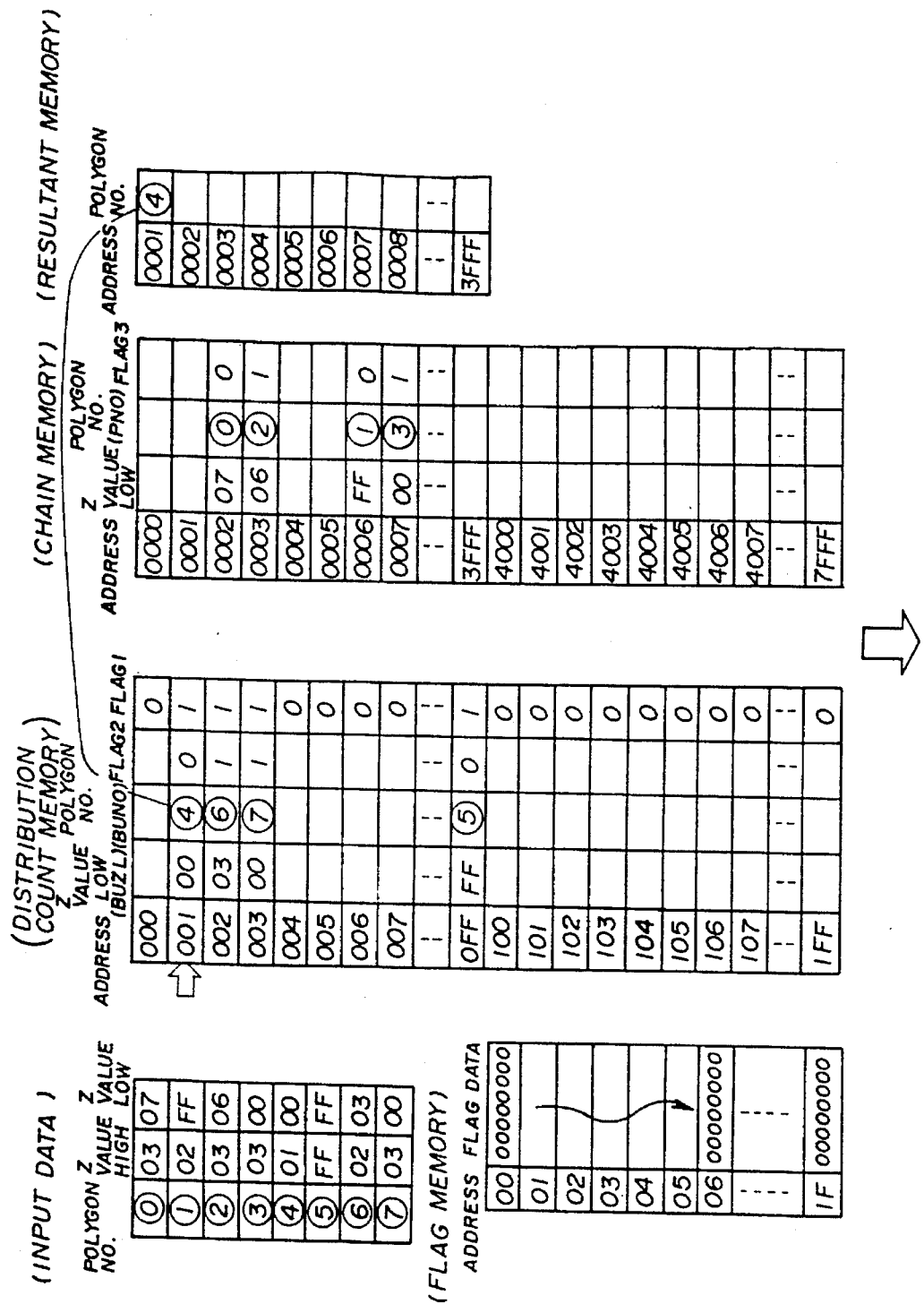
Figure 35A:
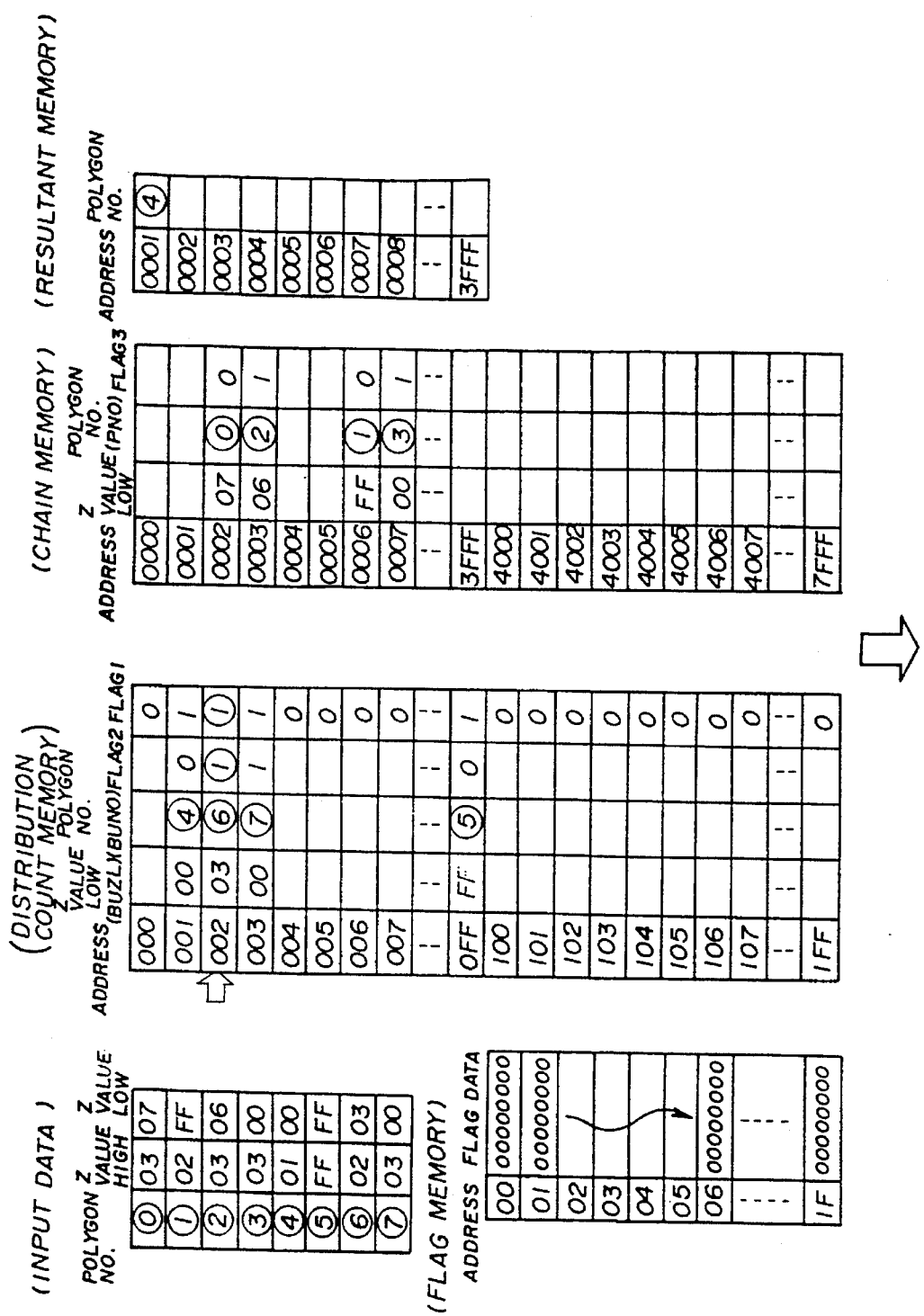
Figure 35B:
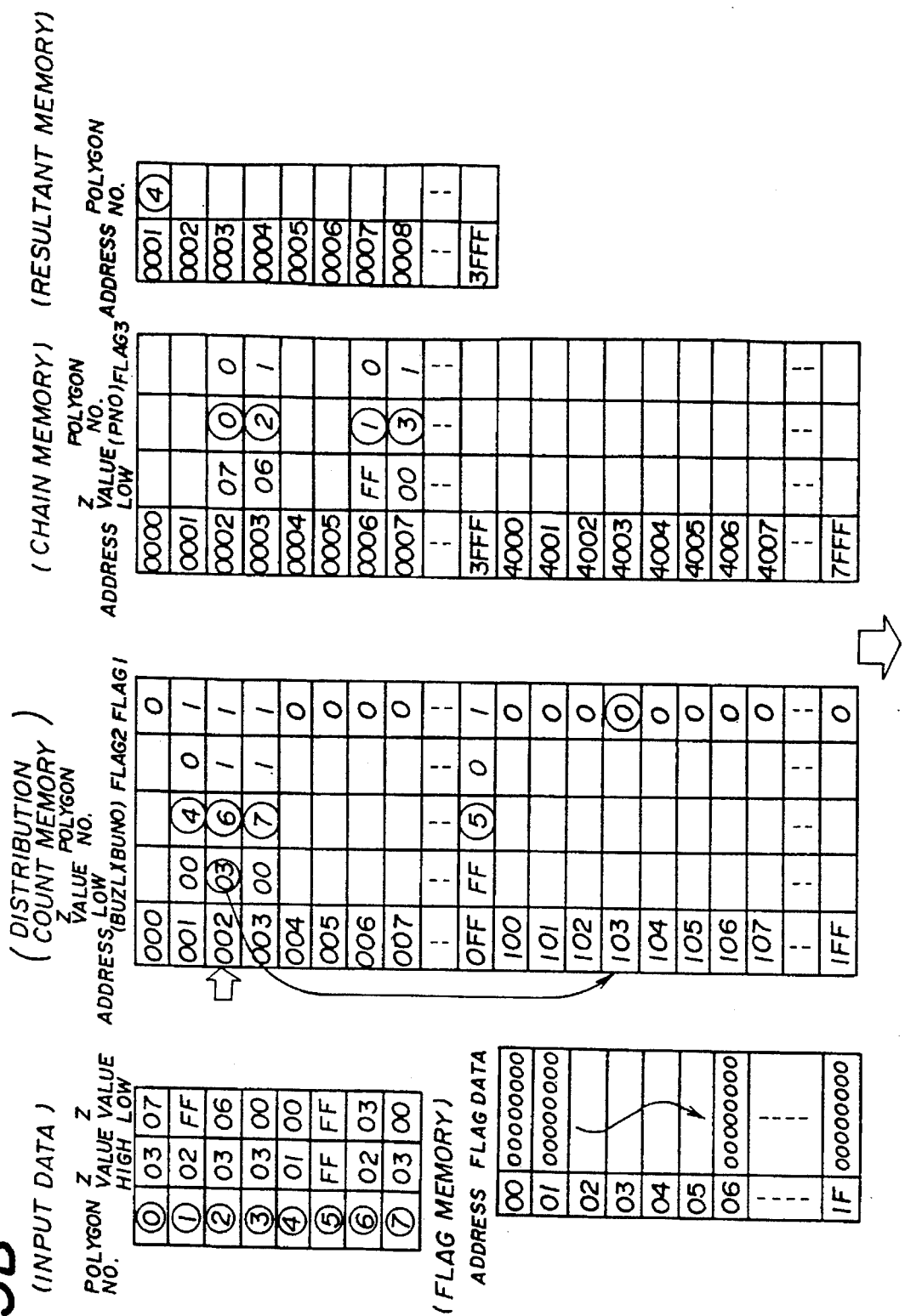
Figure 36A:
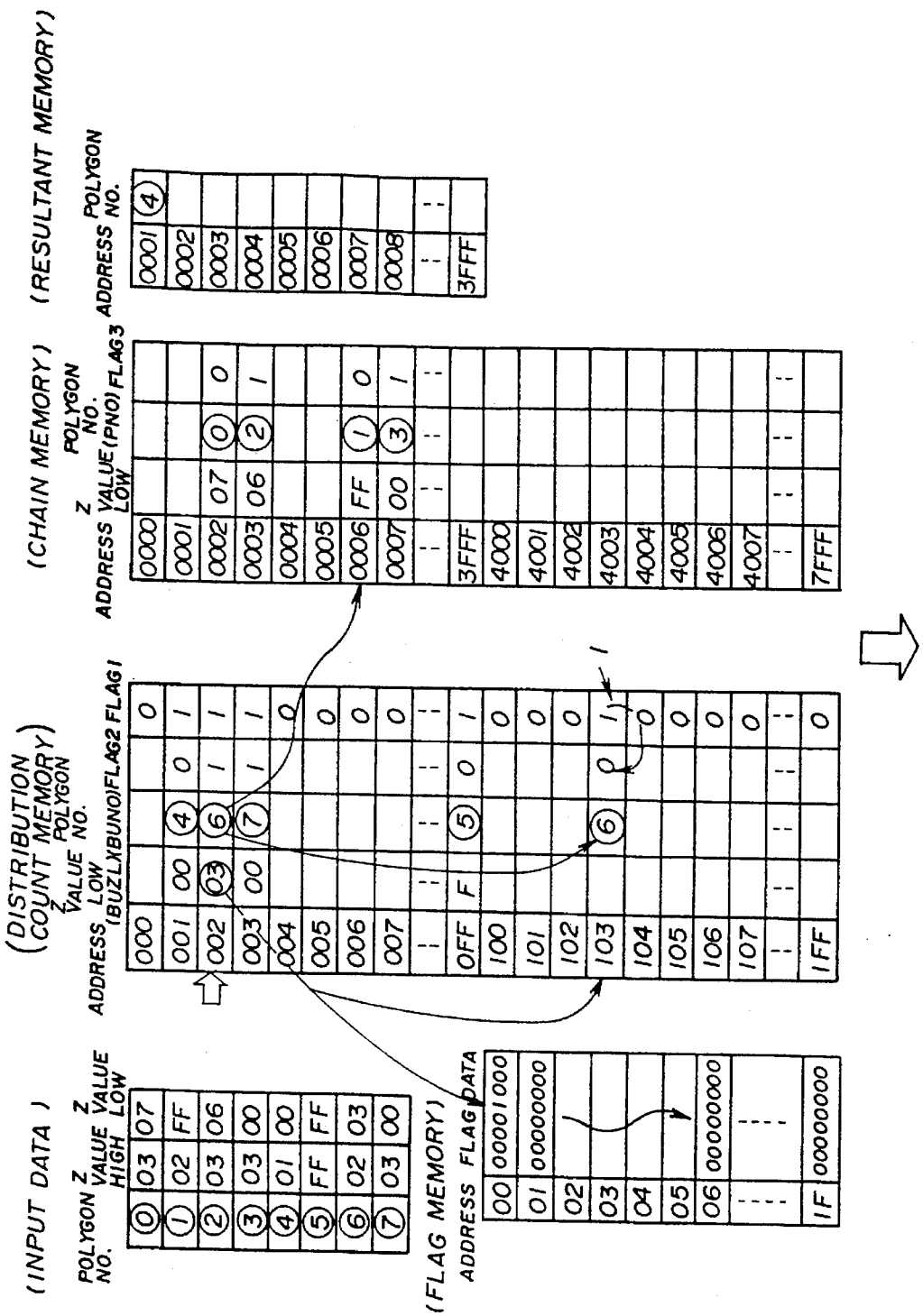
Figure 36B:
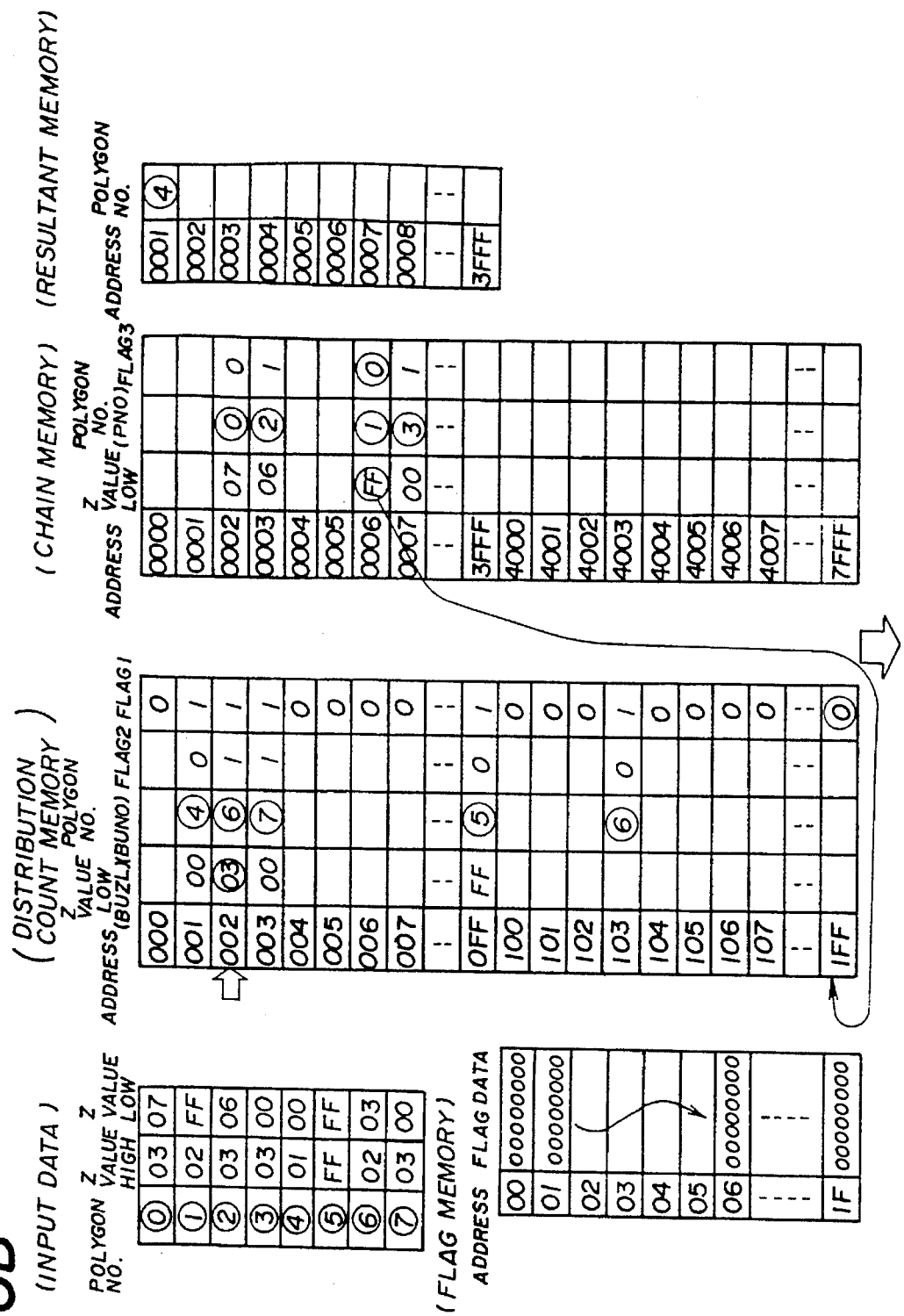

In this embodiment, in order to increase the sorting speed, a flag memory as shown in FIG. 22 and a flag processing circuit 32 shown in FIG. 28 are provided. That is, in the low count process, it can be immediately determined which flag 1 in the low area of the distribution count memory 4 is set. Therefore, an unnecessary process such as checking the state of the flag 1 for all of the addresses can be eliminated, and thus the processing speed can be increased.

Figure 24A:
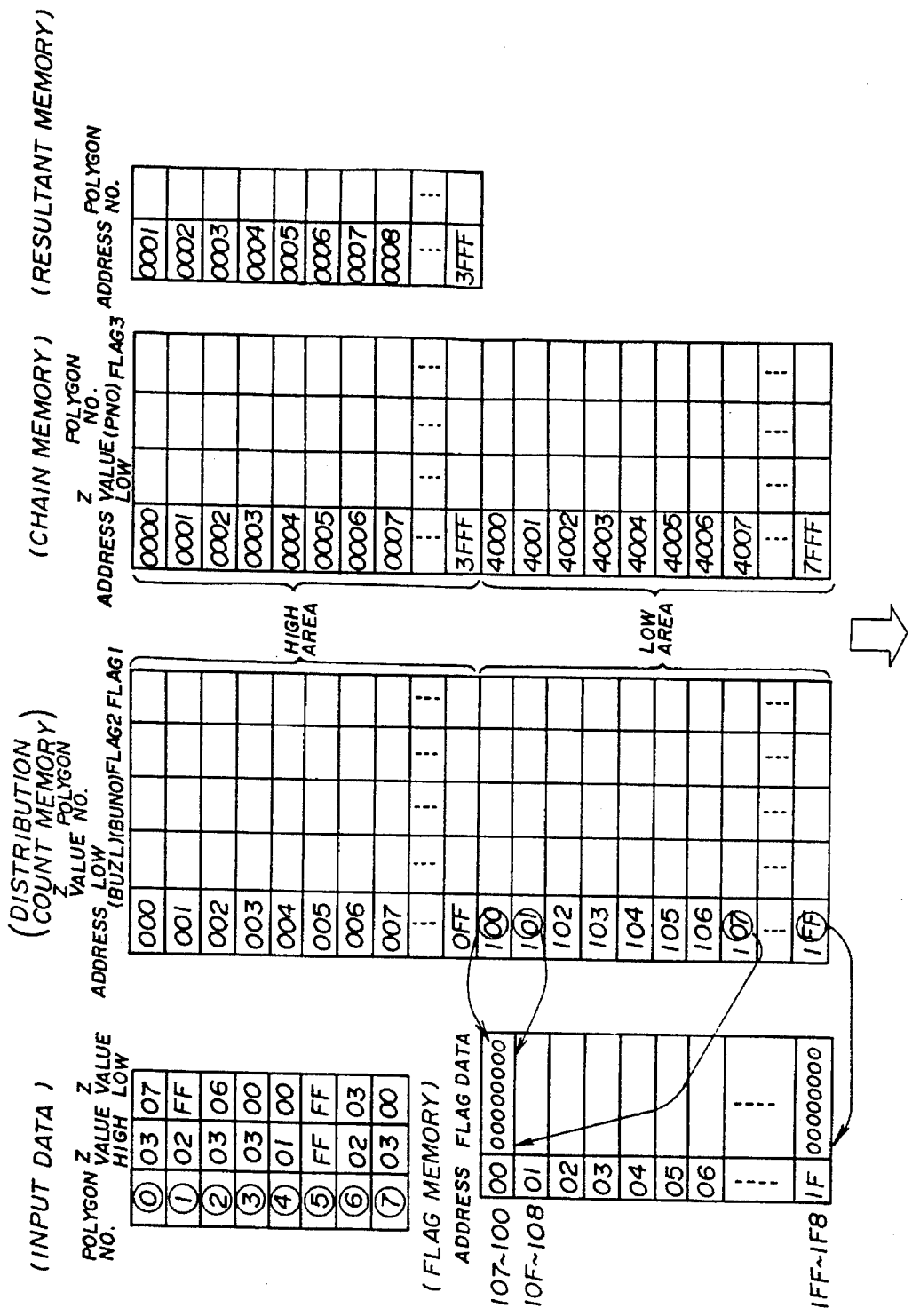

The above-mentioned flag memory 31 stores 8-bit data in an address represented by 5 bits. The address "0" of the flag memory 31 corresponds to the addresses "0" to "7" of the low area of the distribution count memory 4. The first bit value d0 at the address "0" of the flag memory 31 corresponds to the first address of the low area of the distribution count memory 4, and the second bit value d2 corresponds to the second address of the low area of the distribution value memory 4, and so on. Accordingly, if the bit data d7 to d0 is, for example, "00001100", it denotes that the flags of the addresses "2" and "3" in the low area of the distribution count memory 4 are set. The address "31" of the flag memory 31 corresponds to the addresses "248" to "255", and bit data d7 at the address number "31" corresponds to the address "255" of the distribution count memory 4. Accordingly, if the bit data d7 to d0 at the address "31" is, for example, "11000000", it denotes that the flags of the addresses "254" and "255" in the low area of the distribution count memory 4 are set. This relationship is shown in FIG. 24A.

Figure 23:
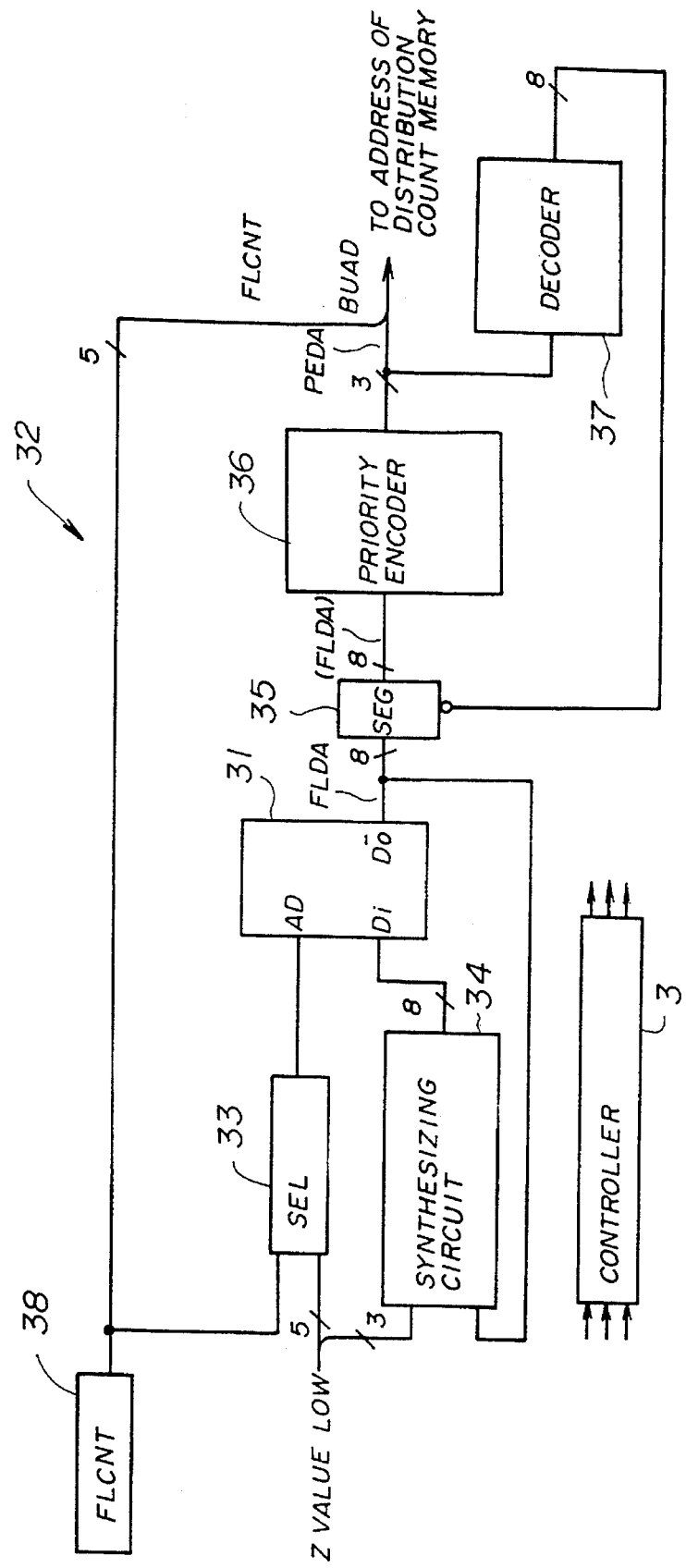
FIG. 23 is a block diagram of a flag processing circuit according to the present invention.

A description will now be given, with reference to FIG. 23, of an operation of writing data to the flag memory 31. The data for the upper 5 bits of the 8 bits of the low side Z value read out by means of the low count process is input to the address lines of the flag memory 31 via a SEL 33. The data for the lower 3 bits is, for example if the bit data is "011", converted into data "00001000", and after that an OR of the converted data and the 8-bit data read out from the flag memory at the above address is written into the flag memory 31. Accordingly, if the 8-bit data which has already been written is "00000010", the synthesized data becomes "00001010".

The operation of reading data from the flag memory 31, which is performed in the low read process is performed while the SEL 33 is connected to a flag counter (FLCNT) 38. The 5-bit address data, which corresponds to the addresses "0" to "31", is input to the address area of the flag memory 31, and thereby the address data is output to a REG 35. The REG 35 stores the output data from the flag memory 31, and supplies the data to a priority encoder 36.

The priority encoder 38 generates, in accordance with the data from the flag memory 31, data representing at which address of the distribution count memory 4 a flag is set. For example, if the data is "00001010", first the least significant set flag d1, is considered among bit data d7 to d1, and 3-bit data "001" is output. The data "001" is synthesized with 5-bit data supplied by the FLCNT 38. If the data supplied by the FLCNT 38 is data for address number "0", data "00000" is supplied and synthesized with the 3-bit data "001", and thus 8-bit data "00000001" is generated. The 8-bit data, represented in hexadecimal notation as "01", is output to the address area of the low area of the distribution count memory 4. Accordingly, in the distribution count memory 4, the address "1" is selected.

The 3-bit data output from the priority encoder 38 is also input to a decoder 37. The 3-bit data "001" is converted into data "00000010", and further inverted to data "11111101". The inverted data is supplied to the REG 35. At this time, d1 of the 8-bit data "00001010" retained by the REG 35 is reset, and data "00001000" is supplied to the priority encoder 36. In the priority encoder 36, the set flag d3 is considered and data "011" is output. The data "011" is synthesized with the 5-bit data supplied by the FLCNT 38, and accordingly 8-bit data "00000011" is generated. The 8-bit data is then converted into hexadecimal data "03", and the data "03" is output to the address area of the distribution count memory 4. Accordingly, in the distribution count memory 4, the address "3" is selected.

Figure 16:
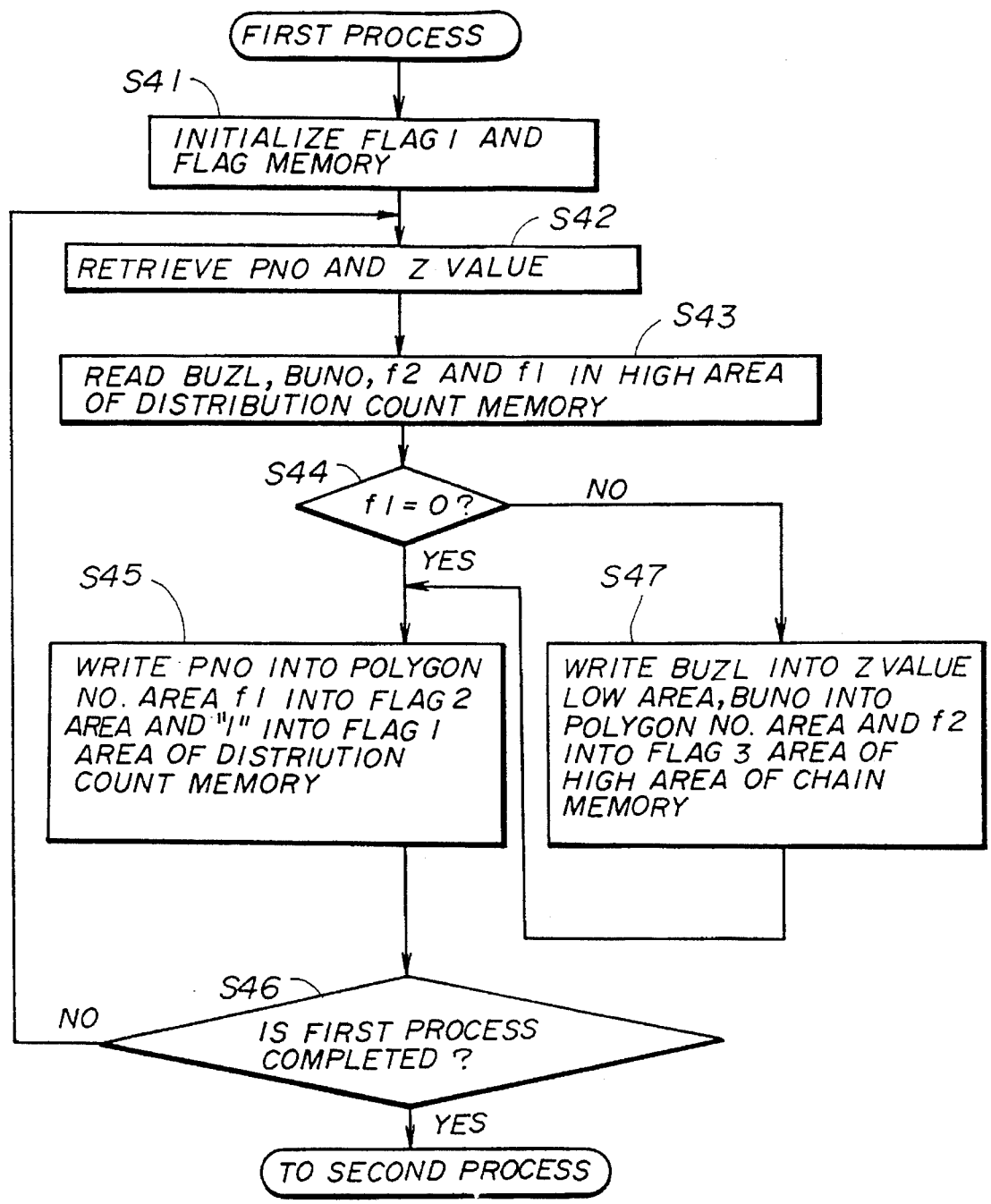
FIG. 16 is a flow chart for showing the first process according to the present invention in which Z value data is divided into a high side and a low side.

A description will now be given, with reference to flow charts of FIGS. 16 to 19, of a sorting operation of the present embodiment. When the first operation shown in FIG. 16 is started, the flag 1 and the flag memory 31 are initialized in S41. By this initialization, the contents of each memory is set as shown in FIG. 24B. PNO and Z values (PZH, PZL) are then retrieved in S42. It should be noted that PZH represents the high side (portion) of the Z value and PZL represents the low side (portion) of the Z value.

In S43, BUZL, BUNO, f2 and f1 are read out. BUZL is the low side of the Z value which is already written in the input data generating memory.

Figure 25A:
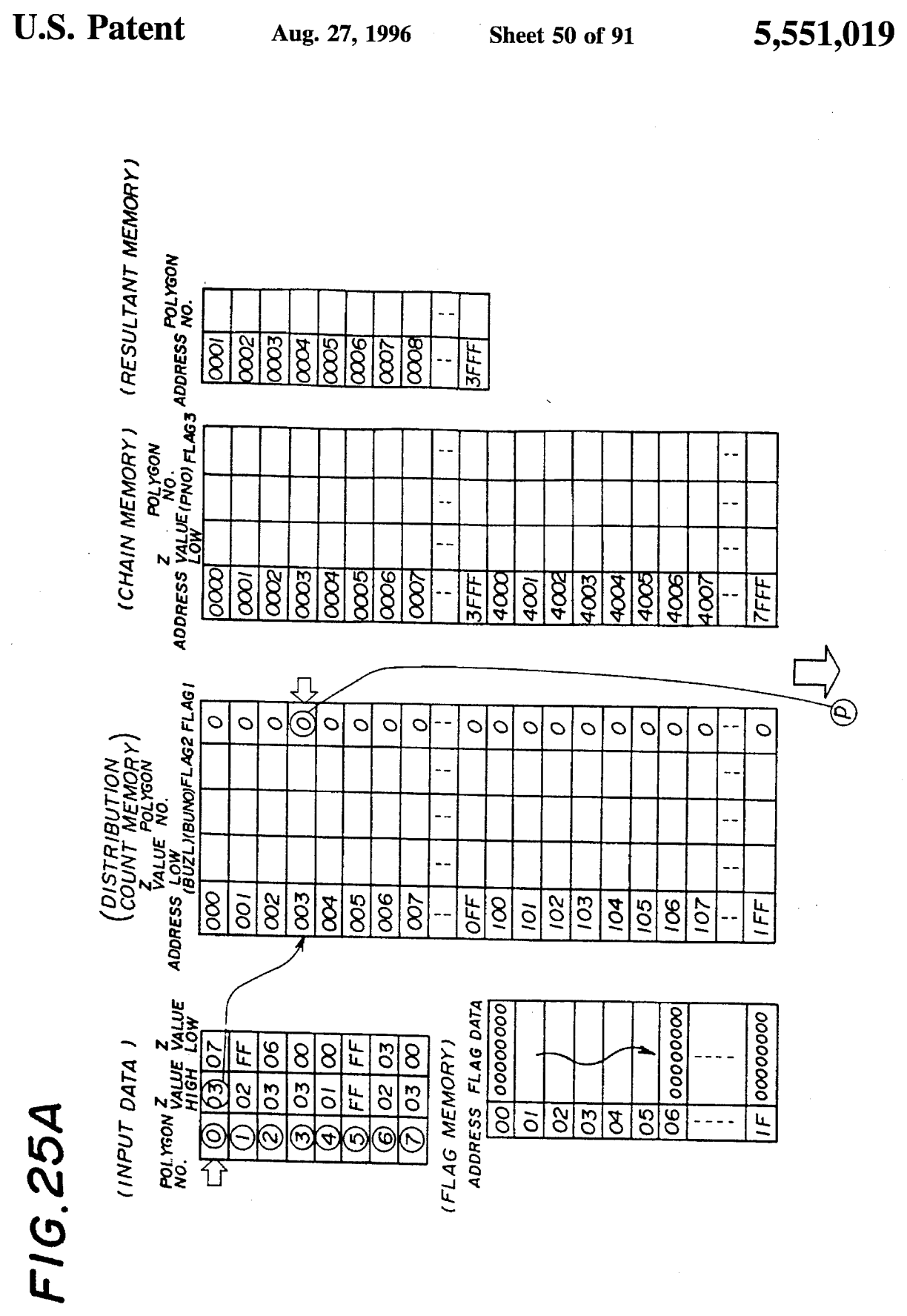
Figure 25B:
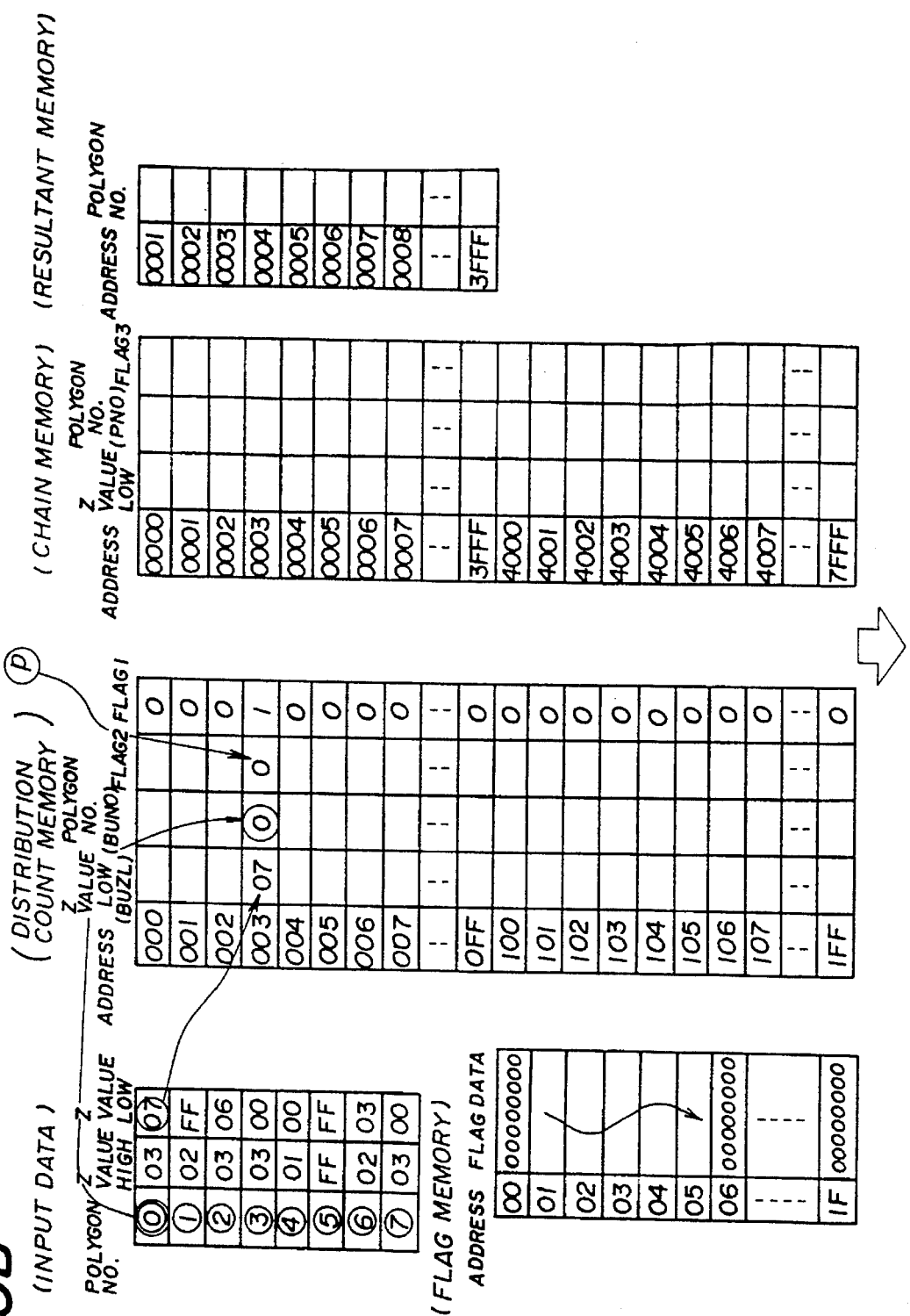
Figure 26A:
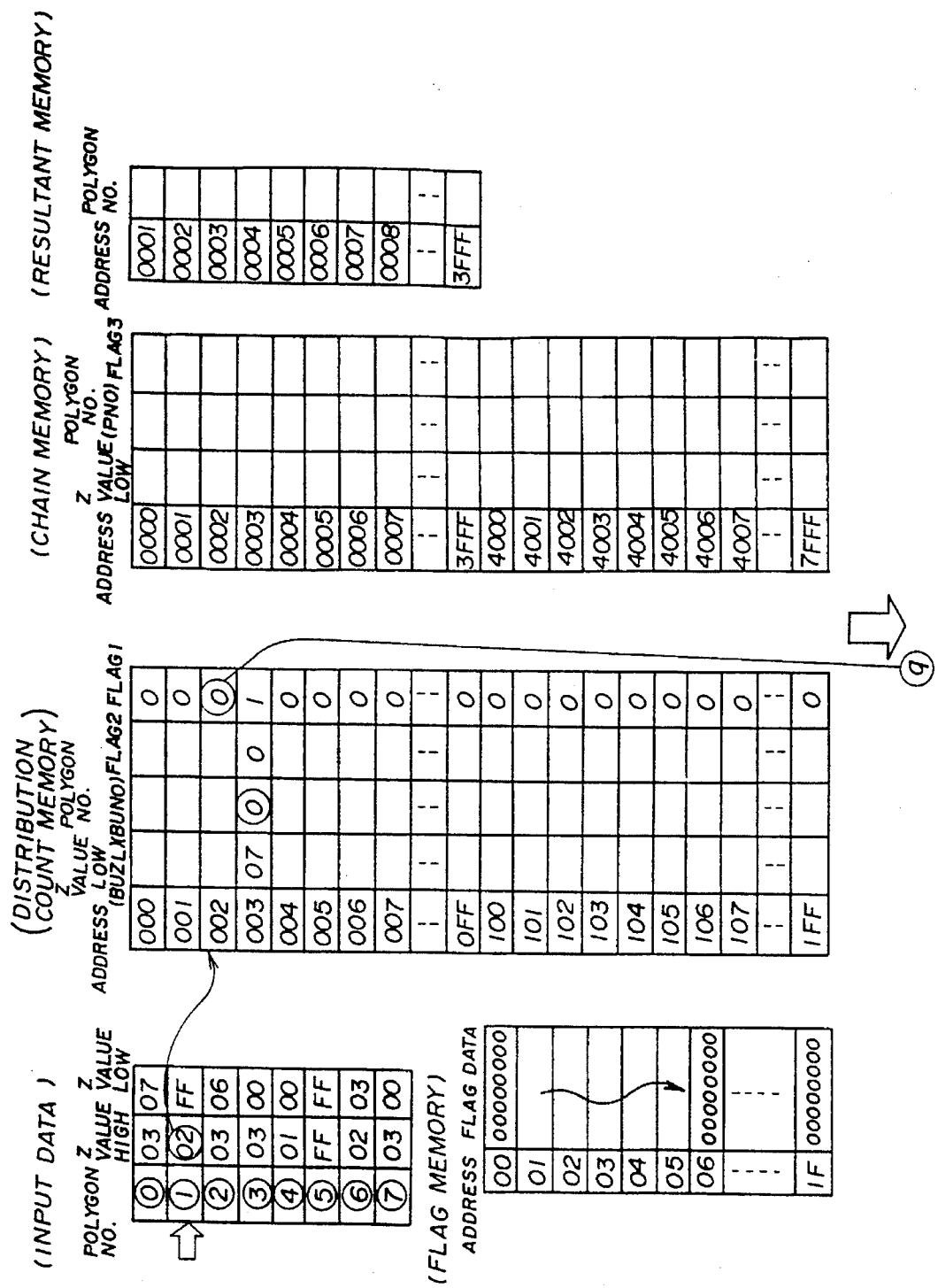
Figure 26B:
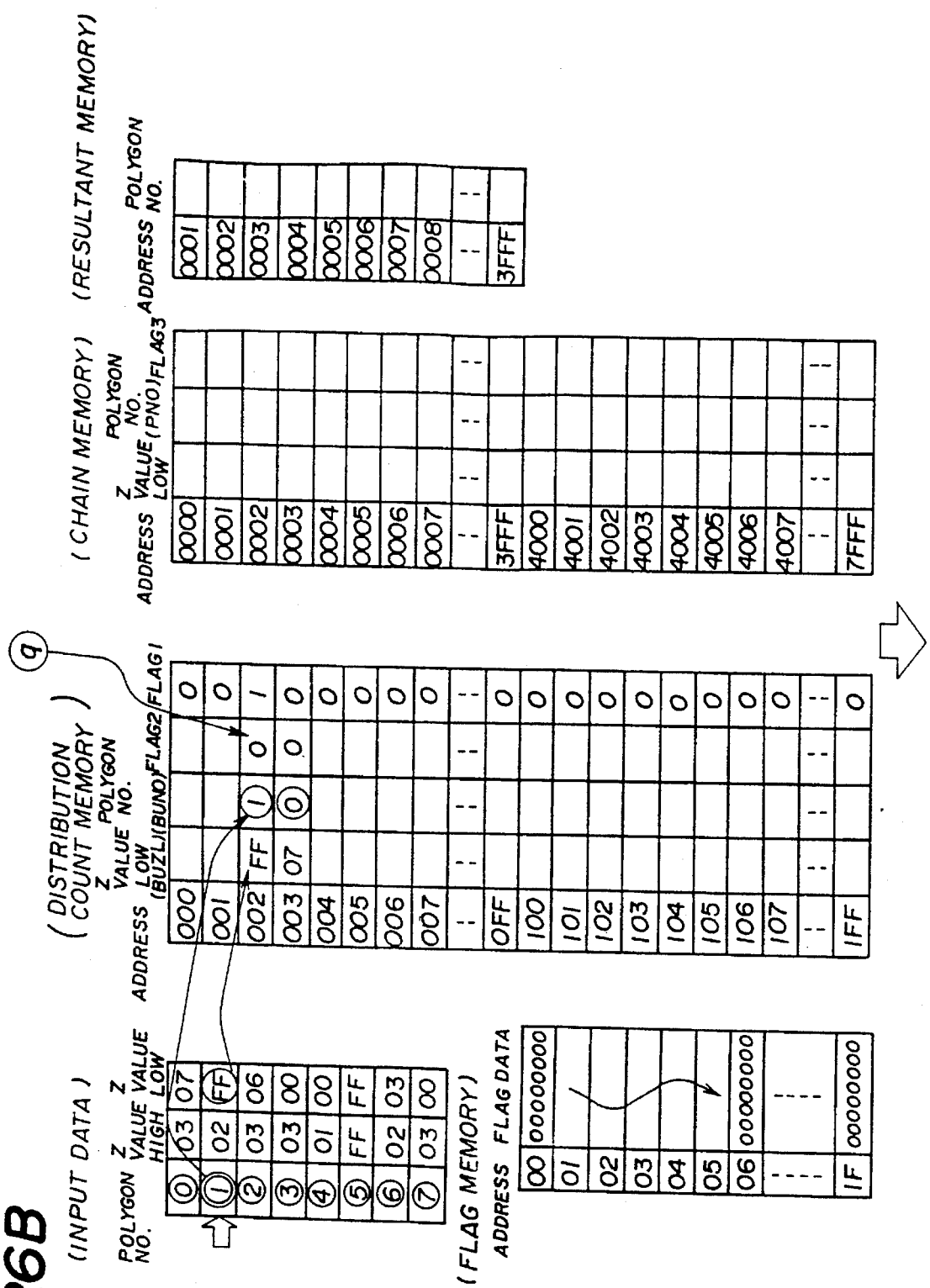

It is determined, in S44, whether or not f1 is equal to "0". If f1 is equal to "0", the routine proceeds to S45 where the data read out in S43 is written into the distribution count memory 4. That is, at the address in the high area of the distribution count memory 4 indicated by PZH, PZL is written into the Z value low area, PNO is written into the polygon number area, f1 is written into the flag 2 area, and data "1" is written into the flag 1 area. For example, as shown in FIG. 25B, the data for a polygon having the polygon No. "0" is written into the high area of the distribution count memory 4 at the address indicated by PZH. In this case, since PZH is "03", the data of the polygon having the polygon No. "0" is written into the address "003" of the high area of the distribution count memory 4. That is, PNO "0" is written into the polygon number area, PZL "07" is written into the Z value low area. Additionally, f1 "0" is written in the flag 2 area and data "1" is written into the flag 1 area of the distribution count memory 4.

Figure 27A:
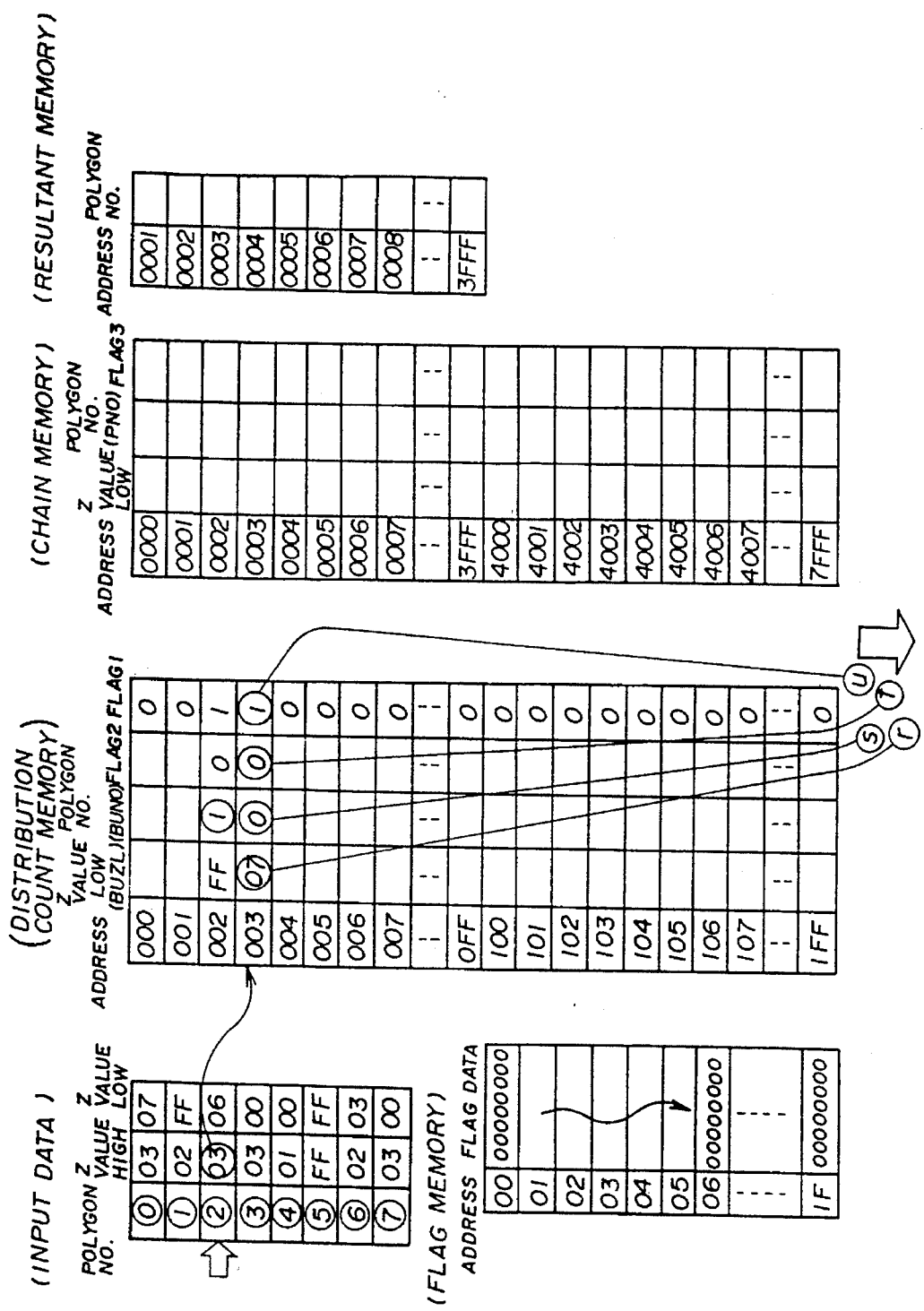
Figure 27B:
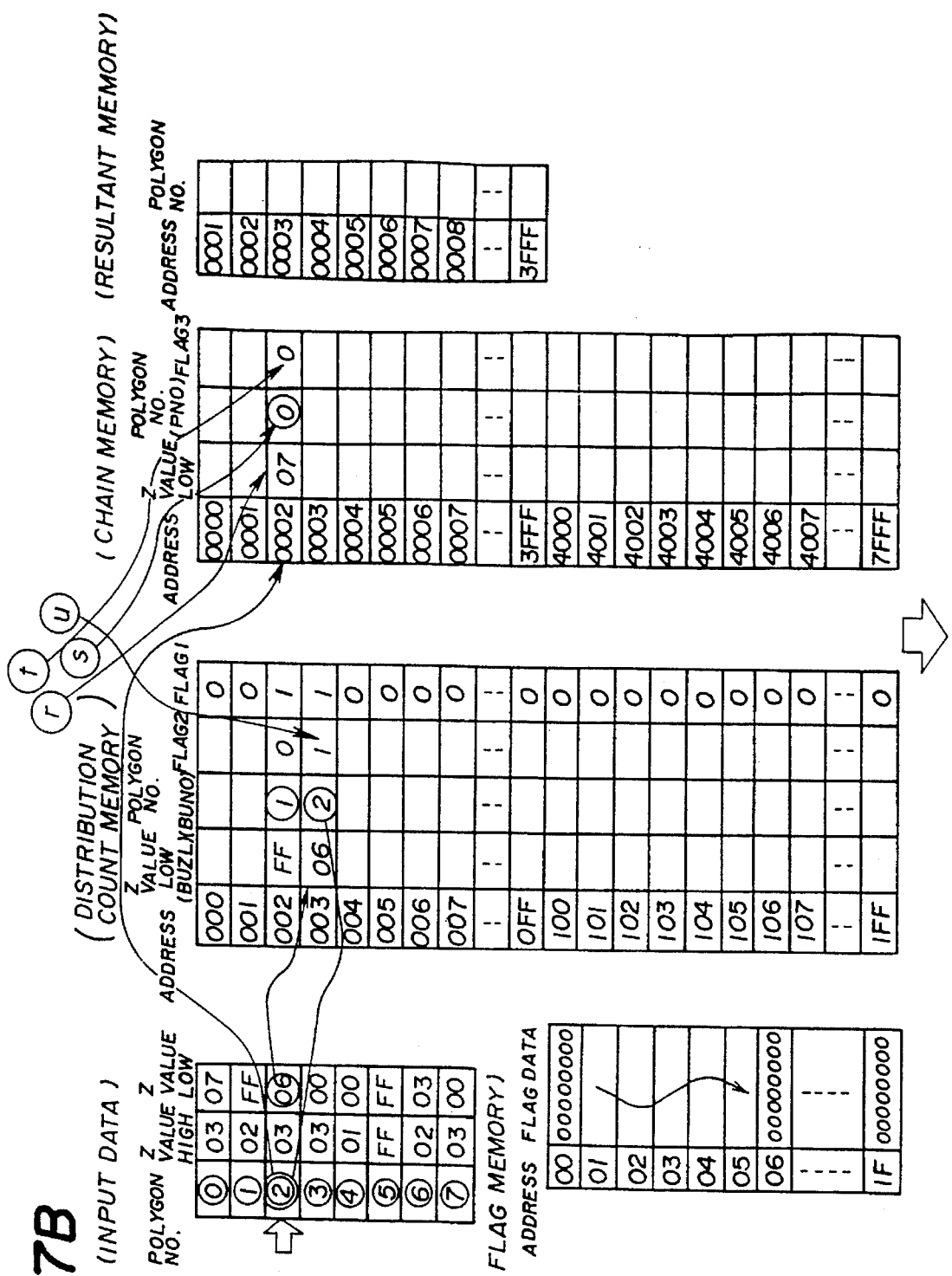

If it is determined, in S44, that f1 is not equal to 0, the routine proceeds to S47. In S47, the data read out in S43 is written into the chain memory. That is, at the address of the high area of the chain memory indicated by PNO, BUZL is written into the Z value low area, BUNO is written into the polygon number area, and f2 is written into the flag 3 area. For example, as shown in FIGS. 27A and 27B, the data for a polygon having the polygon No. "2" is written into the high area of the chain memory 5 at the address indicated by PNO "2". In this case, the data of the polygon having the polygon No. "2" is written to the address "0002" of the high area of the chain memory 5. That is, PNO "0" is written into the polygon number area, BUZL "07" is written into the Z value low area, and f2 "0" is written in the flag 3 area of the chain memory 5.

After completing the process of S47, the routine proceeds to S45. By executing S45, the data of the polygon having PNO "2" is written, as shown in FIG. 27B, into the high area of the distribution count memory 4.

In S46, it is determined whether or not the first process is completed. If the first process has not been completed yet, the routine returns to S42 so as to repeat the above-mentioned process. By repeating the above-mentioned process, the contents of each memory change, in turn, as shown in FIGS. 25A, 25B, 26A, 26B, . . . 32A, 32B. Accordingly, when the first process is completed, the contents of each memory become those shown in FIG. 32B.

Figure 17:
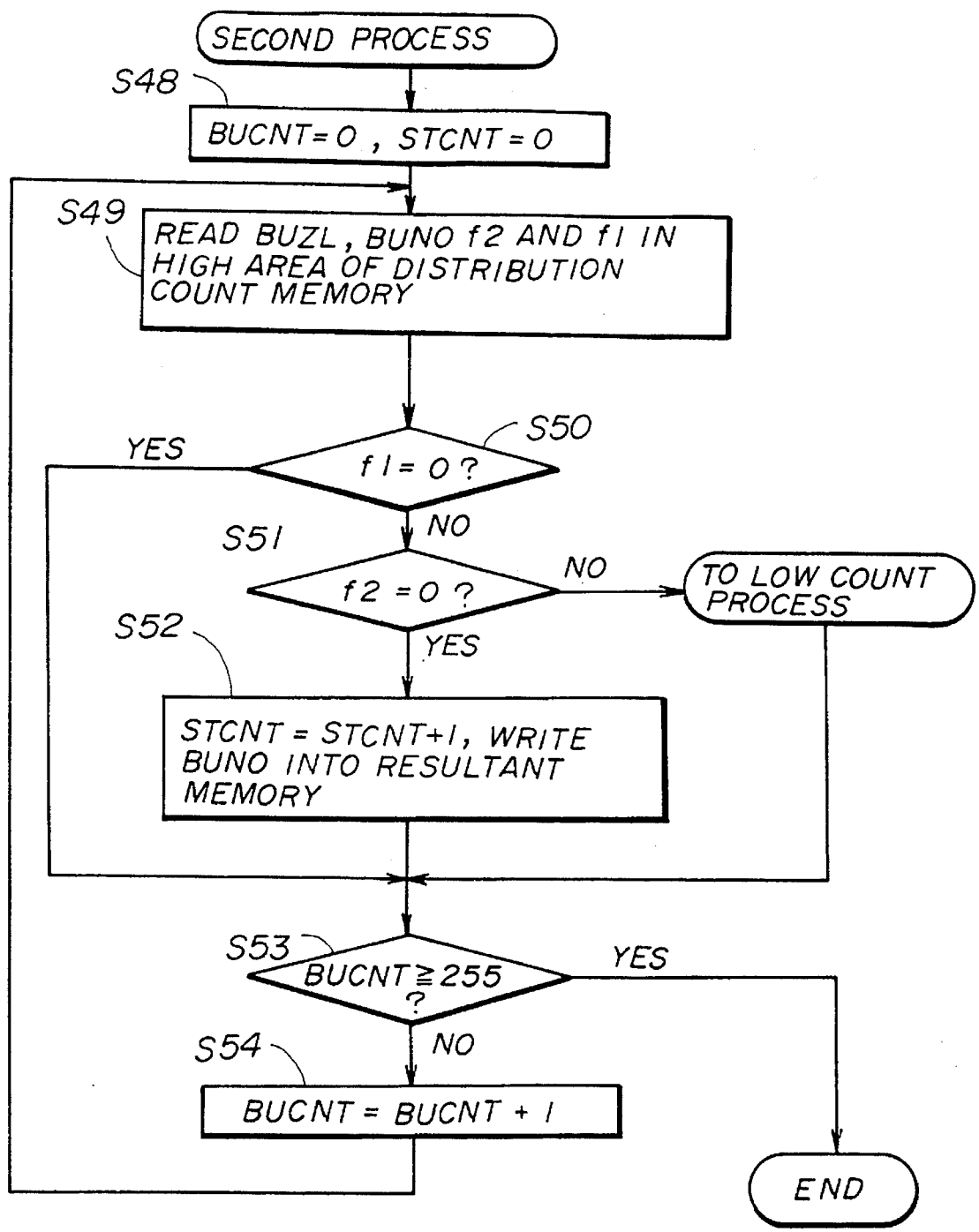
FIG. 17 is a flow chart for showing the second process according to the present invention in which Z value data is divided into a high side and a low side.

If it is determined that the first process has been completed, the routine proceeds to the second process starting from S48 of FIG. 17. In S48, the values of the BUCNT and the STCNT are set to "0". In S49, the data in the high area of the distribution count memory 4 at the address indicated by the value of the BUCNT, that is, BUZL, BUNO, f2 and f1, is read.

In S50, it is determined whether or not f1 is equal to "0". If f1 is equal to "0", the routine proceeds to S53 where it is determined whether or not the value of the BUCNT is equal to or greater than "255". If yes, the routine ends. If not, the routine proceeds to S54 where the value of the BUCNT is incremented, and the routine returns to S49. For example, in FIG. 33A, since f1 corresponding to the value of the BUCNT "000" is "0", the value of the BUCNT is incremented to be "001", and the process proceeds to the state shown in FIG. 33B.

If it is determined, in S50, that f1 is not equal to "0", the routine proceeds to S51 where it is determined whether or not f2 is equal to "0". If f2 is equal to "0", that is, there are no other polygons having the same high side Z value, the routine proceeds to S52. In S52, the value of the STCNT is incremented, and BUNO is written into the resultant memory 6 at the address indicated by the value of the STCNT, and the routine proceeds to S53. For example, in FIG. 34A, since f1 and f2 corresponding to the value of BUCNT are "1" and "0", respectively, the value of the STCNT is incremented to "1" and BUNO "4" is written to the address "0001" of the resultant memory 6. If f2 is not equal to "0", that is, if there is another polygon having the same high side Z value, the low count process is performed, and then the routine proceeds to S53.

Figure 18:
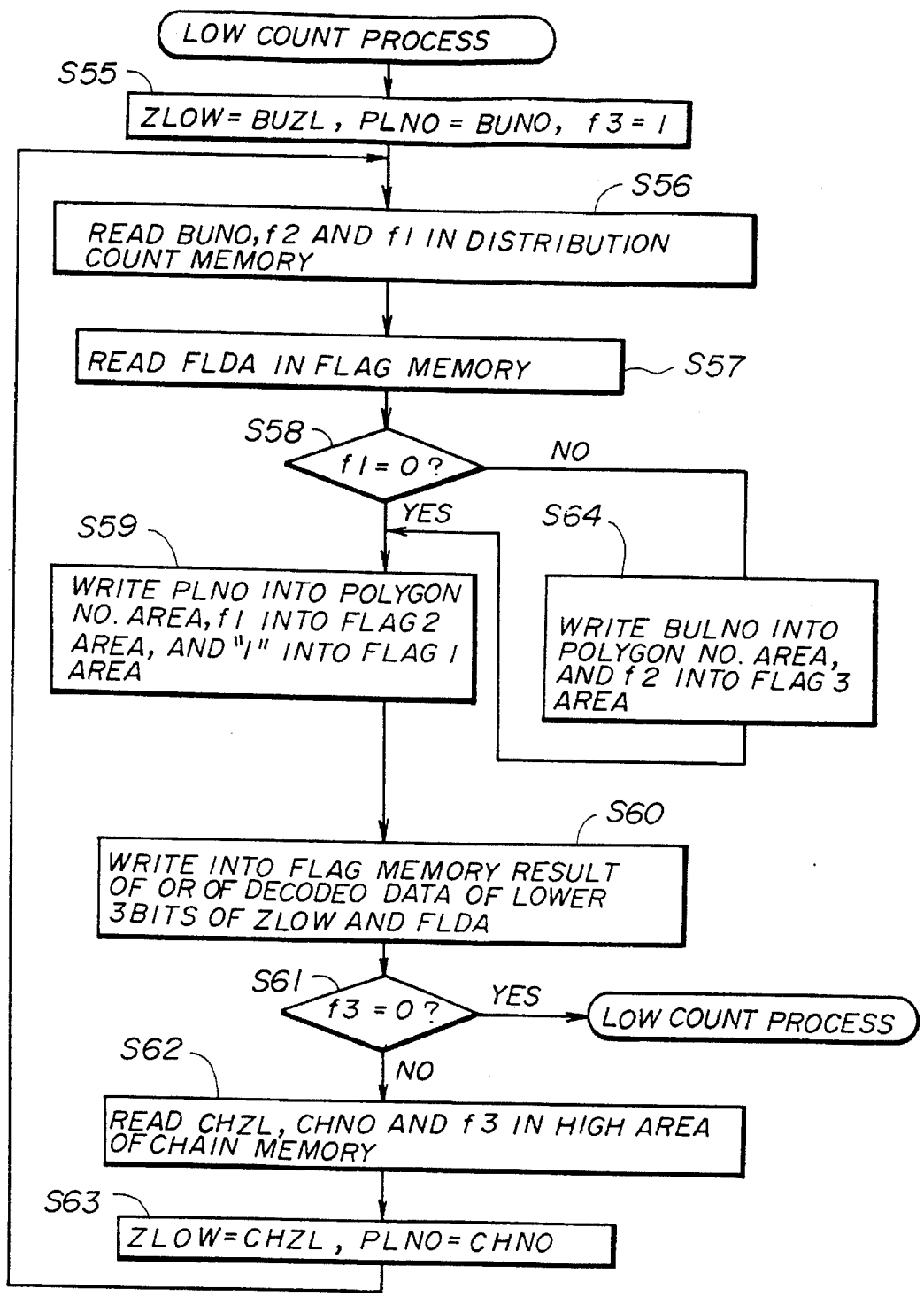
FIG. 18 is a flow chart for showing a low count process according to the present invention.

A description will be given, with reference to the flow chart of FIG. 18, of the low count process. In the low count process, in S55, BUZL, which has been already read, is set as ZLOW, BUNO, which has already been read, is set as PLNO, and flag 3 is set to "1". In S56, the data in the low area of the distribution count memory 4 at the address indicated by ZLOW is read. The read data includes BUNO stored in the low area (hereinafter called BULNO), f2 and f1. For example, in FIG. 35A, at the address "002" of the high area of the distribution count memory 4, f2 is equal to "1", and accordingly ZLOW is set to "03" and PLNO is set to "6". The data in the low area of the distribution count memory 4 at the address "103" indicated by ZLOW is then read.

In S57, 8-bit data (hereinafter called FLDA) is read which data is in the flag memory 31 at the address indicated by the upper 5 bits of ZLOW. In the above example, since the upper 5 bits are "00000", the 8-bit data (FLDA) at the address "00" of the flag memory 31 is read.

In S58, it is determined whether or not f1 is equal to "0". If f1 is equal to "0", that is, if there is no polygon having the same ZLOW, the routine proceeds to S59 where PLNO is written into the polygon number area of the distribution count memory 4 at the address indicated by ZLOW. Additionally, f1 is written into flag 2 area, and data "1" is written into the flag 2 area. For example, in FIG. 36A, at the address "103" of the low area of the distribution count memory 4 indicated by ZLOW "03", PLNO "6" is written into polygon number area, f1 is written into the flag 2 area, and data "1" is written into the flag 1 area.

In S60, a result of an OR operation performed on decoded data of the lower 3 bits of ZLOW and FLDA is written into the flag memory 31 at the address indicated by the upper 5 bits of ZLOW. For example, at the address "002" of the high area of the distribution count memory 4 shown in FIG. 36A, an OR operation is performed on the decoded data "00001000" of the lower 3 bits "011" of ZLOW "03" and FLDA "00000000", and the resultant data "00001000" is written into the flag memory 31 at the above address "00". It should be noted that this process is performed by a synthesizing circuit 34, the SEL 33 and the flag memory 31.

In S61, it is determined whether or not f3 is equal to "0". At the first time the routine passes this step, since f3 is set to "1" in previous step S55, the routine proceeds to S62. In S62, the data in the high area of the chain memory 5 at the address indicated by PLNO, that is, Z value low (CHZL), polygon number (CHNO) and f3, is read. For example, in FIG. 36A, the data at the address "0006" of the high area of the chain memory 5 is read, which data includes CHZL "FF", CHNO "1" and f3 "0".

Figure 37A:
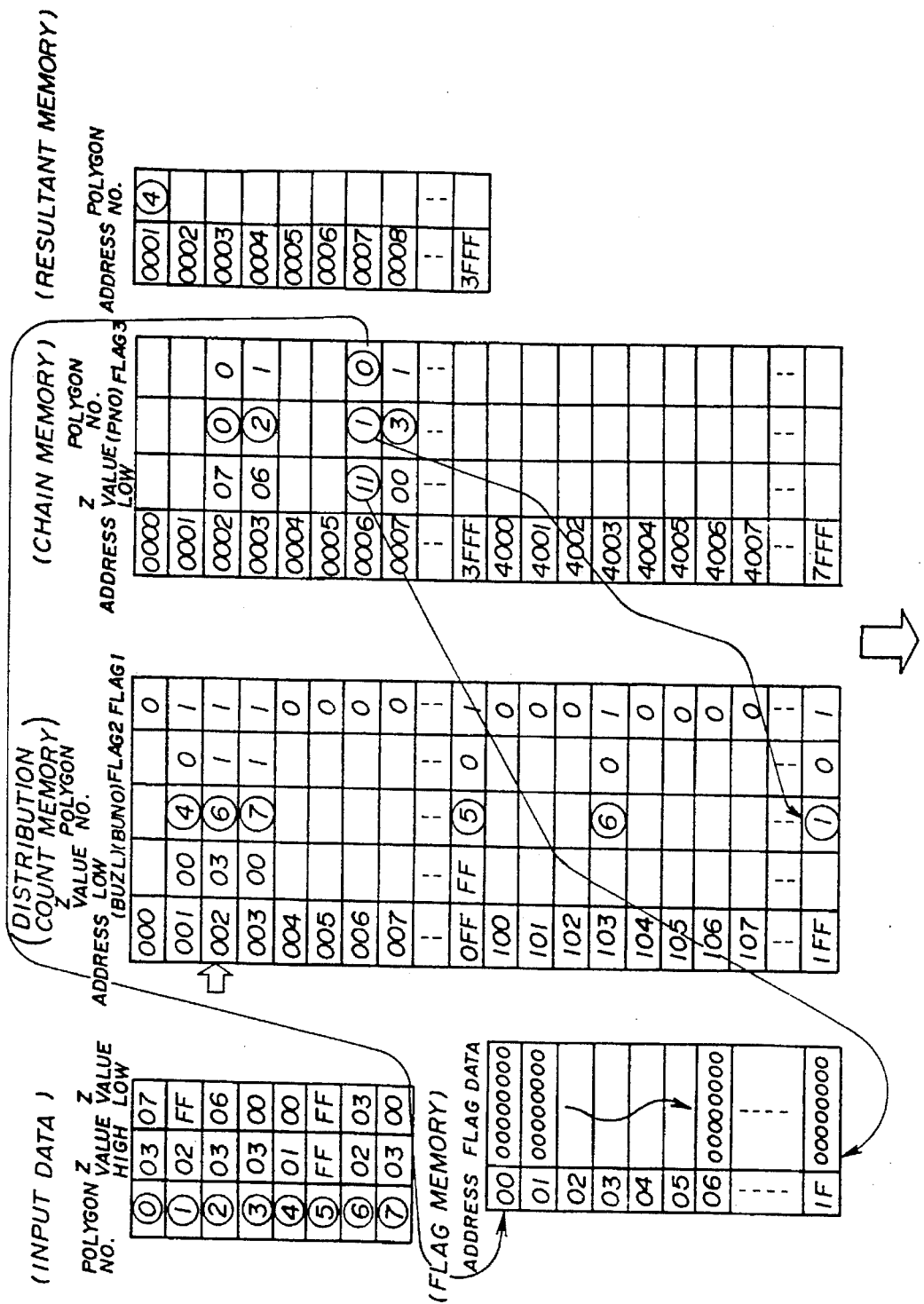

In S63, ZLOW is set as CHZL, and PLNO is set as CHNO, and the routine returns to S56. When the routine proceeds to S61 at the second time, it is determined that f3 is equal to "0", and the routine proceeds to the low read process shown in FIG. 19. For example, as shown in FIG. 37A, ZLOW is set as CHZL "FF", and PLNO is set as CHNO "1". PLNO "1" is then the address "1F" of the low area of the flag memory 31, and "10000000" is written to the address "1F". Since f3 at the address "0006" in the high area of the chain memory 5 is "0", the result in S61 is yes, and the routine proceeds to the low read process.

A description will now be given, with reference to a flow chart of FIG. 19, of the low read process.

When the low read process is started, the value of the FLCNT is set to "0" in S65. The data (FLDA) in the flag memory 31 at the address indicated by the value of the FLCNT is then read in S66. First, the data at the address "0" is read. It is determined, in S67, whether or not FLDA is all "0"s. If yes, that is, if the flag data bits "0" to "7" are all "0", the routine proceeds to S79 where it is determined whether or not the value of FLCNT is equal to or greater than 31. If yes, the low read process ends. If not, the routine proceeds to S80 where the value of the FLCNT is incremented, and the routine returns to S66.

If it is determined, in S67, that FLDA is not all "0"s, the routine proceeds to S68 where FLDA is processed by means of priority encoding in ascending bit order so as to generate data PEDA. In S69, the value of the FLCNT is synthesized with PEDA so as to generate 8-bit data BUAD. The upper 5 bits of BUAD correspond to the value of the FLCNT and the lower 3 bits correspond to PEDA. This process is performed by the flag processing circuit 32 shown in FIG. 23. In S70, bit data indicated by PEDA is reset. By this reset process, if there are two or more bit data "1", the bit data "1" are reset to "0" starting from the lowest bit one by one. That is, for example, if FLDA is "00100101", FLDA becomes "00100100" after the first reset, "00100000" after the second reset, and all "0"s after the third reset. It should be noted that this process is performed by the decoder 37 and the REG 35 shown in FIG. 23.

Figure 37B:
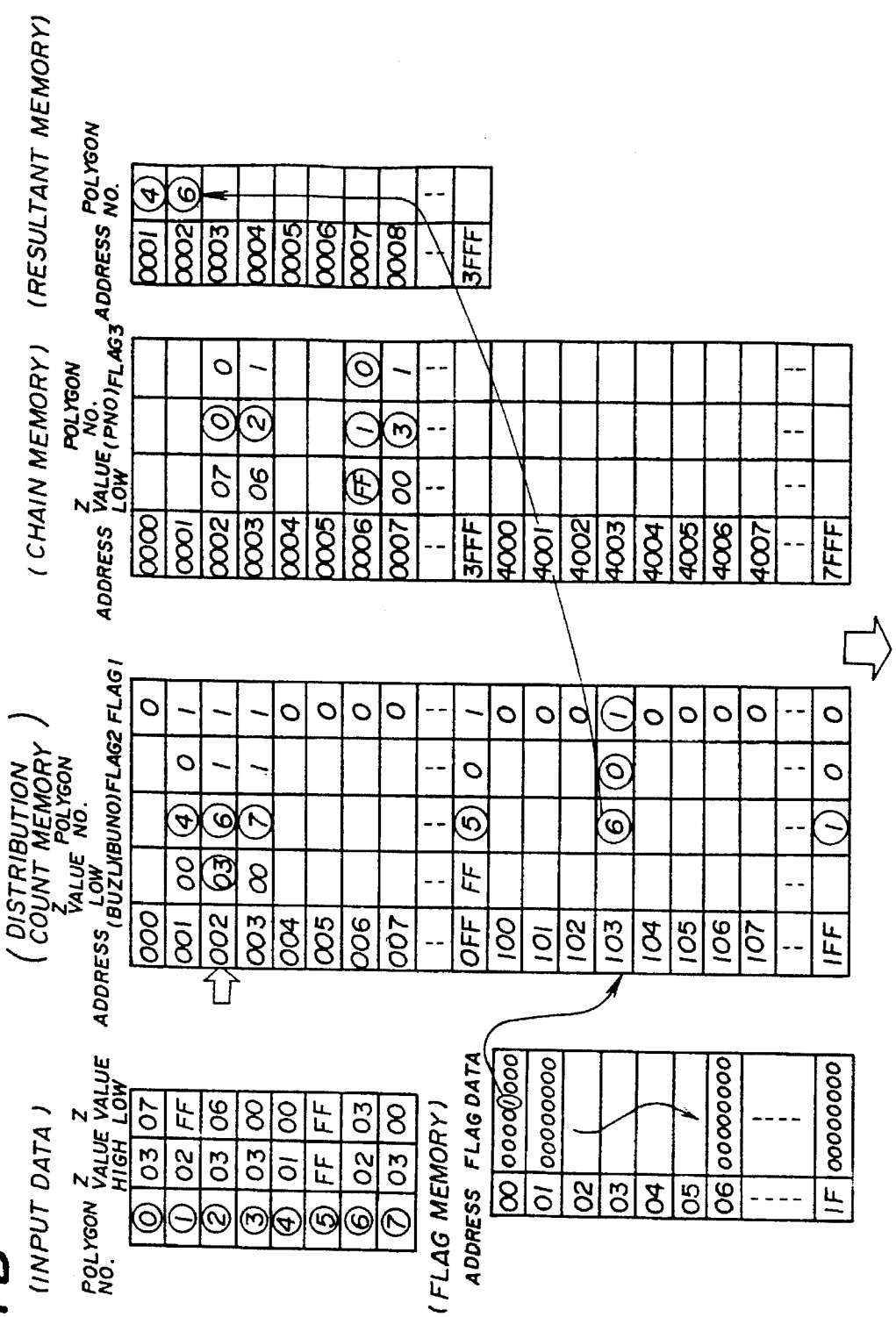

In S71, the data, BULNO and f2, in the low area of the distribution count memory 4 at the address indicated by BUAD is read. For example, as shown in FIG. 37B, FLDA at the address "00" of the flag memory 31 is "00001000"; FLDA is encoded so as to generate PEDA "011"; BUAD "00000011" is generated by synthesizing the value of the FLCNT "00000" with PEDA "011"; and BULNO "6" and f2 "0" stored in the low area of the distribution count memory 4 at the address "103" indicated by BUAD are read.

In S72, the value of the STCNT is incremented, and BULNO is written into the resultant memory 6 at the address indicated by the value of the STCNT. For example, BULNO "6" which is read in S71 is written into the address "0002" of the resultant memory 6.

Figure 38A:
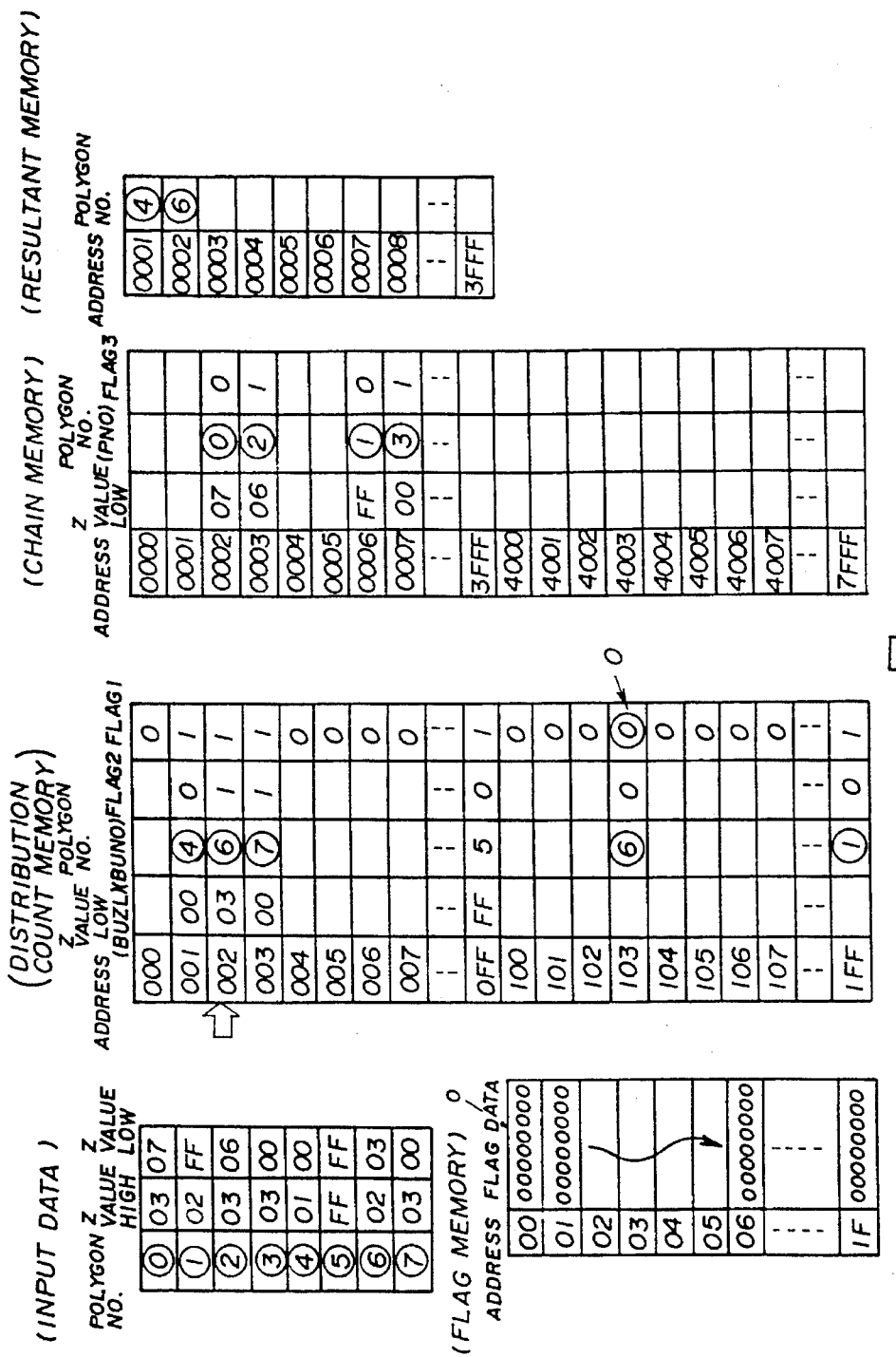
Figure 38B:
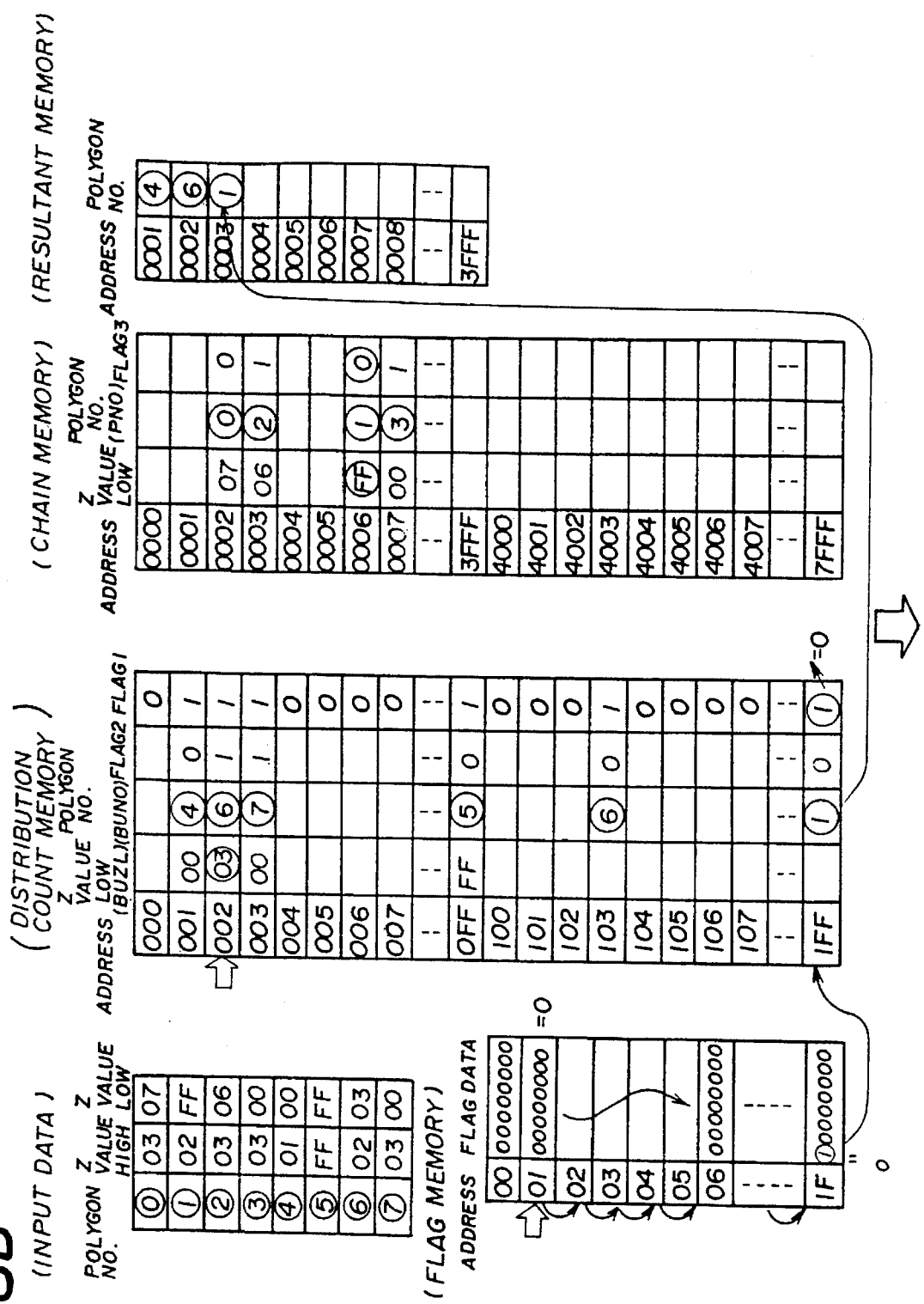

In S73, it is determined whether or not f2 is equal to "0". If yes, that is, if data has not been written twice or more, the polygons are not chained, and thus the routine proceeds to S67. By repeating the process from S67 to S72, FLDA becomes all "0"s, and then the routine proceeds to S80 via S79. Eventually, the value of the FLCNT becomes equal to "31", and as shown in FIG. 38B, the process of S68 to S73 is performed on FLDA at the address "1F" of the flag memory 31.

If it is determined, in S73, that f2 is not equal to "0", the routine proceeds to S74 where a reading operation for the chain memory is performed.

Figure 39A:
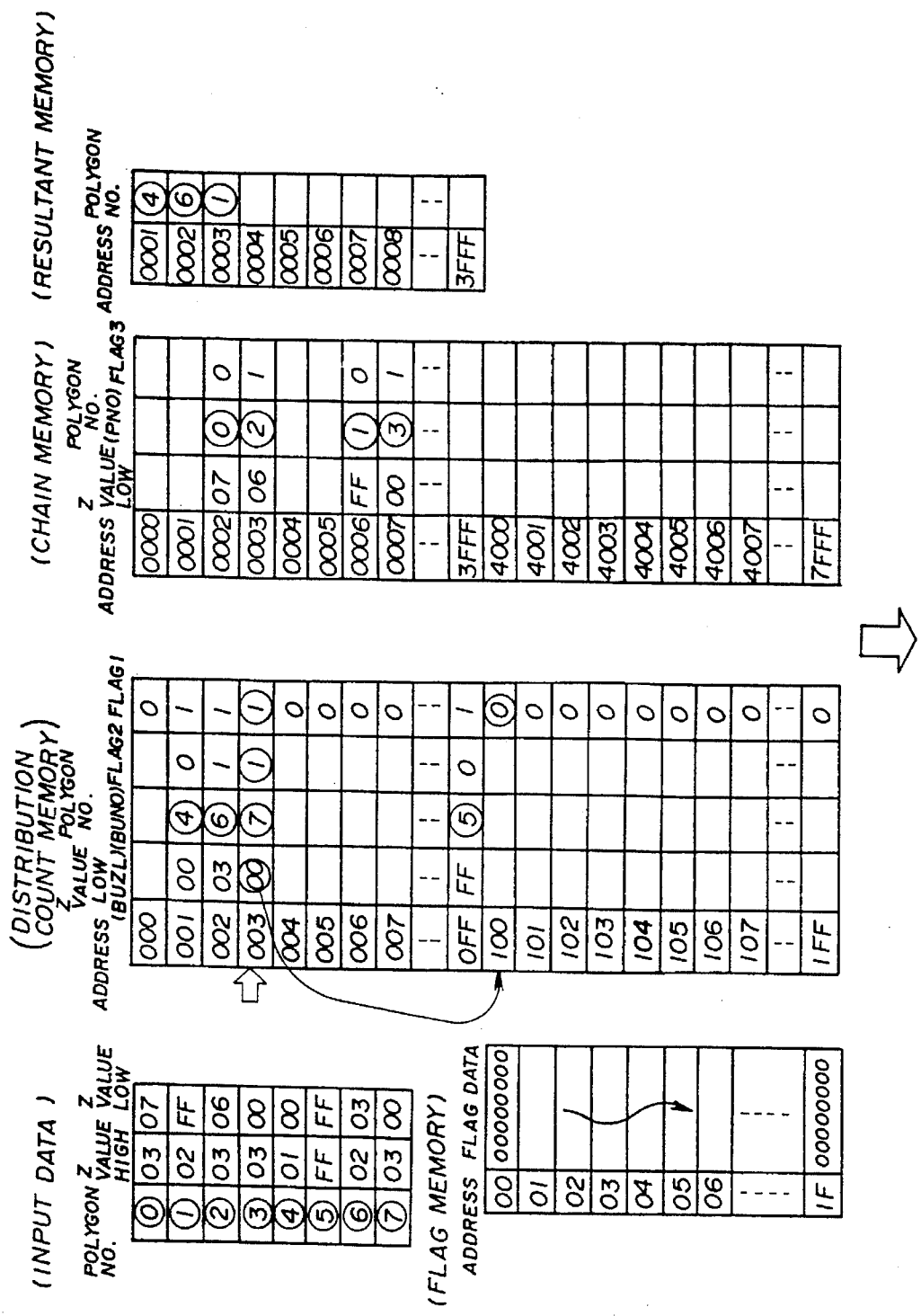
Figure 39B:
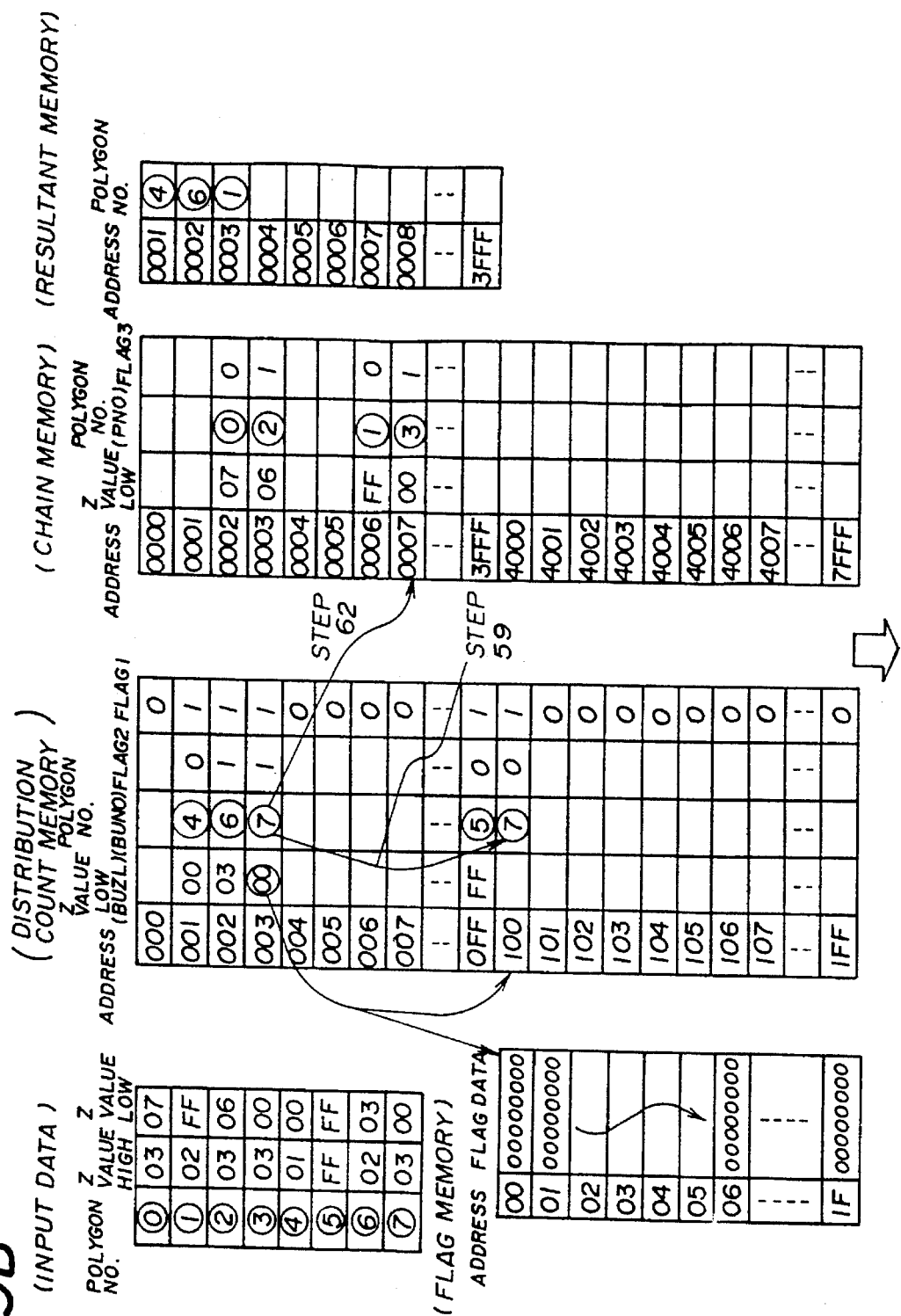

Now, returning to the description of the low count process, a description will be given, with reference to FIGS. 17 and 18, of a writing operation for the chain memory 5. The writing operation for the chain memory 5 is performed when f1 is determined as not being equal to "0" in S58. For example, in FIG. 39A, when the data at the address "003" of the distribution count memory 4 is read, since f1 is equal to "1", the routine proceeds to the low count process via S51. In S56 the low count process, the data at the address "100" of the distribution count memory 4 is read. Since f1 at the address "100" is equal to "0", the process from S59 to S61 is executed, and as a result, as shown in FIG. 39B, polygon number "7" is written to the address "100" of the distribution count memory 4 and data "1" is written to the corresponding lag 1 area. In S62, the data at the address "0007" of the chain memory 5 is then read, and the routine proceeds to S63. In S63, CHZL is set to "00" at the address "0007", and in S56, the data at the address "100" of the distribution count memory 4 is read in accordance with CHZL. Since f1 is equal to "1" due to the setting process performed in S59, the routine proceeds to S64 via S57 and S58.

Figure 40A:
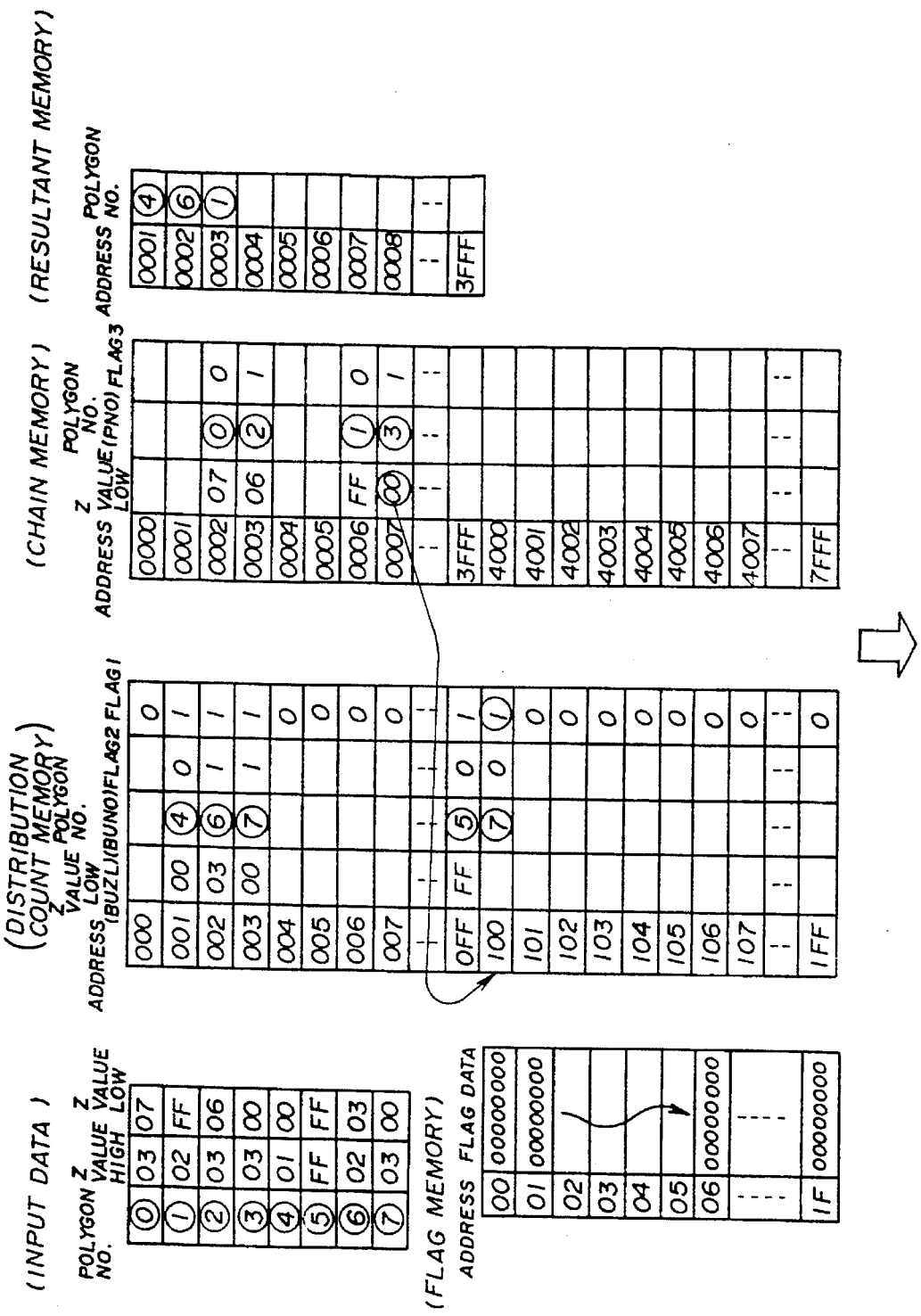
Figure 40B:
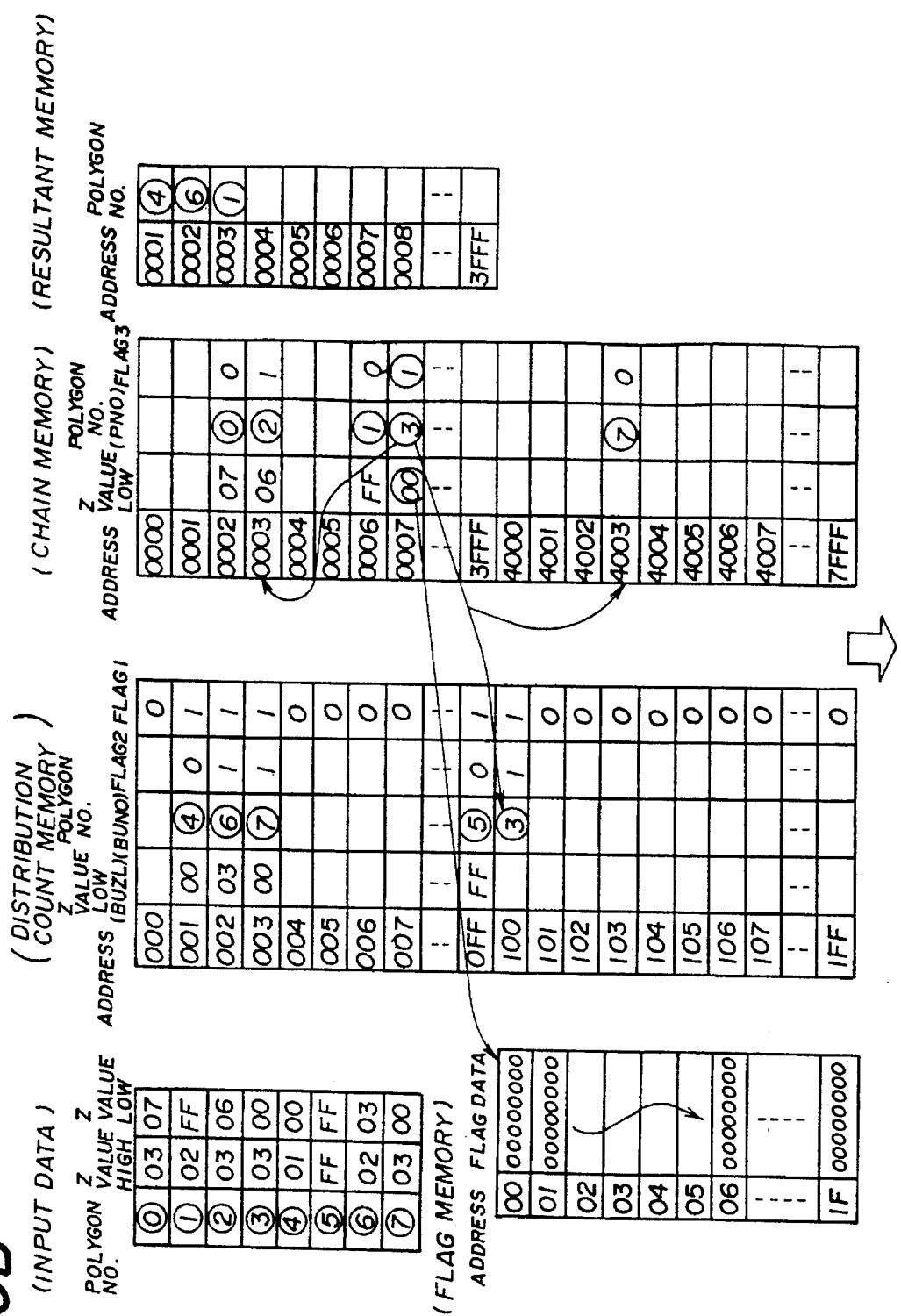
Figure 41A:
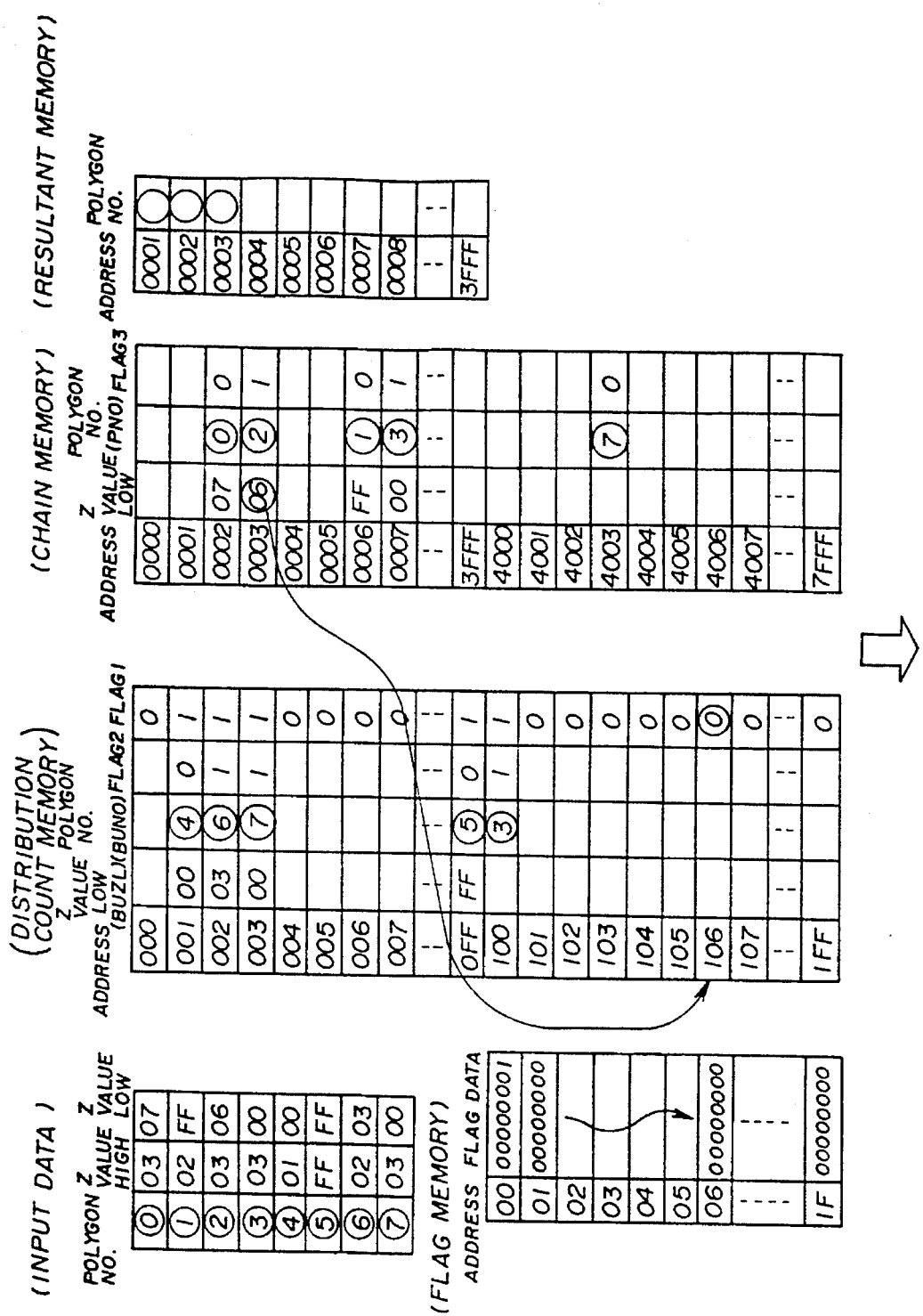
Figure 41B:
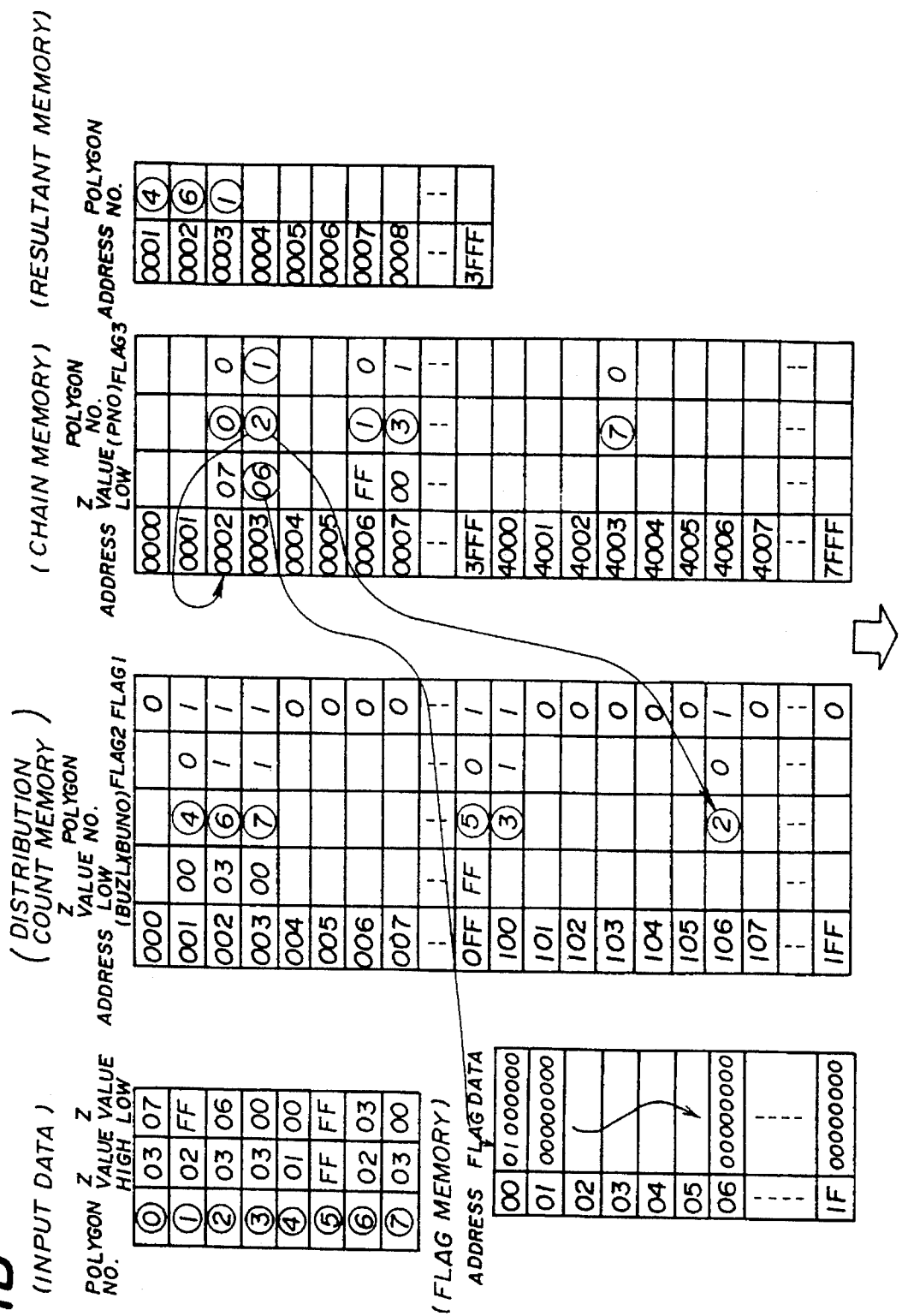
Figure 42A:
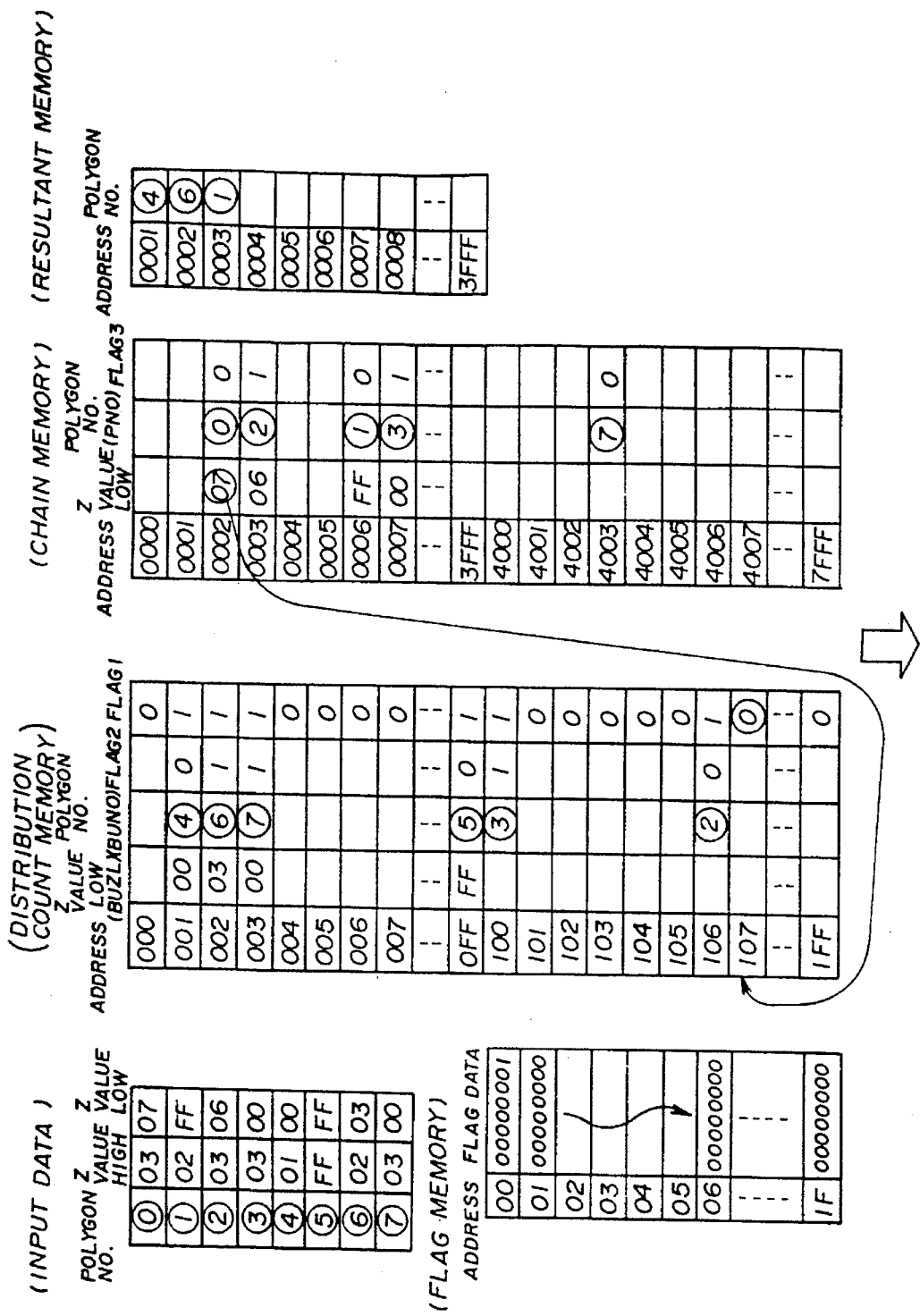
Figure 42B:
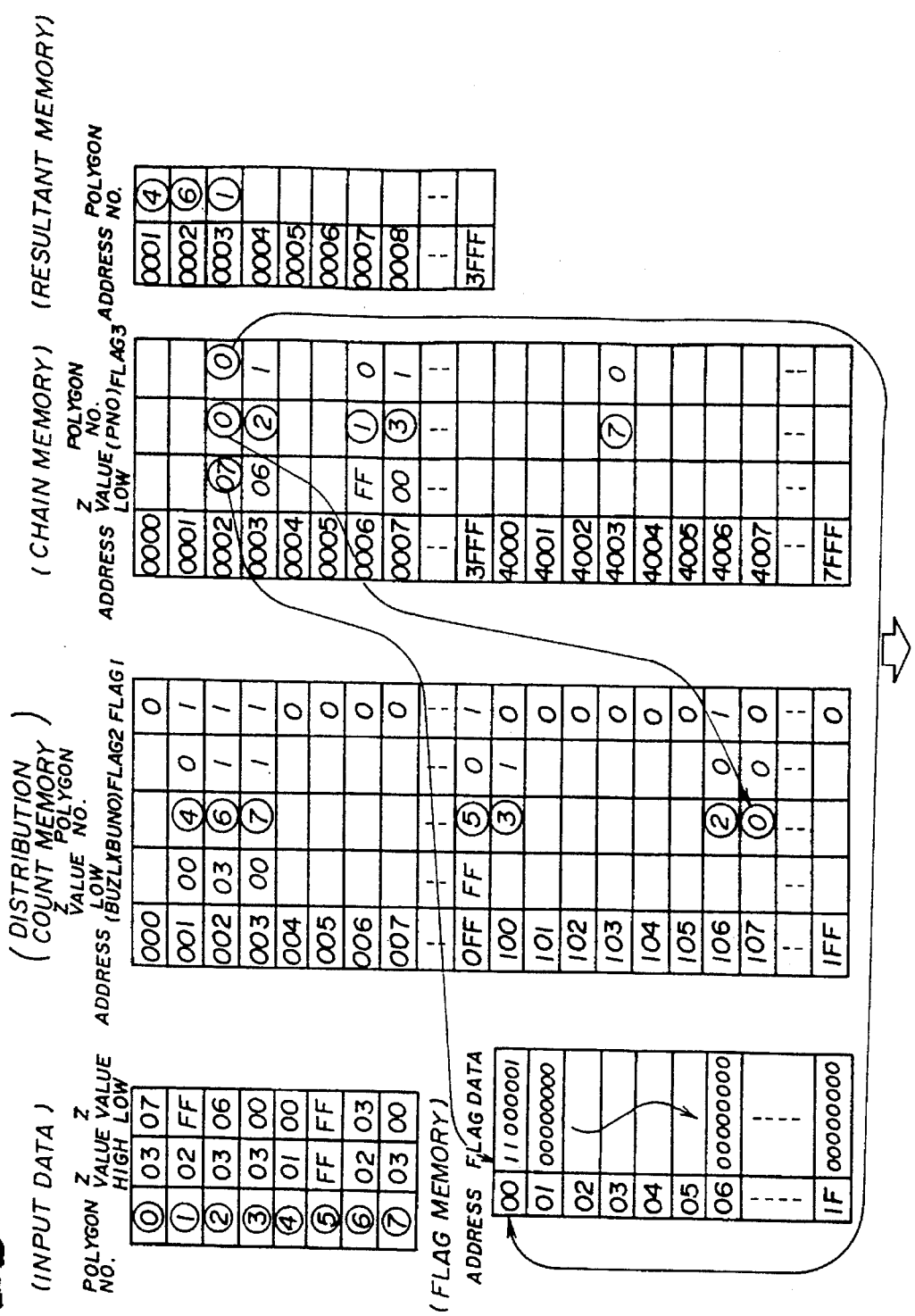

In S64, as shown in FIG. 40B, BULNO "7" is written into the polygon number area and f2 "0" is written into the flag 3 area of low area of the chain memory 5 at the address indicated by PLNO which is the polygon number "3" at the address "0007" of the chain memory 5. The above-mentioned process is repeated until f3 is determined to be "0" in S61, and thereby as shown in FIGS. 41A, 41B, 42A and 42B, data is written into the low area of each memory and at each address of the flag memory 31.

Figure 19:
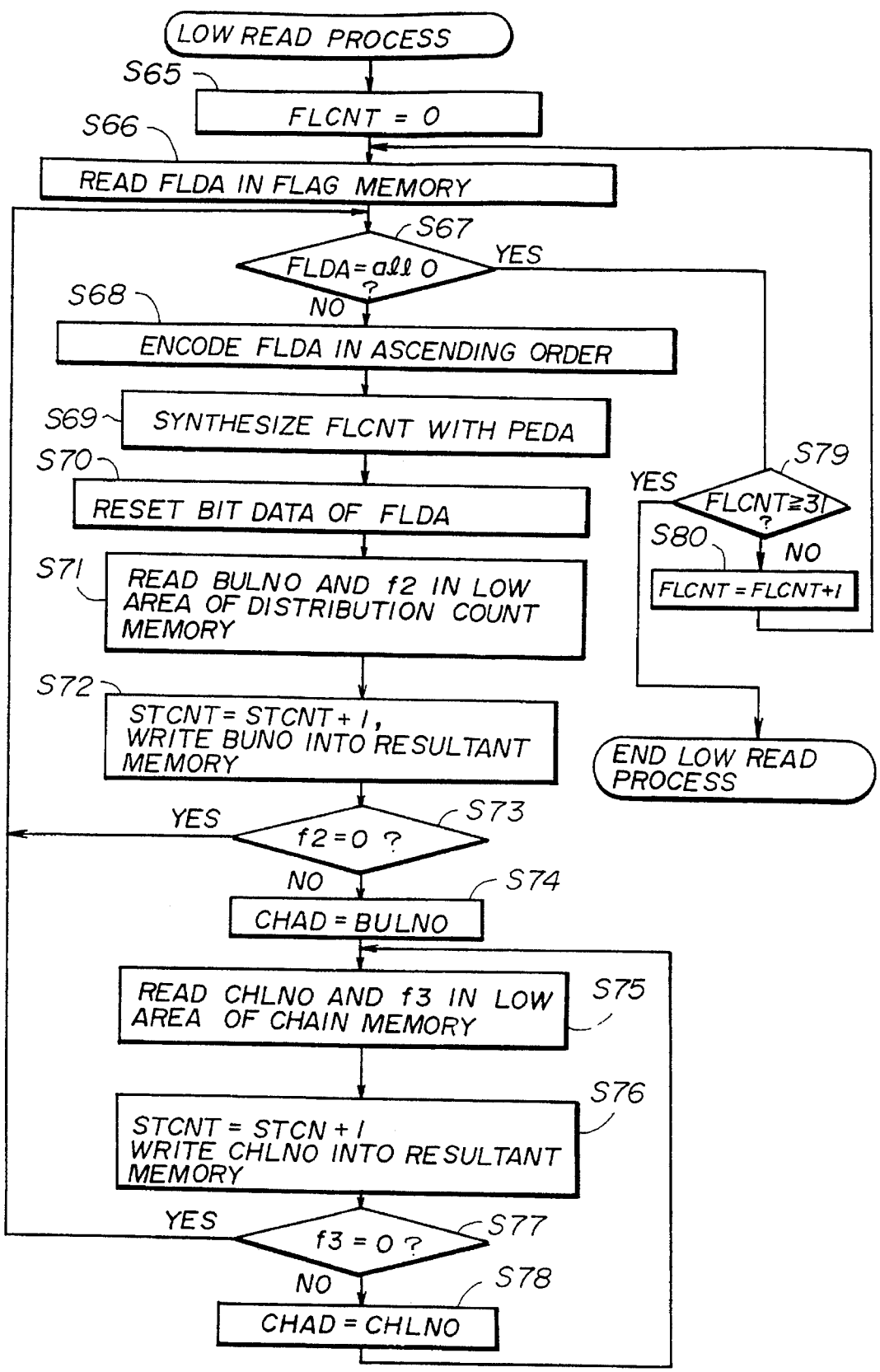
FIG. 19 is a flow chart for showing a low read process according to the present invention.

After f3 is determined, in S61, to be "0" and the routine proceeds to the low read process shown in FIG. 19, BULNO is written, as mentioned above, into the resultant memory. On the other hand, if it is determined, in S73, that f2 is not equal to "0", for example, if the data at the address "100" of the distribution count memory 4 shown in FIG. 43A, the routine proceeds to S74. In S74, CHAD is set to the value of BULNO. For example, in FIG. 43A, since the value of BULNO is "3", the value of CHAD is set to "3".

Figure 43A:
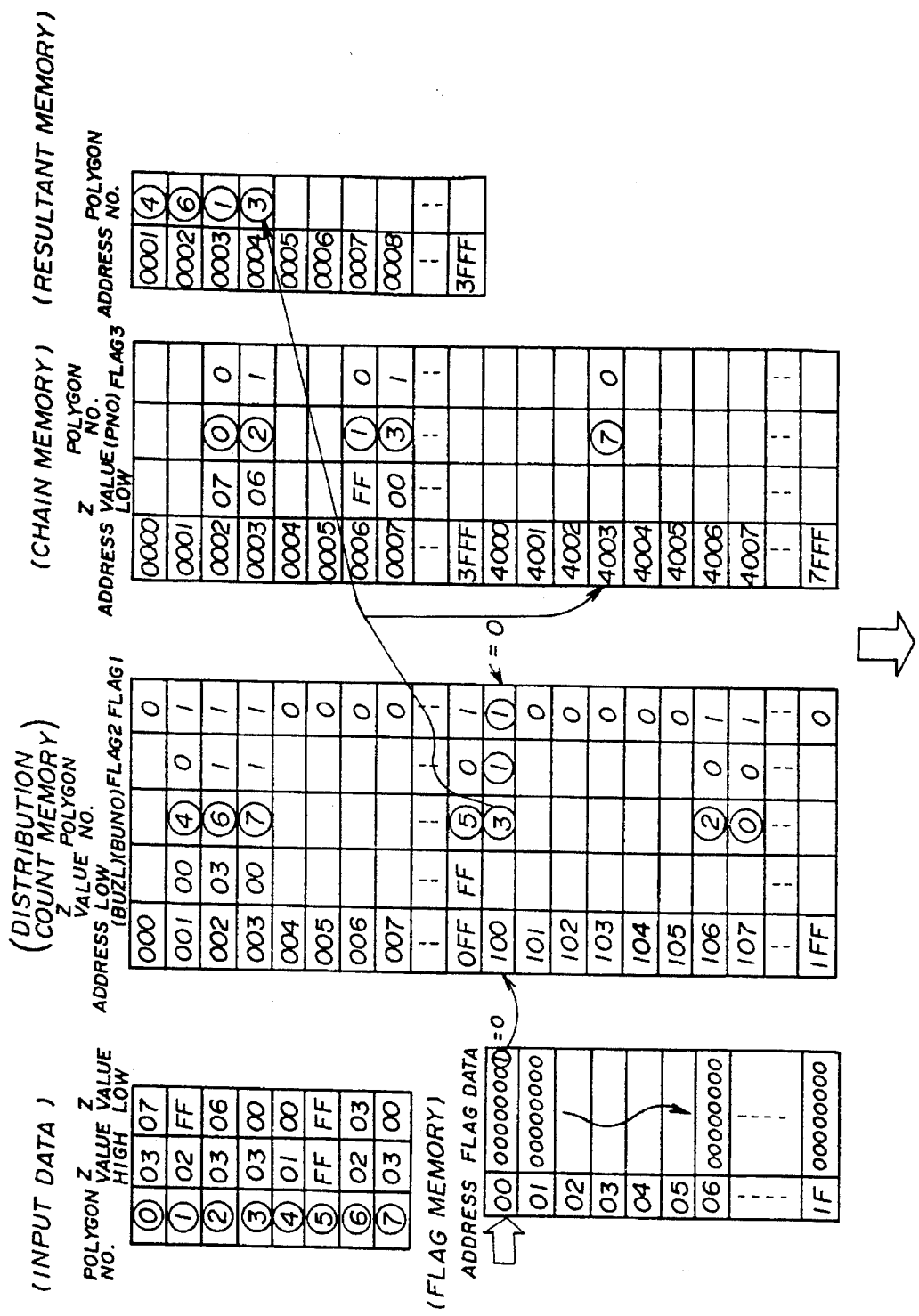
Figure 43B:
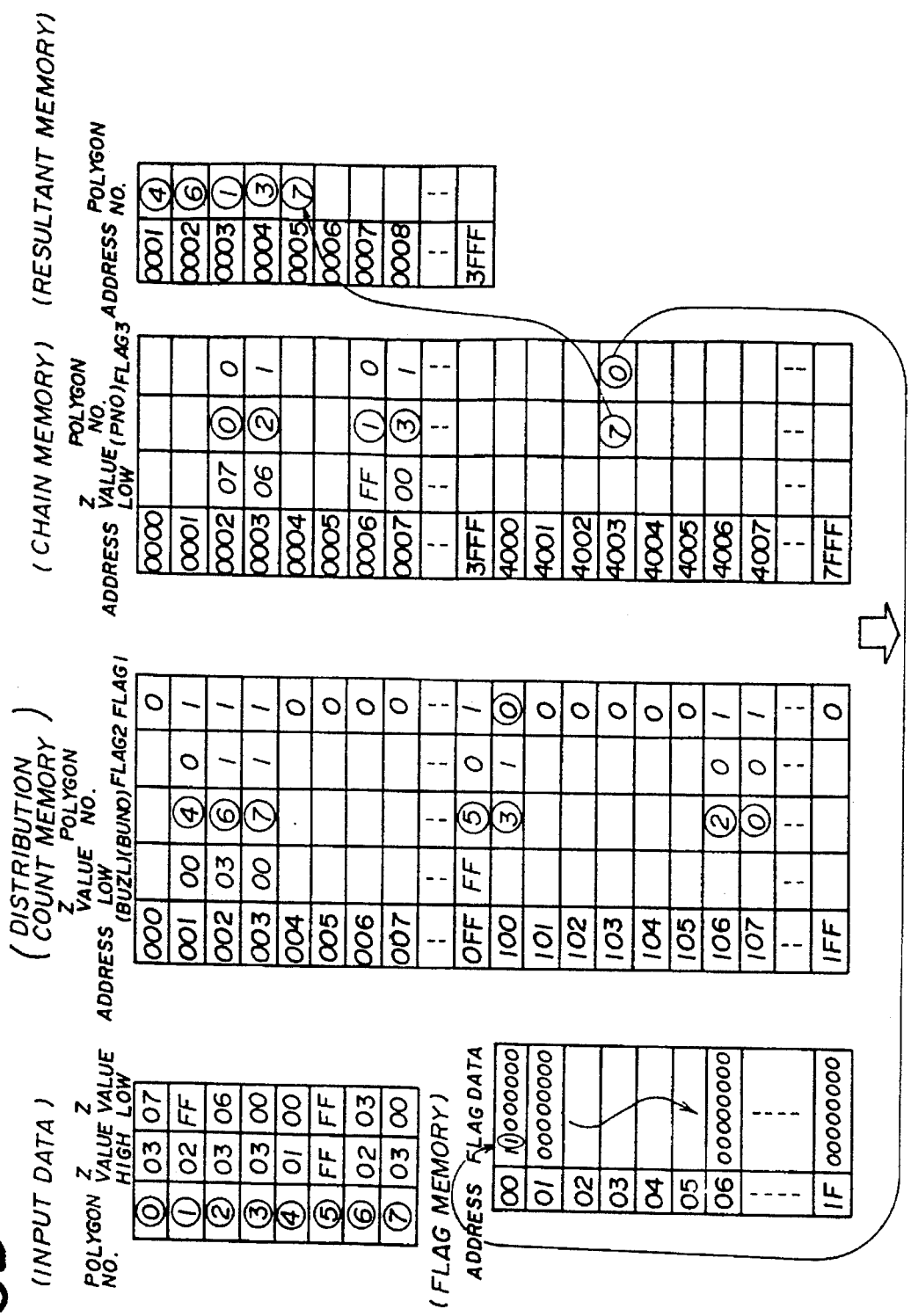

In S75, the data CHLNO and f3 in the low area of the chain memory 5 at the address indicated by the above-mentioned CHAD is read. For example, in FIG. 43A, CHLNO "7" and f3 "0" at the address "4003" of the chain memory 5 are read. In S76, the value of the STCNT is incremented, and CHLNO is written into the resultant memory 6 at the address indicated by the value of the STCNT. For example, as shown in FIG. 43B, CHLNO "7" is written into the resultant memory 6 at the address "0005" indicated by the value of the STCNT.

Figure 44A:
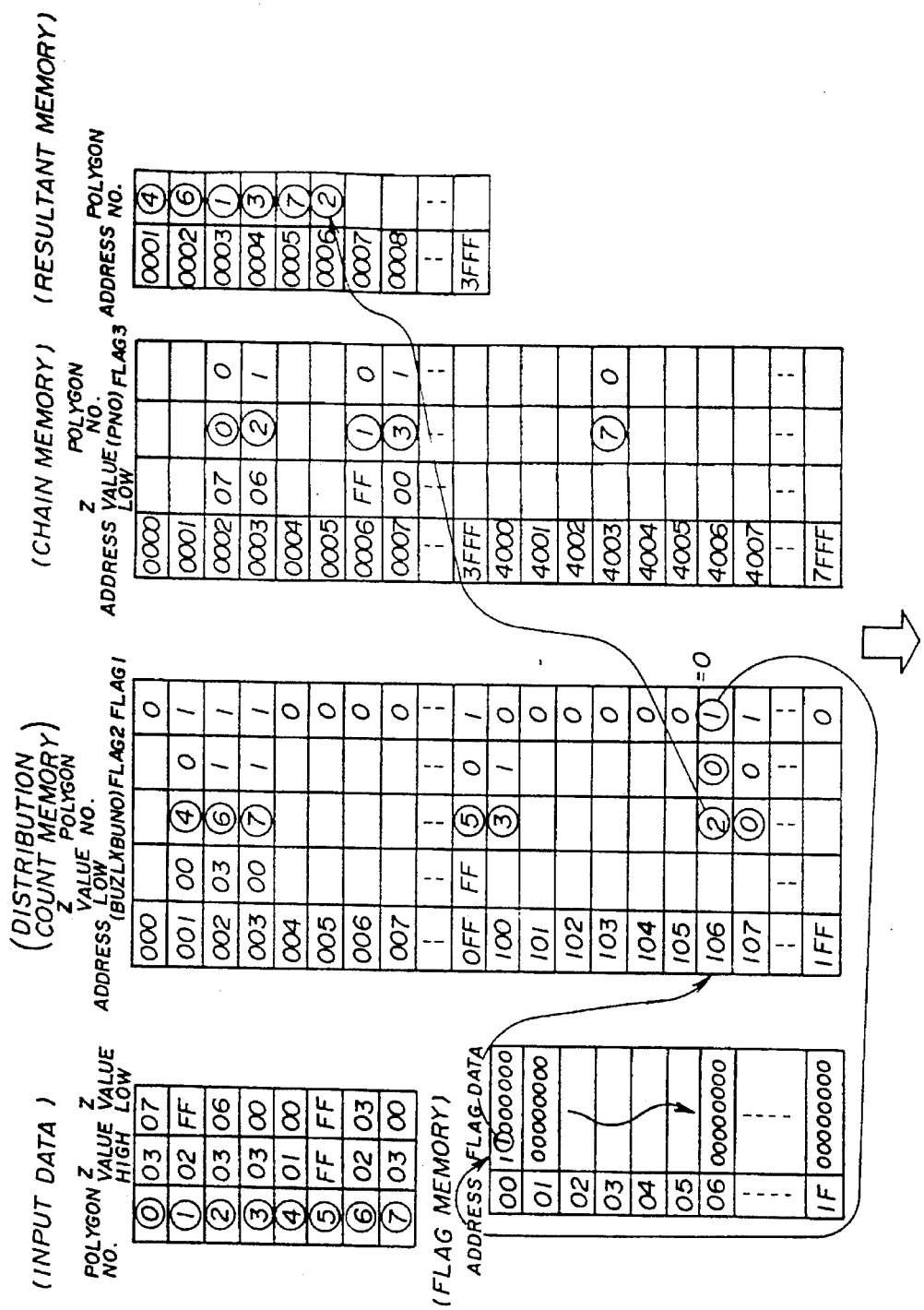
Figure 44B:
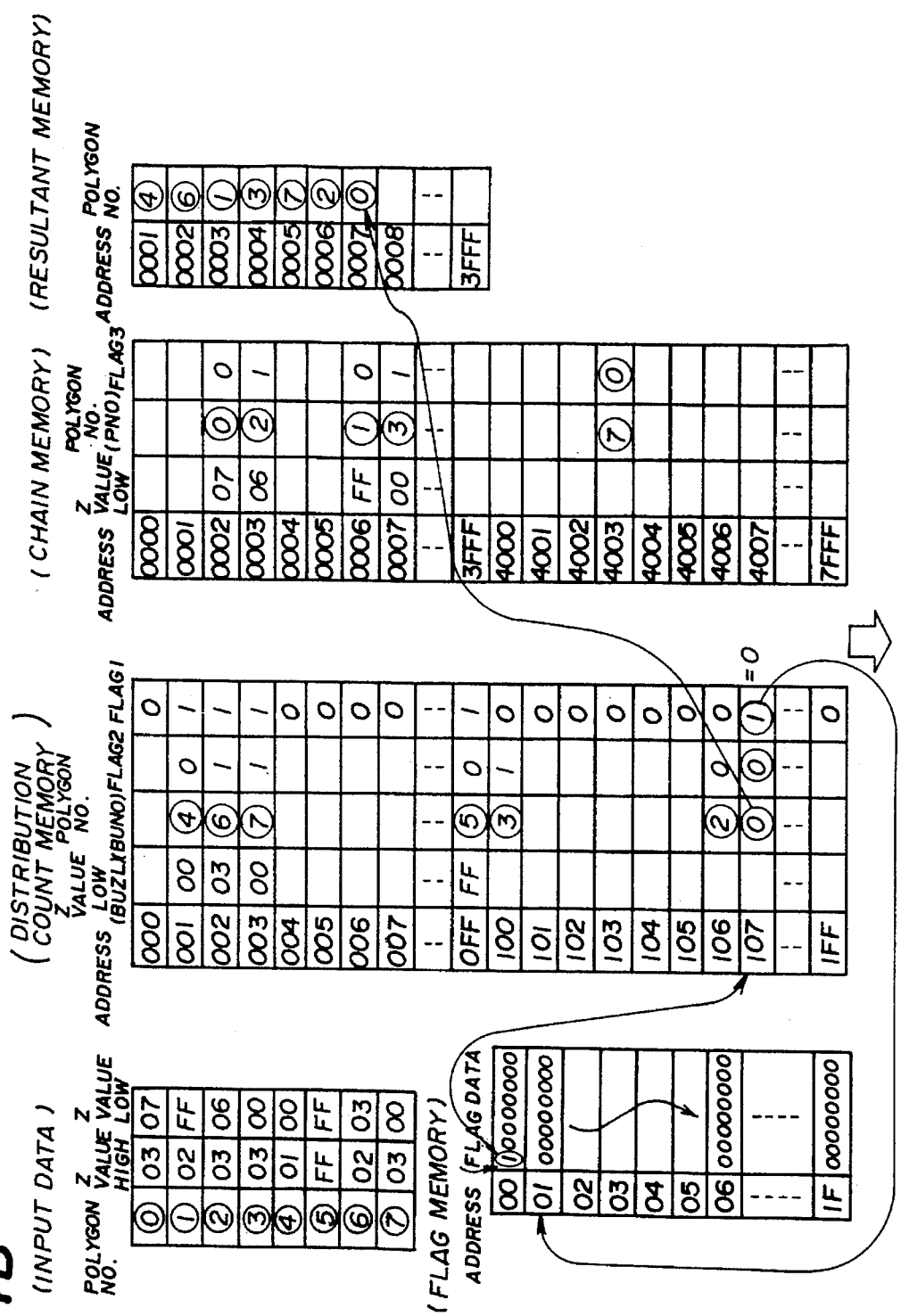
Figure 45A:
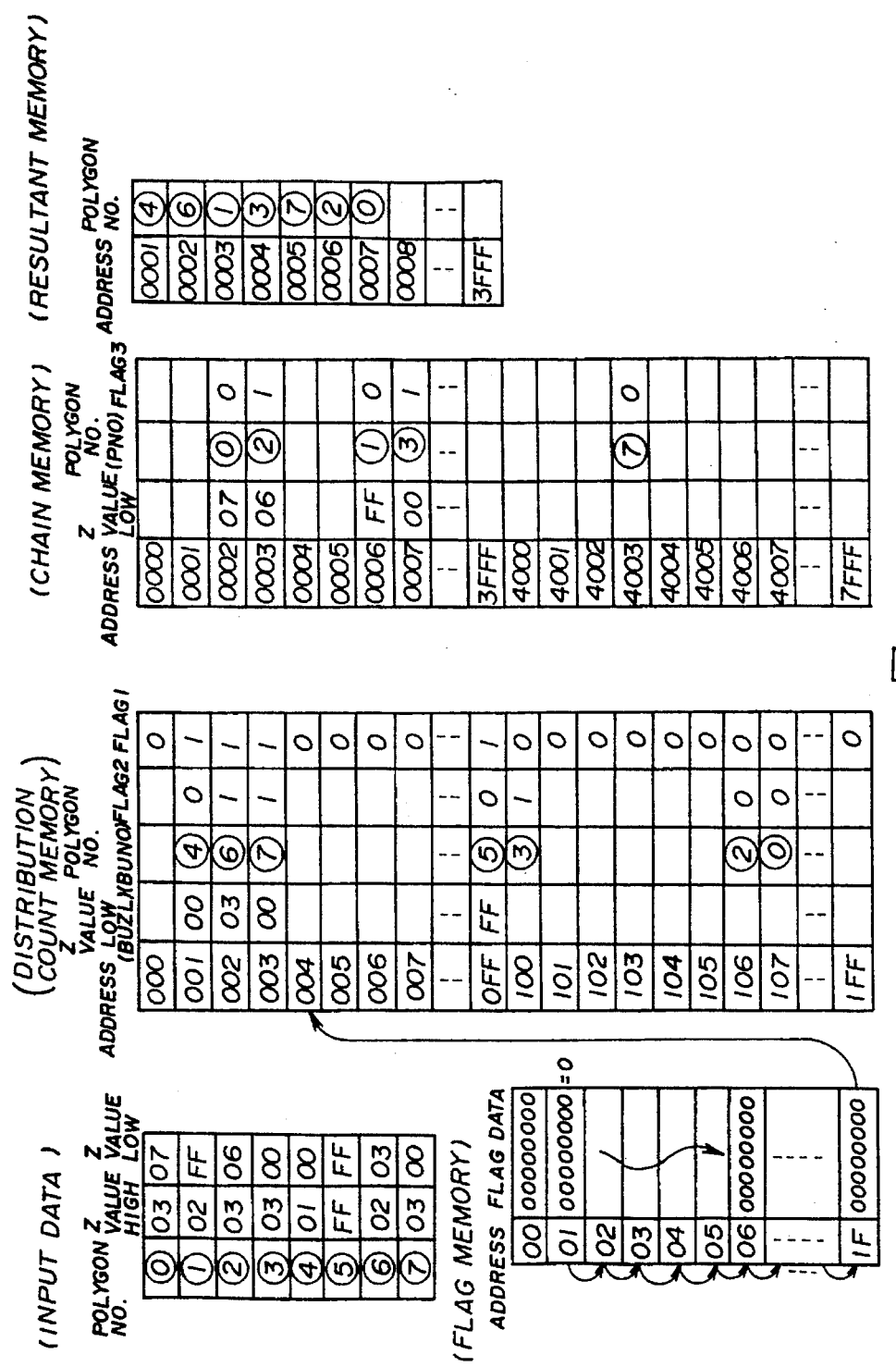
Figure 45B:
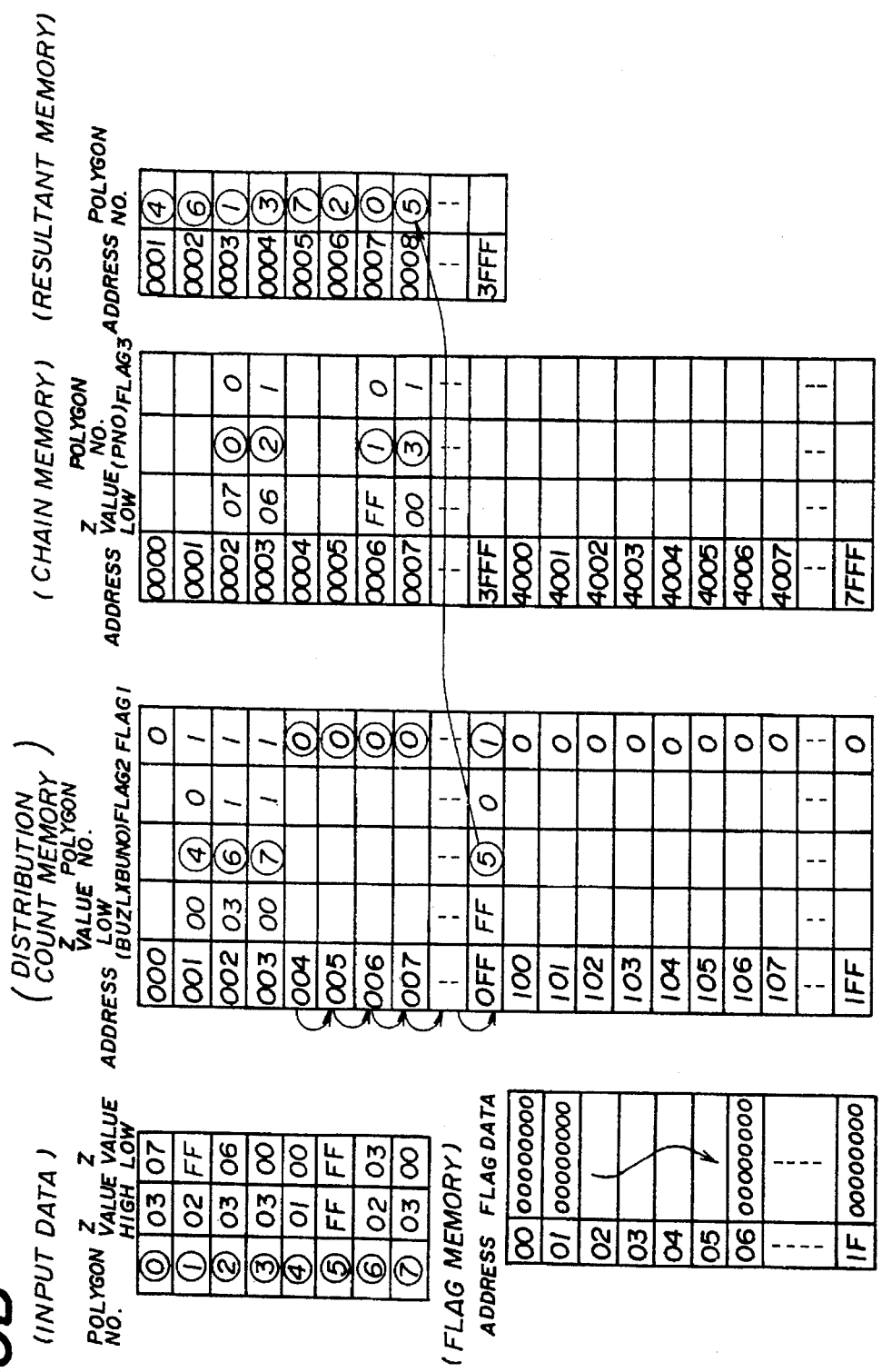

It is determined, in S77, whether or not f3 is equal to "0". If f3 is equal to "0", it signifies that there are no polygons having the same value in the Z value low area, and thus the routine returns to S67 so as to perform the low read process at a high speed in accordance with the data in the flag memory 31. By repeating the process from S67 to S73, the resetting of the flag memory 31 and the writing of the polygon number into the resultant memory 6 are performed as shown in FIG. 44B. On the other hand, if f3 is determined, in S77, not to be equal to "0", that is, another chain is needed, CHAD is set, in S78, to the value of CHLNO, and the routine returns to S75.

By performing the above-mentioned first and second processes, including the low count process and the low read process, as shown in FIGS. 24A through 45B, polygons having a number "0" through "7" are arranged in the resultant memory 6 in the order "4", "6", "1", "3", "7", "2", "0", "5". In this embodiment, since the Z value is processed by being divided into the high side and the low side, the processing speed is increased over than other embodiments. It should be noted that although the Z value is divided into two portions in this embodiment, it can be divided three or more portions.

A description will now be given of the processing speed of the sorting operation in accordance with the method described with reference to FIG. 13C. In the description, it is assumed that the number of polygons is N, the number of bits of Z value data is M, and the number of words of the address of the flag memory 31 is F.

In the first process, (2N+1) cycles are needed (refer to FIG. 11). In the second process, $2^{M/2}$ cycles are required for reading the high area of the distribution count memory 4, N cycles for reading the high area of the chain memory 5, (2N+1) cycles for writing the low area of the distribution count memory 4, and the chain memory 5 and the flag memory 3, $(F*2^{M/2})$ cycles for reading the flag memory 31, and (N+1) cycles for reading the low areas of the distribution count memory 4 and the chain memory 5. The total is $\{4N+(F+1)*2^{M/2}+2\}$ cycles.

On the assumption that N=10,000, M=16, and F=32, the total number of cycles is 48,450 in accordance with the above relationship. If it takes 70 ns for 1 cycle, 3.4 ms is needed for the second process. It should be noted that if F is reduced, the time spent on the sorting operation is shortened, however, the scale of circuitry is increased. In this embodiment, F is set to 32. Therefore, on the assumption that the process time for a single frame is 16.6 ms, the process time for the first process has to be 16.6−3.4=13.2 ms. The first process needs (2N+1) cycles, and accordingly the first process can be performed for about 1.5 ms. That is, as shown in FIG. 13C, the geometric conversion and the first process can be performed simultaneously, and thus the frame delay can be eliminated.

The present invention is not limited to the specifically disclosed embodiments, and variations and modifications may be made without departing from the scope of the present invention.

What is claimed is:

1. A method of sorting data sets each having a pair of a unique id and a multiply occurring value, the data sets being sorted in an ascending order based upon the multiply occurring value via a first intermediate table, a second intermediate table and a result table, comprising the steps of:

a) initializing the first intermediate table, the second intermediate table and the result table with a predetermined value;

b) placing each data set at a first storage address in the first intermediate table in an ascending order based upon the multiply occurring value, said first storage location being derived from the multiply occurring value, one of the data sets stored at said first storage location defining a stored data set;

c) replacing said stored data set with another of the data sets if the multiply occurring value collides onto said first storage location, said another of the data sets defining a current data set, said stored data set being replaced defining a replaced data set;

d) placing the unique id of said replaced data set at a second storage location in the second intermediate table, said second storage location derived from the unique id of said current data set; and e) merging the first intermediate table and the second intermediate table into the result table.

2. The method of sorting data sets according to claim 1 wherein said step e) further comprising the steps of:

f) transferring said stored data set in the first intermediate table to the result table;

g) transferring said replaced data at the second storage location derived from the unique id of said stored data set which is transferred in said step f); and h) transferring said replaced data at a third storage location in the second intermediate table, said third storage location being derived from the unique id of said replaced data set which is transferred in said step g).

3. The method of sorting data sets according to claim 2 wherein said steps e) through h) are repeated until said predetermined value is found in the second intermediate table.

4. The method of sorting data sets according to claim 2 wherein the first intermediate table further comprises a second flag for each of said data sets, said second flag indicating an entry of said replaced data at said second storage location in the second intermediate table.

5. The method of sorting data sets according to claim 4 wherein the second intermediate table further comprises a third flag for each of said data sets, said third flag indicating an entry of another of said replaced data set at said third storage location in the second intermediate table.

6. The method of sorting data sets according to claim 1 wherein the first intermediate table has a number of said first storage locations that is equal to a range of the multiply occurring value.

7. The method of sorting data sets according to claim 1 wherein the second intermediate table has a number of said storage locations that is equal to a number of said data sets.

8. The method of sorting data sets according to claim 1 wherein the first intermediate table further comprises a first flag for each of said data sets, said first flag indicating an entry of said stored data set at said first storage location in the first intermediate table.

9. The method of sorting data sets according to claim 1 wherein the unique id is further divided into a predetermined number of portions.

10. The method of sorting data sets according to claim 1 wherein the multiply occurring value is further divided into a predetermined number of portions.

11. A sorting device for sorting input data having a unique data number and a multiply occurring reference value comprising:

data number generating means for isolating said unique data numbers for each of said input data;

distribution count memory means having a first memory area in which one of said data numbers is stored at a first address indicated by the corresponding reference value, said one of said data numbers stored in said first memory area defining a stored data number and being replaced with another of said data numbers when said another data number has the same reference value as that of said stored data number, said another data number defining a current data number;

chain memory means a first memory area for storing said stored data number at a second address indicated by said current data number when said stored data number is replaced in said distribution count memory means;

distribution count memory reading means for reading said current data number stored at said first address in said distribution count memory means;

first determining means for determining whether or not said current data number exists at said first address in said distribution count memory means;

resultant memory means for storing said data numbers in a desired sorted condition;

first resultant memory writing means for writing said current data number at a next available address in said resultant memory means in response to said first determining means, said data number just written defining a sorted data number, said predetermined address being inserted;

second determining means for determining whether or not said stored data number exists at said second address having the same reference value indicated by said sorted data number in said chain memory means;

chain memory reading means for reading said stored data number said second address in said chain memory means, said second address of said chain memory means having the same reference value indicated by said stored data number;

second resultant memory writing means for writing the said stored data number at an address adjacent to said next available address in said resultant memory means in response to said second determining means.

12. The sorting device as claimed in claim 11, wherein said distribution count memory means further comprises a second memory area for a first flag for each of said data numbers, said first determining means also further comprising a first flag setting means for setting said first flag when said data number is stored in said distribution count memory means, and a first flag determining means for determining whether or not said first flag is set.

13. The sorting device as claimed in claim 12, wherein said first resultant memory writing means writes said data number located at said first address into said resultant memory means when said first flag is set.

14. The sorting device as claimed in claim 11, wherein said distribution count memory means further comprises a third memory area for a second flag for each of said data numbers, said second determining means also further comprising a second flag setting means for setting said second flag in said distribution count memory means, when the replacement is performed in said distribution count memory means, sand a second flag determining means for determining whether or not said second flat is set.

15. The sorting device as claimed in claim 14, wherein said second resultant memory writing means writes said stored data number located at said second address into said resultant memory means when said second flag is set at said first address of said distribution count memory means.

16. The sorting device as claimed in claim 11, wherein said chain memory means further comprises a second memory area for a third flag for said stored data number, said second determining means further comprising a third flag setting means for setting said third flag in said chain memory means when any data number already exists at an address indicated by a previously stored data number in said chain memory means, and third flag determining means for determining whether or not said third flag is set.

17. The sorting device as claimed in claim 16, wherein said second resultant memory writing means writes said stored data number at an address indicated by said current number in said chain memory when said third flag is set, the data number at said address of said chain memory means into said resultant memory means.

18. The sorting device as claimed in claim 11, further comprising dividing means for dividing data corresponding to said reference value of said input data items into at least two portions comprising less significant portion data and more significant portion data, and said distribution count memory means and said chain memory means divided having portions of respective said first memory area, a number of the portions of each of said first memory area corresponding to a number of the portions into which said reference value data is divided, said distribution count memory means and said chain memory means further having areas in which said less significant portion data is stored.

19. The sorting device as claimed in claim 18, wherein said reference value data comprises 8-bit data, and said dividing means divides said 8-bit data into an upper 5 bits and a lower 3 bits.

20. The sorting device as claimed in claim 18, further comprising flag memory means for storing flag data comprising a plurality of bits each of which corresponds to one address in said distribution count memory means, a corresponding flag bit being set when a data number is written into an area corresponding to a designated address, and wherein said plurality of bits are read as a single flag data item, a flag being detected from the read flag data item, said less significance portion data in said distribution count memory means at the address corresponding to the detected flag being read for the second sorting process.

21. The sorting device as claimed in claim 11, wherein said distribution count memory means and said chain memory means write simultaneously with said data number generating means.

* * * * *

UNITED STATES PATENT AND TRADEMARK OFFICE
CERTIFICATE OF CORRECTION

PATENT NO. : 5,551,019
DATED : August 27, 1996
INVENTOR(S) : Yasuhiro IZAWA et al.

It is certified that error appears in the above-indentified patent and that said Letters Patent is hereby corrected as shown below:

On the title page, item [54] and Col. 1, line 1,
In the title, delete "MULTIPLYING" and insert --MULTIPLY--;

At column 5, line 4, change BOTH occurrences of the number "8" to --6--;

At column 6, line 29, change the number "8" to --6--;

At column 9, line 58, insert --,-- after the word "process";

At column 9, line 65, delete the number "38" and insert --36--;

At column 10, line 13, delete the number "38" and insert --36--;

At column 13, line 48, delete "lag" and insert --flag--;

Signed and Sealed this

Seventh Day of January, 1997

Attest:

BRUCE LEHMAN

*Attesting Officer*              *Commissioner of Patents and Trademarks*